INVENTORS
CLAYTON H. CLARK
DONALD J. STEFANIK

BY Strauch, Nolan & Neale
ATTORNEYS

DRUM PRINTER

Filed Oct. 25, 1962 20 Sheets-Sheet 3

| ↑ | ↓ | BAUDOT 5 4 3 2 1 | LTR DRUM POSITION | FIG. |
|---|---|---|---|---|
| 3 | E | 0 0 0 0 1 | 2 | 34 |
| – | A | 0 0 0 1 1 | 4 | 36 |
| BELL | S | 0 0 1 0 1 | 6 | 38 |
| 8 | I | 0 0 1 1 0 | 7 | 39 |
| 7 | U | 0 0 1 1 1 | 8 | 40 |
| $ | D | 0 1 0 0 1 | 10 | 42 |
| 4 | R | 0 1 0 1 1 | 11 | 43 |
| ' | J | 0 1 0 1 1 | 12 | 44 |
| , | N | 0 1 1 0 0 | 13 | 45 |
| ! | F | 0 1 1 0 1 | 14 | 46 |
| : | C | 0 1 1 1 0 | 15 | 47 |
| ( | K | 0 1 1 1 1 | 16 | 48 |
| 5 | T | 1 0 0 0 0 | 17 | 49 |
| " | Z | 1 0 0 1 0 | 18 | 50 |
| ) | L | 1 0 0 1 0 | 19 | 51 |
| 2 | W | 1 0 0 1 1 | 20 | 52 |
| # | H | 1 0 1 0 0 | 21 | 53 |
| 6 | Y | 1 0 1 0 1 | 22 | 54 |
| ¢ | P | 1 0 1 1 0 | 23 | 55 |
| 1 | Q | 1 0 1 1 1 | 24 | 56 |

| ↑ | ↓ | BAUDOT 5 4 3 2 1 | LTR. DRUM POSITION | FIG. |
|---|---|---|---|---|
| 9 | O | 1 1 0 0 0 | 25 | 57 |
| ? | B | 1 1 0 0 1 | 26 | 58 |
| & | G | 1 1 0 1 0 | 27 | 59 |
| . | M | 1 1 1 0 0 | 29 | 61 |
| / | X | 1 1 1 0 1 | 30 | 62 |
| ; | V | 1 1 1 1 0 | 31 | 63 |
| | FIGS | 1 1 0 1 1 | 28 | 60 |
| | LTRS | 1 1 1 1 1 | 32 | 64 |
| | SPACE | 0 0 1 0 0 | 5 | 37 |
| | CAR. RET | 0 1 0 0 0 | 9 | 41 |
| | LINE FEED | 0 0 0 1 0 | 3 | 35 |
| | BLANK | 0 0 0 0 0 | 1 | 33 |

INVENTORS
CLAYTON H. CLARK
DONALD J. STEFANIK

BY Strauch, Nolan & Neale

ATTORNEYS
R-259

INVENTORS
CLAYTON H. CLARK
DONALD J. STEFANIK

BY Strauch, Nolan + Neale
ATTORNEYS

R-259

Dec. 13, 1966 C. H. CLARK ET AL 3,291,909

DRUM PRINTER

Filed Oct. 25, 1962 20 Sheets-Sheet 4

INVENTORS
CLAYTON H. CLARK
DONALD J. STEFANIK

BY Strauch, Nolan & Neale

ATTORNEYS

R-259

DRUM PRINTER

INVENTORS
CLAYTON H. CLARK
DONALD J. STEFANIK

BY Strauch, Nolan & Neale

ATTORNEYS
R-259

INVENTORS
CLAYTON H. CLARK
DONALD J. STEFANIK

BY Strauch, Nolan & Neale
ATTORNEYS

R-259

Dec. 13, 1966 C. H. CLARK ETAL 3,291,909

DRUM PRINTER

Filed Oct. 25, 1962 20 Sheets-Sheet 7

INVENTORS
CLAYTON H. CLARK
DONALD J. STEFANIK

BY Strauch, Nolan & Neale

ATTORNEYS
R-259

INVENTOR
CLAYTON H. CLARK
DONALD J. STEFANIK

BY Strauch, Nolan & Neale
ATTORNEYS
R-259

INVENTORS
CLAYTON H. CLARK
DONALD J. STEFANIK
BY Strauch, Nolan & Neale
ATTORNEYS
R-259

INVENTORS
CLAYTON H. CLARK
DONALD J. STEFANIK

Strauch, Nolan & Neale
ATTORNEYS

INVENTORS
CLAYTON H. CLARK
BY DONALD J. STEFANIK
Strauch, Nolan & Neale
ATTORNEYS
R-259

INVENTORS
CLAYTON H. CLARK
BY DONALD J. STEFANIK
Strauch, Nolan & Neale
ATTORNEYS
R-259

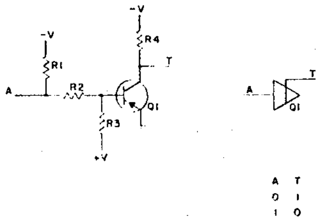
Fig. 27 INVERTER
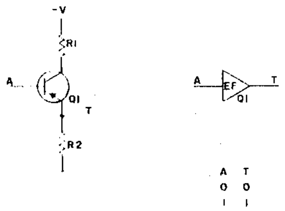
Fig. 28 EMITTER — FOLLOWER
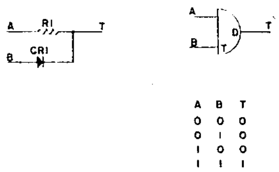
Fig. 29 SINGLE DIODE GATE
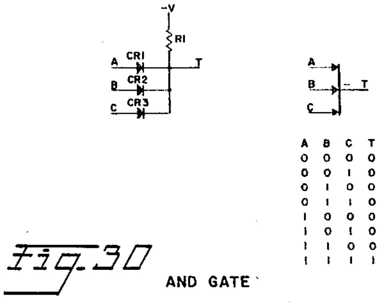
Fig. 30 AND GATE
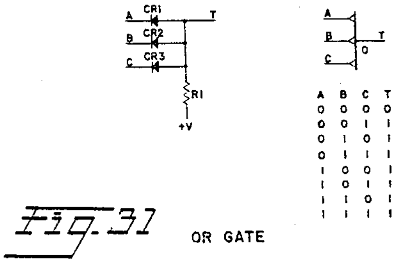
Fig. 31 OR GATE
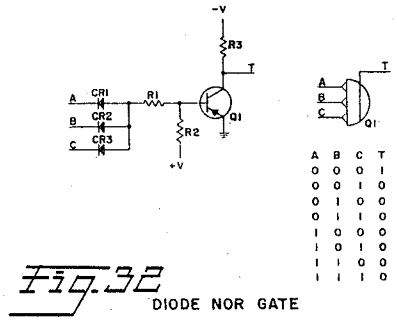
Fig. 32 DIODE NOR GATE
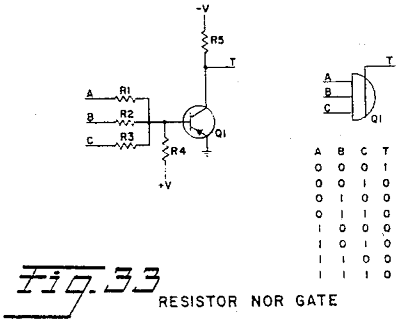
Fig. 33 RESISTOR NOR GATE
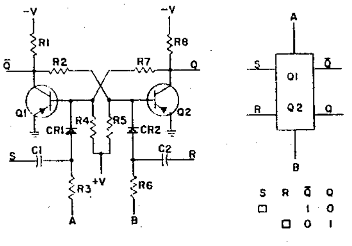
Fig. 34 REGISTER
INVENTORS
CLAYTON H. CLARK
DONALD J. STEFANIK
BY
Strauch, Nolan + Neale
ATTORNEYS
A-259

DRUM PRINTER

Filed Oct. 25, 1962 20 Sheets-Sheet 14

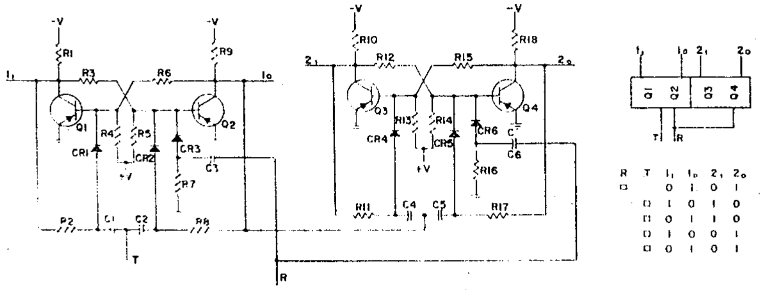

FIG. 35 COUNTER

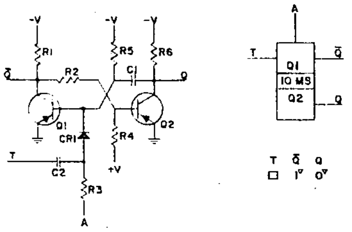

FIG. 36 ONE-SHOT

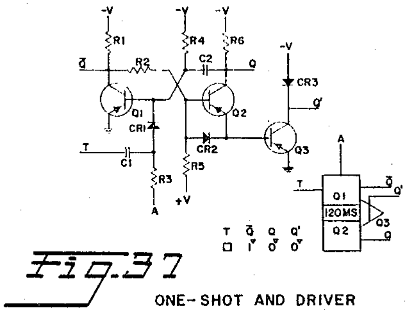

FIG. 37 ONE-SHOT AND DRIVER

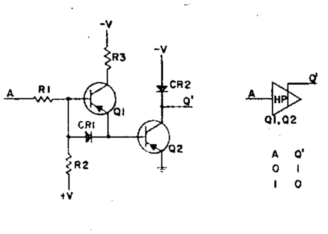

FIG. 38 EMITTER FOLLOWER AND DRIVER

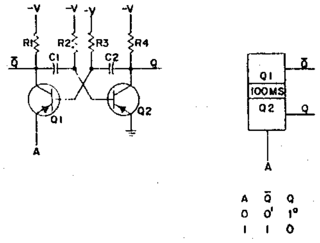

FIG. 39 FREE-RUNNING MULTIVIBRATOR

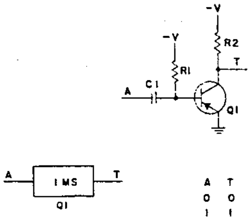

FIG. 40 TIME DELAY

NOTES:
1. 1 = NEGATIVE VOLTAGE LEVEL
   0 = 0 VOLTAGE LEVEL

2. △ — NO OUTPUT
   □ — PULSE PRODUCED BY A TRANSITION FROM 1 TO 0.
   ▽ — OUTPUT LEVEL IS OF ADJUSTABLE LENGTH.

INVENTORS
CLAYTON H. CLARK
BY DONALD J. STEFANIK
Strauch, Nolan & Neale
R-154 ATTORNEYS

INVENTORS
CLAYTON H. CLARK
DONALD J. STEFANIK

BY Strauch, Nolan & Neale
ATTORNEYS
R-259

INVENTORS
CLAYTON H. CLARK
DONALD J. STEFANIK

BY Strauch, Nolan & Neale
ATTORNEYS
R-259

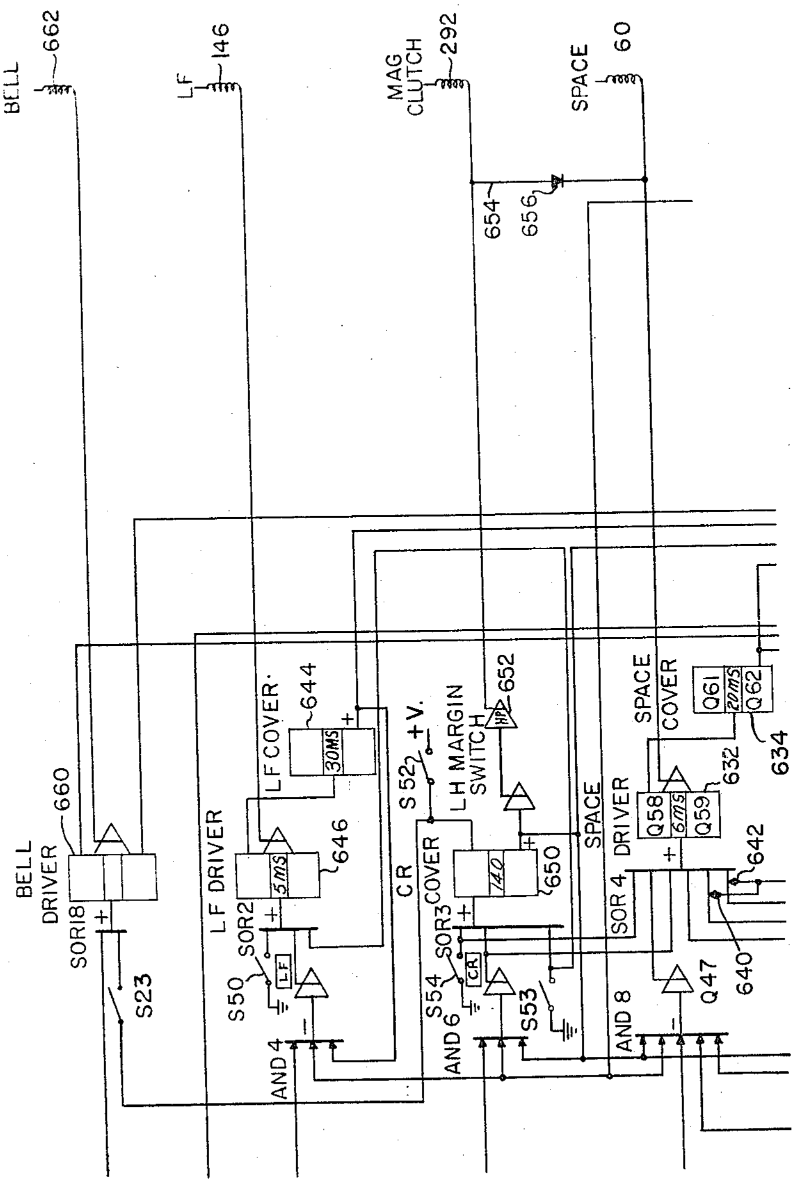
FIG. 42B
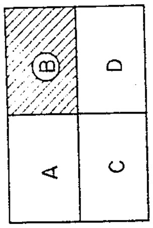
INVENTORS
CLAYTON H. CLARK
DONALD J. STEFANIK
BY Strauch, Nolan & Neale
ATTORNEYS
R-259

Dec. 13, 1966 C. H. CLARK ET AL 3,291,909

DRUM PRINTER

Filed Oct. 25, 1962 20 Sheets-Sheet 18

INVENTORS
CLAYTON H. CLARK
DONALD J. STEFANII

BY Strauch, Nolan & Neale

ATTORNEYS

R-259

INVENTOR
CLAYTON H. CLARK
DONALD J. STEFANIK

BY Strauch, Nolan & Neale
ATTORNEYS
R-259

| A | B | C | D | $\bar{Q}$ | Q |
|---|---|---|---|---|---|
| □ | | 1 | | 0 | 1 |
| □ | | 0 | | 1 | 0 |
| | □ | | 1 | 0 | 1 |
| | □ | | 0 | 1 | 0 |

NOTE ⏀ MEANS AN INHIBIT CIRCUIT FOR THE ASSOCIATED INPUT TO THE SOR GATE

SPECIAL OR GATE (SOR) WITH A REGISTER

INVENTORS
CLAYTON H. CLARK
DONALD J. STEFANIK

BY Strauch, Nolan & Neale
ATTORNEYS
R-259

United States Patent Office 3,291,909
Patented Dec. 13, 1966

3,291,909
DRUM PRINTER

Clayton H. Clark, Mundelein, and Donald J. Stefanik, Berwyn, Ill., assignors to SCM Corporation, a corporation of New York Filed Oct. 25, 1962, Ser. No. 233,109
39 Claims. (Cl. 178—25)

This invention relates to a receiving page printer utilizing a continuously rotating print drum and a traveling print hammer carriage, primarily intended for either fixed station or vehicular installation as sending monitors or printing receivers in telegraphic communication systems. Nevertheless, it is versatile and readily adapted for use with other data processing applications. This invention is particularly related to improvements, both mechanical and electronic, in a continuously rotating drum printer such as that disclosed, described and claimed in copending application, Serial No. 184,820 filed April 3, 1962.

As in the aforenoted application Serial No. 184,820, the drum printer consists of mechanical printing mechanism and printer control and actuating electronics, however the mechanism can be readily adapted to single or plural hammer printing. The electronics of the single hammer embodiment are similar, in desired control of the mechanics, to those disclosed in the aforenoted application and will be described hereinafter sufficient for understanding excepting for a specific new comparator circuit which enables comparison of the print drum rotational position with the incoming signal and directs the printing operation at the appropriate time in the rotational cycle of the drum, and some other electronic contronic control features peculiar to the present invention. The electronics of the dual hammer printer embodiment has control problems not present in single hammer printers, and will be described fully with the aid of block logic diagrams.

Briefly, in the drum type of page printer to which the present invention is applicable, the rotating drum is composed of a plurality of rings of type, the type symbols in each ring being arranged in identical sequence and aligned with matching type symbols. A print hammer, which is mounted upon a print hammer carriage assembly, is moved from left to right in front of the drum and is actuated to press an ink ribbon against the paper record and the drum at an appropriate rotational position of the drum to print a desired character at that carriage position. A pulse clock assembly on the rotation drum supplies a series of pulses, as the drum rotates, to the printer electronics in accord with the angular positions of the characters on the drum. These pulses are processed in the printer electronics and compared with the incoming or monitored keyboard signals to thereafter cause energization of the print hammer solenoid as the desired character moves in front of the hammer. Characters on each ring of type are identical and are placed in binary order according to the desired code. Each character is assigned a position in binary progression of a counter, e.g., a 64 count counter, so that the printer electronics can compare an incoming character code signal combination against the series of pulses that indicate the physical position of the drum characters. The electronics in the aforenoted application used destructive readout to obtain coincidence whereas the present invention uses continuous counting and comparison.

The electronics of a Baudot coded drum printer accomplishes operational functions as follows:

(1) Register in parallel form the five serial information bits of an incoming Baudot character.

(2) Determine whether the five bits represent either a printing or a machine function character.

(3) Determine what the machine function is.

(4) Shift the five bits of the code signal combination into a second set of registers and make room for the following character while the first character is being printed or while the represented machine function is being performed.

(5) Shift the five bits into a third set of registers to make room for two characters during the carriage return periods.

(6) If ribbon lift is utilized, control the ribbon lifting operations so that ribbon will be raised and in print position before the print solenoid is energized.

(7) Under control of character position pulses from the printing mechanism, determine when the registered character is about to pass the print hammer.

(8) Control energizing of the print solenoid.

(9) Control operation of the spacing mechanism after the character is printed.

(10) Control operation of the carriage return and line feed mechanisms.

The foregoing functions are accomplished in the printers of this invention as well as that in copending application Serial No. 184,820.

Primarily, the improvements of this present invention involve the universal print hammer carriage assembly, correlated mechanisms for spacing and returning the print hammer carriage, mechanical components to accomplish selectively variable record paper feed which will be referred to as line-feed hereinafter. As compared with the printer mechanics described in copending application Serial No. 184,820 the mechanism for hammer carriage spacing and powered carriage return movement have been greatly simplified and the number of components required for these functions has been materially reduced. The line-feed mechanism has been substantially improved and made more versatile by utilizing a motor driven power feed rather than a solenoid operated feed and by using a controllable line feed to enable variation in the number of lines.

The present invention utilizes a comparison system between an incoming code and a code derived from drum printer rotation rather than destructive read-out. Either type of comparative circuit can be utilized in the drum printer. However in the comparison system utilized in the present invention, applicants have devised a new comparator circuitry and network to provide comparison and furnish a coincidence information signal. The print hammer carriage of the present invention is universal in that it may be used as a single print hammer carriage or a dual print hammer carriage. Each print hammer and its associated operating mechanism, consisting of an electro magnet and an operating armature, can be removed or installed without affecting the operation of the other print hammer assembly. A further improvement resides in the elimination of mechanical operated control switches at the various limits of travel of the print hammer carriage and, instead, the print hammer carriage uses a high strength miniature permanent magnet secured in the print hammer carriage to magnetically operate glass encapsulated reed switches to control the printer electronics for various automatic functions.

Accordingly, a primary object of this invention resides in the provision of an improved high speed drum printer.

A further object resides in the provision of a novel high speed drum printer including plural print hammers. In conjunction with this object it is also an object to provide the plural hammer printer with associated novel electronic printer receiving and control circuitry.

Another object resides in the provision of an improved high speed drum printer including a novel shifting hammer carriage with universal aspects enabling incorporation of single and plural hammers and hammer operating components. In conjunction with this object, it is an object to provide the hammer carriage with a removable novel universal dual or plural hammer mounting and guide block.

Still another object resides in the provision of an improved high speed printer with continually rotating type carrier and a traveling hammer carriage with at least one low mass print hammer and hammer operator carried by the carriage, the coaction between the hammer and the operator enabling efficient direct force transfer by a rolling pairing in accomplishing the printing stroke. In conjunction with this object, it is a further object to utilize a light spring to forward bias the hammer operator and a relatively heavier spring to return bias the hammer, providing coordinated spring forces to prevent hammer rebound and dampen bounce tendencies resulting from hammer return movement after printing impact.

A still further object resides in the provision of an improved rotary type carrier printer including a hammer carriage with printing components shiftable in spacing steps from left to right in front of the rotary type carrier, the carriage being shiftable back to a start-of-line position by a positive drive, carriage return mechanism operated by an electro-magnetic clutch. In conjunction with the preceding object, it is a further object to provide carriage control mechanism wherein mechanical spacing is under the control of spring bias in spacing direction and a solenoid actuated bail coacting with a stepping pawl unit adapted to be moved into and completely out of engagement with a fixed space rack for each mechanical spacing step. In further conjunction with the two preceding objects, it is a further object to provide controls which enable, in a plural hammer carriage, a predetermined related occurrence of electronic and mechanical spacing. Still another object in conjunction with the three preceding objects, is the provision of controls which simultaneously energize the magnetic clutch and the space solenoid whenever a carriage return operation is directed.

A further object resides in the provision of a rotary type carrier printer having a shifting hammer carriage which is step spaced under spring bias, is controlled by a solenoid operated space pawl and fixed rack assembly, and is returned to start-of-line condition by an electromagnetically engaged power shaft driven clutch and return tape drum assembly.

A still further object resides in the provision in a type wheel page printer of a novel print hammer carriage operating mechanism, the mechanism step spacing the carriage under spring power, and including a positive drive carriage return mechanism operated through a magnetic clutch, and having controls for automatic disabling of the carriage shift pawl upon the start of the carriage return movement and re-engagement of the carriage shift pawl when the carriage reaches a start-of-line position. In conjunction with the preceding object a further object resides in providing a novel back lash preventing mechanism, operated by the carriage approach to start-of-line position, cooperating with the carriage return tape drum to provide a positive lock on the tape drum and to prevent a rebound of the drum, when the magnetic clutch is disengaged, sufficient to loop the tape off of the drum. In conjunction with the two aforedescribed objects, a further object resides in the provision of a light force, small diameter, elongate tension coil spring anchored to the printer and also connected to be wound on the carriage return tape drum during carriage spacing movements while the return tape drum is not coupled to its drive shaft to provide a light return bias on the tape drum and on the return tape during the carriage spacing operation.

Still another object resides in the provision of an improved page printer with novel record medium line-feed mechanism powered from a power shaft driven, rotatable start-stop cam assembly and a cam follower linkage operating a pawl and ratchet transmission to the record engaging feed components, having means to vary the magnitude of the actual stroke of the cam follower as imparted by the power driven cam assembly. In conjunction with the foregoing object, it is a further object to accomplish the start-stop line-feed cycle by a solenoid and to include electronic printer control circuitry which automatically accomplishes a line-feed cycle energization of the line-feed solenoid for every carriage return operation.

A further object resides in the provision of a novel rotatable type carrier printer with a print hammer carriage movable in spacing steps from left to right in front of the carrier, an impulse clock device connected to rotate with the type carrier, the printing being operated by electronic circuitry providing coincidence between a code signal received and character position impulse signals derived from carrier rotation for causing the print hammer to strike the carrier when an appropriate desired character to be printed is in print position and thereafter to space an appropriate distance across the page to enable subsequent operation in accord with the next received signal. In conjunction with the preceding object a further object resides in the provision of an improved print hammer carriage mounted pawl stepping mechanism cooperating with a tooth rack and controlled by a solenoid operated bail. In this connection whenever plural print hammers are utilized in the hammer carriage assembly, appropriate plural step mechanical spacing can be accomplished by appropriate spacing between teeth on the tooth rack, and single step spacing intermediate the mechanical plural spacing steps is accomplished electronically by hammer selection.

It is a further object, in conjunction with the objects in the previous paragraph, to provide a selectively adjustable mount for the reading heads in the impulse clock mechanism to enable vertical alignment of a print line to a desired vertical position on a record medium.

Still another object resides in the provision in a printer of a novel universal print hammer mounting assembly utilizing, in unitary combination, either a single or plural hammers and single or plural hammer operators.

A still further object resides in the provision of a shiftable print hammer carriage for a rotatable type carrier page printer in which the carriage has a universal body to mount single or plural hammers with associated single or plural hammer operators, a space pawl unit and a permanent magnet serving as a carriage position signal operator.

Another object resides in the provision of a novel print hammer carriage having at least one low mass hammer head on the end of a miniature hammer lever and including a short hammer lever operating arm, and a miniaturized electro-magnet with an armature operator including a relatively long lever arm engaging the short hammer lever arm and adapted, when energized, to transfer movement and impart momentum to the print hammer lever for a printing operation. In conjunction with the foregoing object, a further object resides in the provision of involute contours at the respective engaging surfaces of the armature operator and the short arm of the print hammer lever to accomplish a rolling operative engagement during printing force transfer.

Still another object resides in the provision of a novel assembly of a miniaturized print hammer lever and a miniature electro-magnet with armature operator lever for use in combination with a universal mounting device for single or plural hammer printers, wherein energization of the electro-magnet results in a smooth force transfer of movement from the armature lever to the hammer lever with resultant inertia movement of the hammer lever away from the armature lever to accomplish momentum printing impact with a type carrier, the hammer lever being biased in a return direction by a compression spring and the armature operator being forward biased toward energized position with a spring having lighter spring force than the hammer lever spring, to provide damping of rebound and bounce tendencies of the components upon the return stroke of the hammer.

A still further object resides in a provision of a novel selectively variable record medium line feed mechanism for use in typing or printing mechanism. In connection with the preceding object, a further object resides in providing an improved line feed mechanism in which the power stroke is selectively variable.

Still another object resides in a provision of a novel electronic comparator circuit adapted to be connected between two binary information registers to provide an information output signal indicating coincidence of information in the two registers.

Another object resides in the provision of novel electronic control circuitry for determining coincidence between first and second binary information register groups, a first of which groups registers, stores and places a selected one of a plurality of binary information signal combinations on a series of dual outputs from respective first group registers and the other group providing changing binary information on a series of dual outputs from respective second group registers, the comparing circuitry consisting of a comparator network group of network circuits between the dual outputs from correlated registers in the two register groups, each comparator network circuit including diode-resistor series paths between individual ones of the dual leads of a first group register and reversed individual ones of the dual leads of the corresponding second group register, and a common lead connected to all diode-resistor junctions to pass an information signal when all junctions are at a balanced level condition indicating complete coincidence, each connection from the common lead to a junction including a diode and each diode being connected to permit current flow toward the associated junction.

A further object resides in the novel provision of magnetically operated switches to determine the hammer carriage position in a drum printer and to provide control signals in accord with such positions. In this connection the invention contemplates utilization of a miniature, high power permanent magnet operator fixed on the hammer carriage to travel in a fixed path having located adjacent thereto, glass encapsulated magnetically operated reed switches.

Further novel features and other objects of this invention will become apparent from the following detailed description, discussion and the appended claims taken in conjunction with the accompanying drawings showing the subcomponent structures and units constituting the present invention, in which:

Figure 26A:
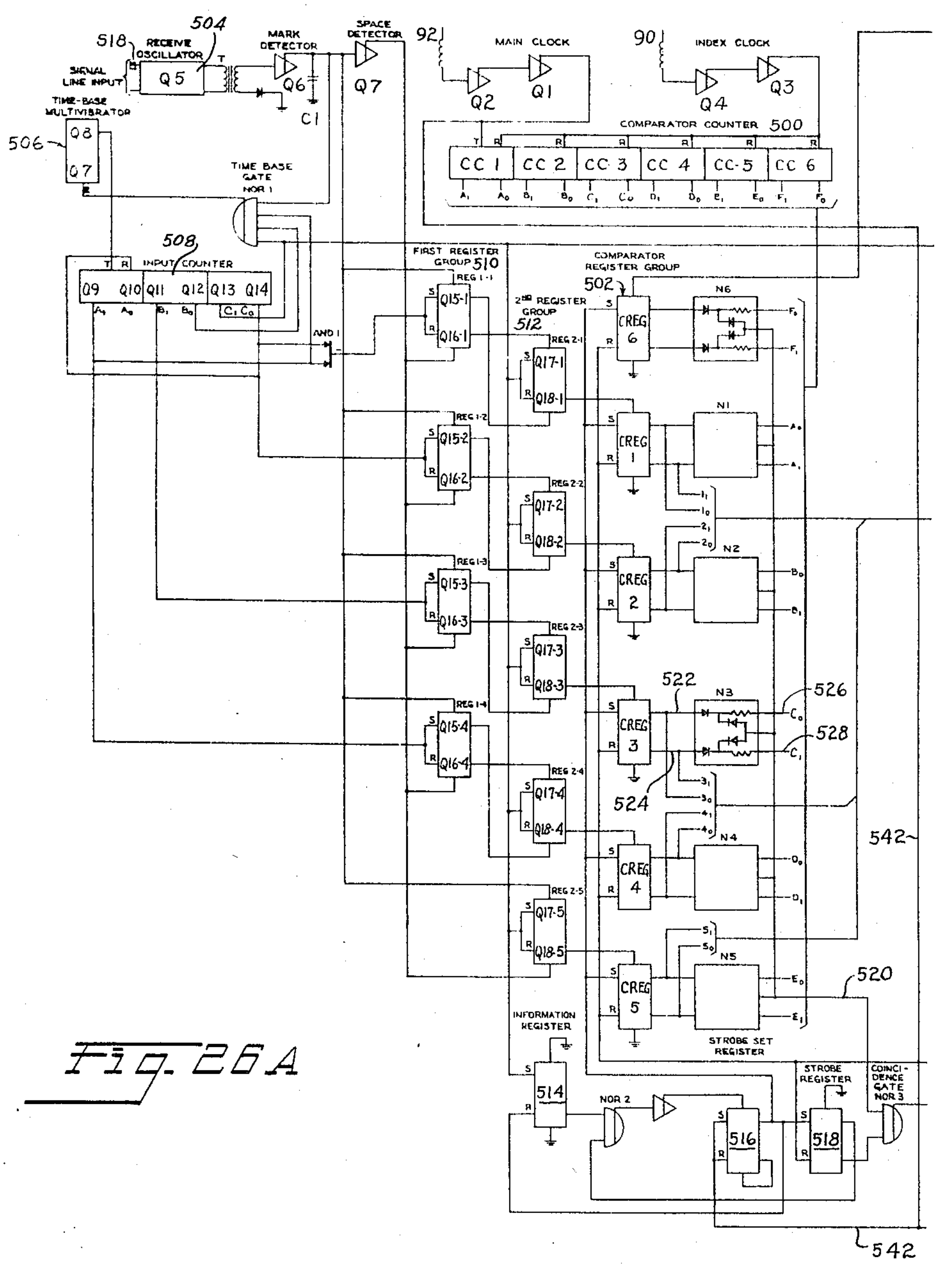
Figure 26B:
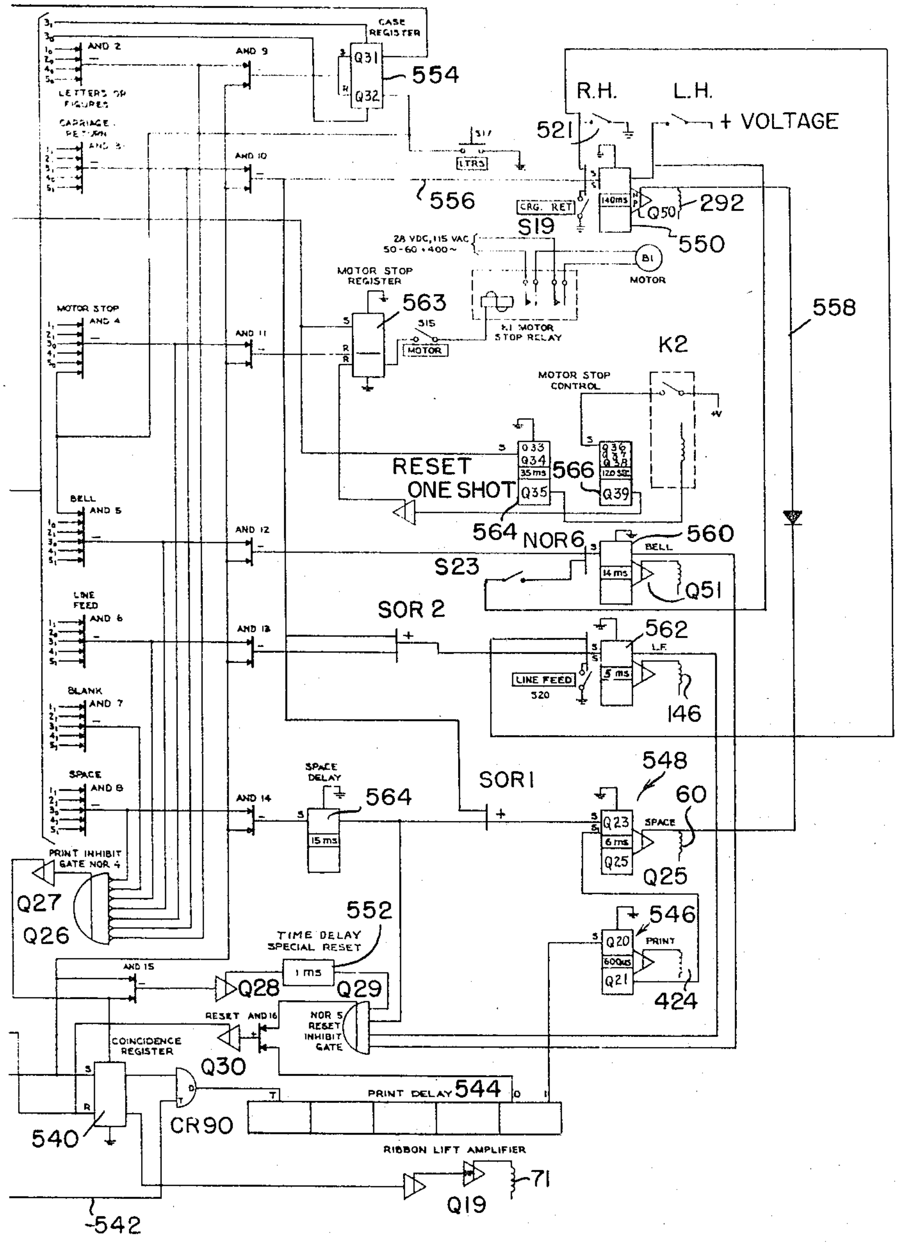
Figure 41:
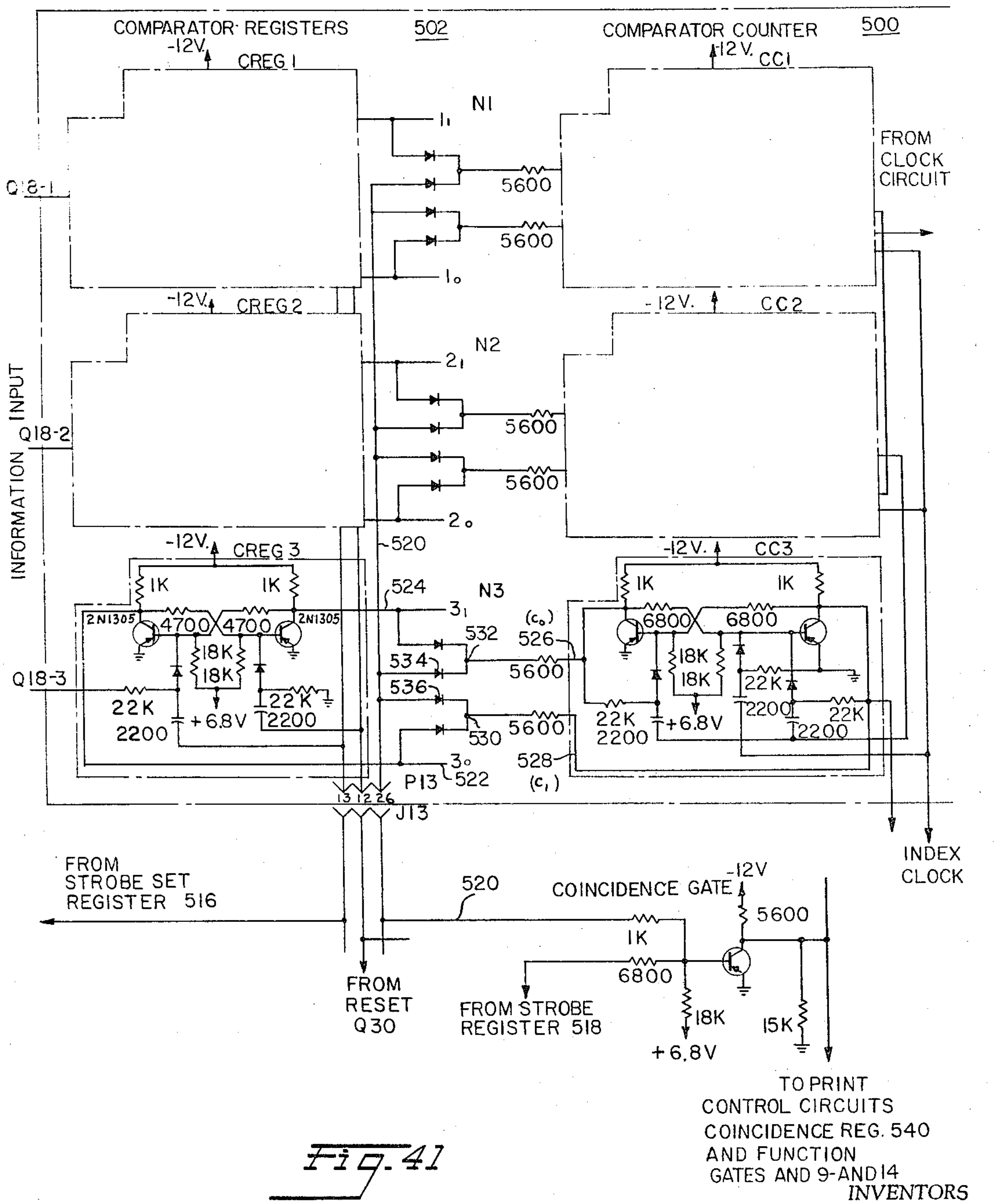
Figure 42A:
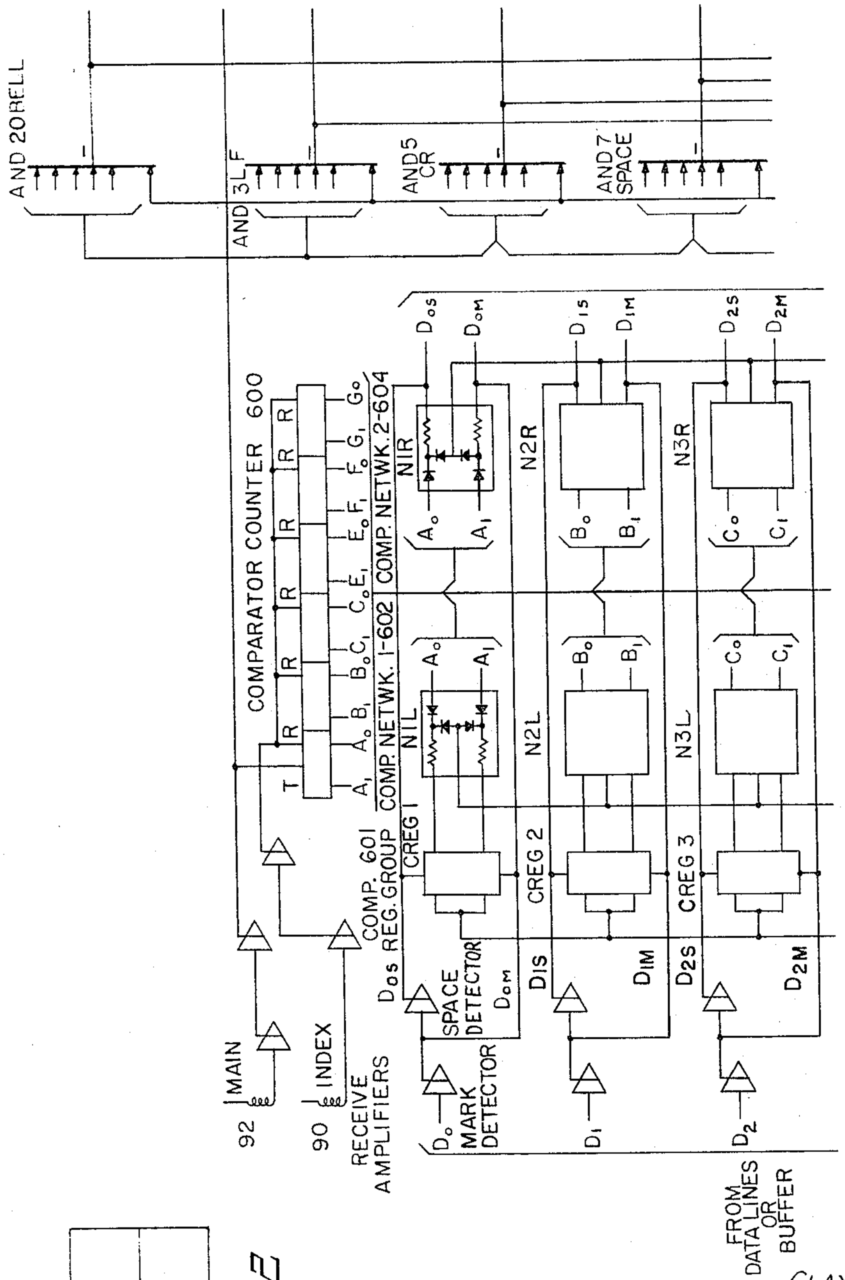
Figure 42:
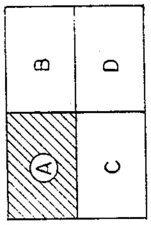
Figure 42C:
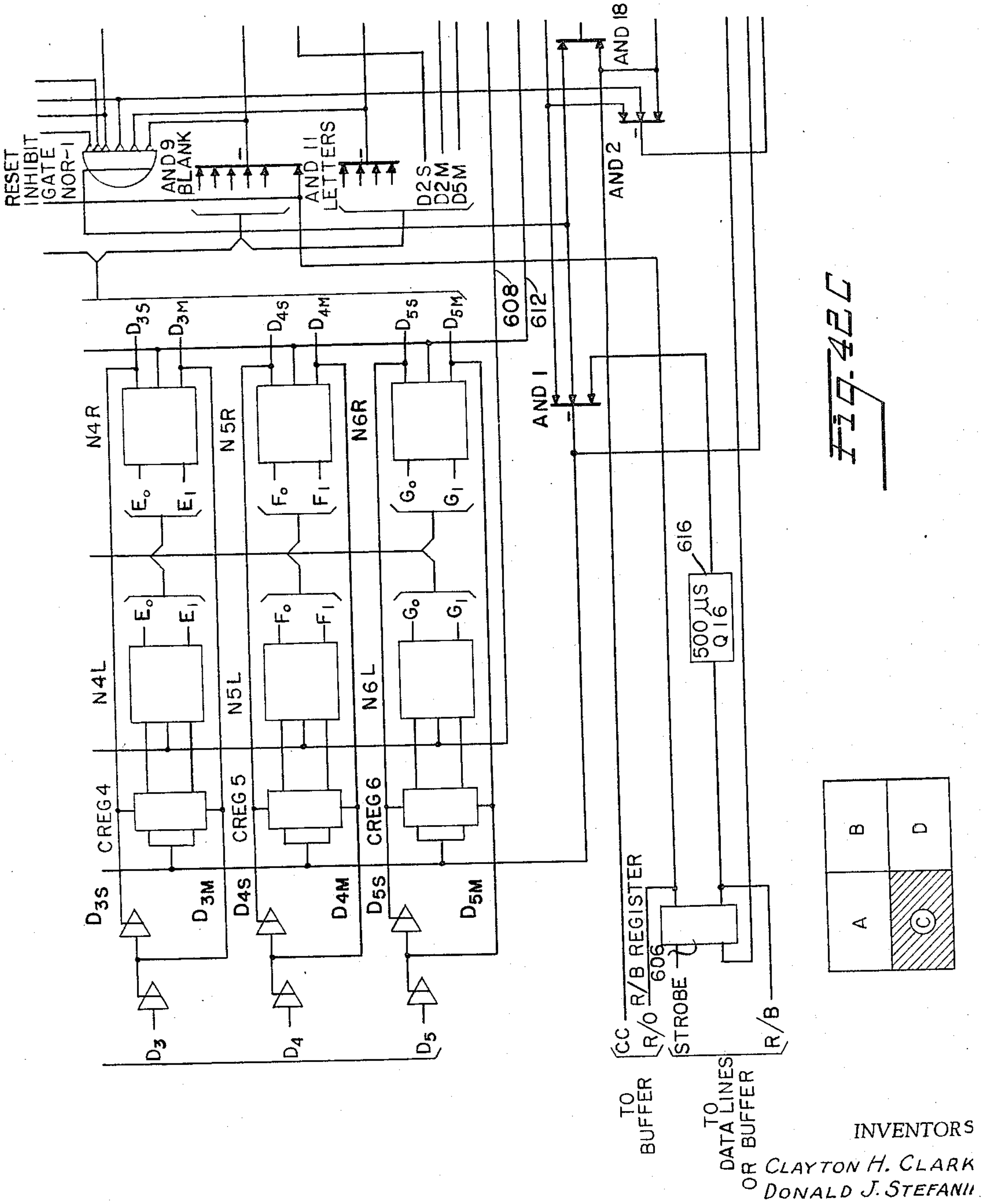
Figure 42D:
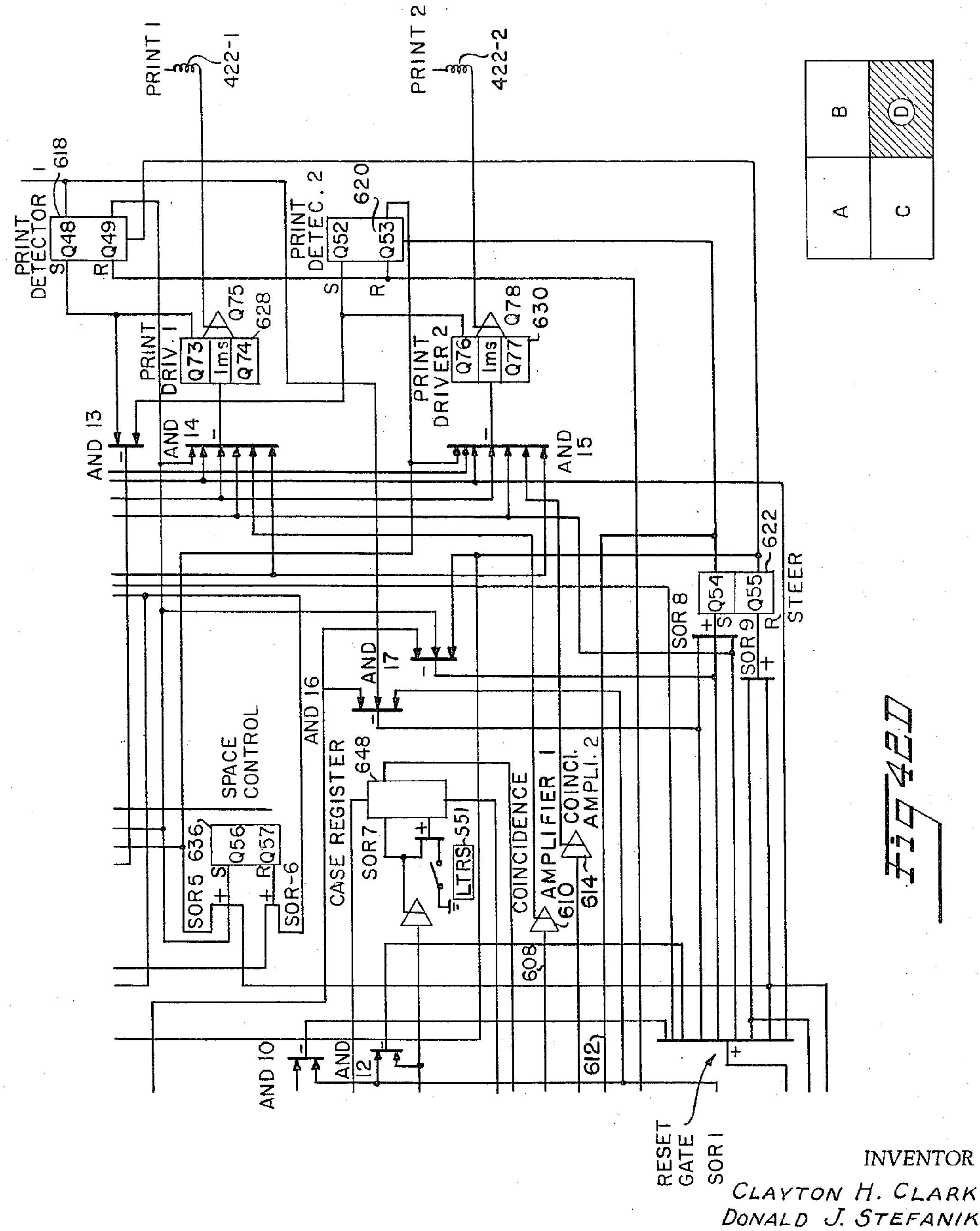
Figure 43:
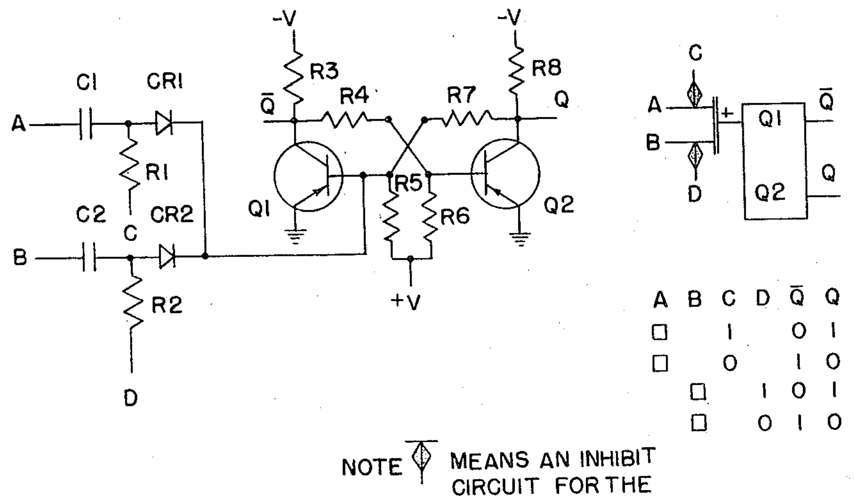

FIGURES 26*a* and 26*b* together constitute FIGURE 26 which is a schematic block diagram of the electronics circuitry for a single hammer printer arranged for reception of the Baudot code;

FIGURES 27 to 40, each illustrate a basic schematic circuit corresponding to a specific one of the logic symbols used in FIGURE 26. These circuits in essence constitute a legend enabling basic construction of the transistorized electronics represented by the FIGURE 26 logic diagram;

FIGURE 41 is a detail schematic diagram showing several comparator registers, their associated comparator counter flip-flops and the novel comparator network of this invention connected between correlated registers to enable an information signal responsive to coincidence between correlated registers;

FIGURE 42, separated into four sheets containing FIGURES 42*a*, 42*b*, 42*c* and 42*d*, is a schematic block diagram of an exemplary electronics circuitry for a dual hammer printer arranged for reception of the Baudot code; and FIGURE 43 is a basic schematic circuit, showing the special OR gates (SOR) which appear in FIGURE 42, together with its logic symbol and logic.

GENERAL

Figures 1, 2:
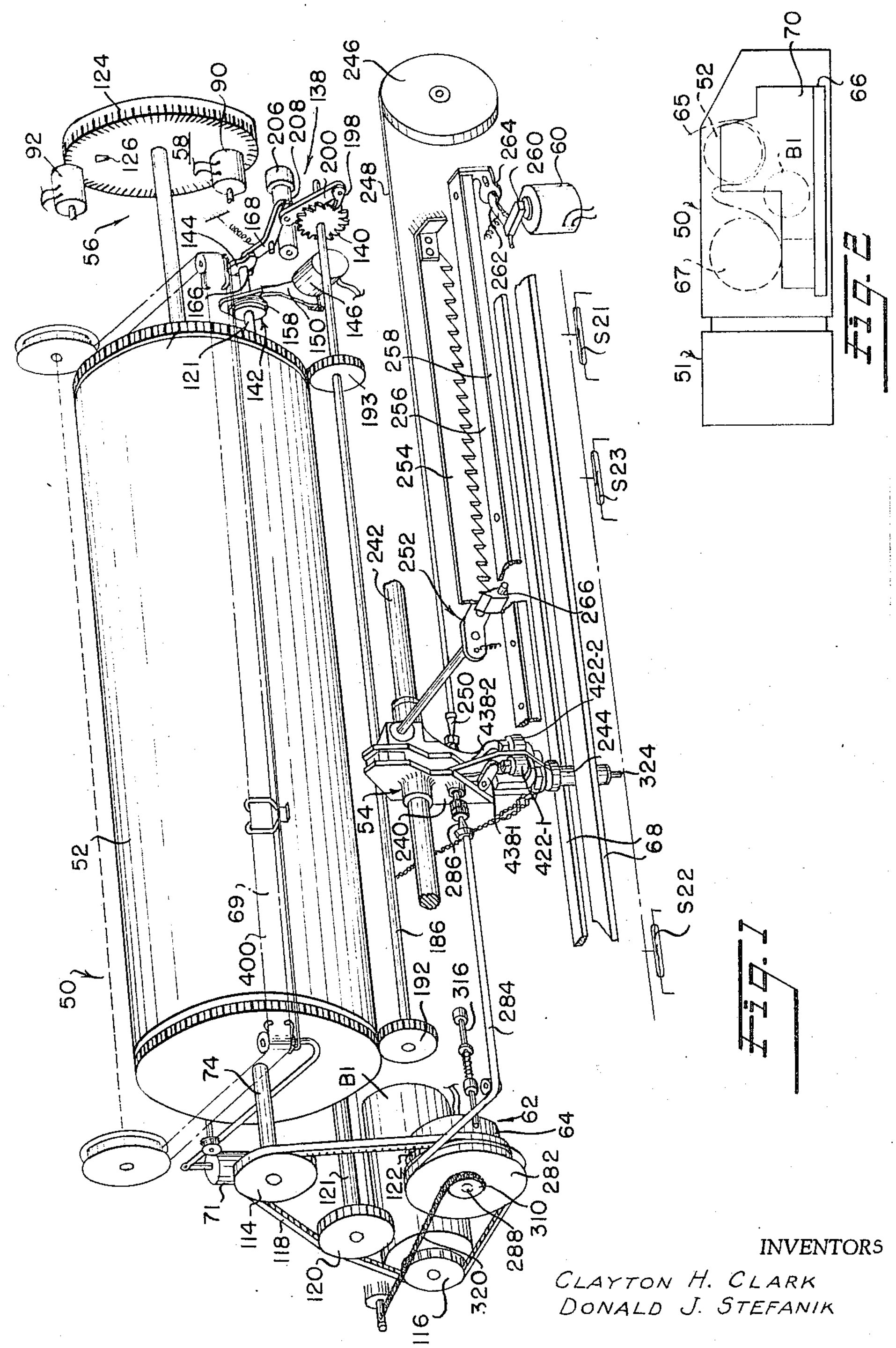
FIGURE 1 is a front perspective skeleton view illustrating the major mechanical components of a drum printer in accord with the present invention. Although this view omits many details utilized in such a drum printer they are not deemed necessary to an understanding of the present invention.
FIGURE 2 is a reduced scale, side view of the complete printer with a module containing the printer electronics at the rear.

The major mechanical components of a drum printer, including those pertinent to this invention, are shown in the skeleton arrangement of FIGURE 1 and will be generally described before proceeding with a detailed description of certain mechanisms. The frame structure of the printer, the ribbon feed and reverse mechanism and various manual control switches are not shown in FIGURE 1, however a representative somewhat similar drum printer assembly can be found in copending application Serial No. 184,820 to which reference may be had, if necessary, for a complete understanding of the printer construction.

The printer is designed primarily for use in a send-receive tele-printer set, being used for page copy monitoring and/or page copy receiving. The keyboard transmitter disclosed and claimed in application Serial No. 184,820, can be conveniently mounted on the front of the printer resulting in a complete transmitter-receiver with local monitoring.

The single hammer embodiment is capable of operating at nominal average speeds up to and including 200 w.p.m. on a half duplex neutral signaling channel. If dual print hammers are utilized, with double step character spacing, average operational maximum speed is appreciably increased, up to at least 400 w.p.m. Further multiplication of the number of print hammers with a correlated increase in character spaces per stepping action will result in the attaining of higher operational speeds.

By various suitable arrangements of the printer electronics and by using different fonts of type faces on the print drum the printer can accommodate codes other than the five-unit Baudot code, for example, the seven-unit alfa-numerical fieldata code could be utilized if desired. However, only exemplary Baudot code electronics for single and dual print hammer printers are disclosed therein.

In general, the printer mechanism 50 employs a motor driven rotating type drum 52 which, for standard communications printers, will have 72 rings of type, each type ring having the 52 standard communications symbols. The drum can be constructed with double type ring discs, the construction of the drum and the discs being fully described and claimed in the aforenoted pending application Serial No. 184,820 and, per se, are not a part of the present invention.

Characters on each ring of type are similarly placed in binary order according to the Baudot code for the character, each character being assigned a position in a 64 count binary progression so that the printer electronics can compare an incoming character code against a code combination representative of the series of pulses subsequent to an index position which indicates the physical position of the drum characters relative to that indexing position. When comparison matches, coincidence, the electronics logic can determine exactly when to actuate the print hammer for printing the character when the drum rotates that character in front of the print hammer.

The complete drum 52 includes on its cylindrical periphery a plurality of different horizontal lines of identical information symbols, for a conventional telegraph printer, seventy-two (72) identical symbols, e.g., seventy-two A's, constituting one line of identical character type faces extending along the cylindrical drum periphery parallel to the drum axis. The drum 52 and an attached drum position clock wheel 58 are continuously rotated by a printer motor B1 when the motor is running. Related printer electronics will be described hereinafter with reference to the printer logic diagram FIGURE 26.

As depicted in FIGURE 1, a print hammer carriage assembly 54 is mounted for stepped spacing movement in a horizontal path from left to right and return movement from right to left in front of the type drum 52. The illustrated hammer carriage assembly 54 is universal in nature and can accommodate one or two print hammers with associated operating components.

Depending upon the style of drum and the arrangement of printer electronics utilized, a print hammer mechanism could be energized to strike the drum one or more times during a 360° rotation of the print drum. In the exemplary single hammer disclosure however, a print action can occur within a range from 180° rotation to 540° rotation, because of a built-in delay permitting 180° rotation of the drum after coincidence is determined to assure sufficient time for lifting the ink ribbon to print position before the directed printing action. Also, in the single print hammer embodiment, a drum rotation of 360° is required to obtain the next coincidence for a repeated character, which is followed by the 180° delay. In the dual hammer embodiment print action can occur within a range from 0° to 360° rotation, if the ribbon lift action is omitted.

The printing mechanism includes an induction pulse clock assembly 56 which supplies one index pulse and a series of character position pulses to the printer electronics, representative of drum rotational position. As will be described hereinafter, the index pulse is used only to initially synchronize the electronics when the printer drum is started to rotate. Since each character position pulse represents a different character reaching a definite drum rotational position, the pulse constitutes information which allows the printer electronics to energize the print hammer solenoid as the desired character moves in front of the hammer, or to actuate different machine functions if the received code signal combination are function signals.

The print hammer carriage 54 is stepped across in front of the drum 52 and parallel to the drum axis by spacing mechanism actuated by a spacing solenoid 60 mounted at the right hand side of the printer. Carriage 54 is power driven to a start-of-line position at the left-hand margin by a carriage return mechanism 62, seen at the left hand side of FIGURE 1. Carriage return mechanism is activated by the carriage return magnetic clutch 64, power for carriage return being derived, through clutch 64, from the printer motor B1.

Shown diagramatically in FIGURE 2, a sheet paper strip record medium 65 is supplied from a paper roll 67 mounted behind the drum 52, the paper strip feeding over suitable guide devices (not shown), under and up past the front of the drum 52, passing between the drum 52 and the print hammer carriage 54 and under two side edge top guide fingers (not shown). The paper strip 65 then passes on out of the top of the printer unit 50.

Paper feed is enabled by cooperation of two large friction banded feed wheels at the ends of the drum and two pressure rolls (see FIGURE 6) under the drum which press the paper against the two large feed wheels which are selectively, incrementally driven.

Seen in skeleton form in FIGURE 1, an ink ribbon 69 passes across the drum face parallel to the drum between the print hammer and the paper to transfer the type impression from the drum to the page during a print operation. The ink ribbon assembly feed and reverse mechanism is conventional and details are not shown. However, the ink-ribbon 69 in this printer passes in a straight stretch across the front of the drum 52 parallel to the character spacing path of the print hammer, and the entire straight stretch of the ink ribbon if desired can be lowered and lifted by action of a ribbon lift solenoid 71 to a position in front of the hammer just prior to each printing action. This operation enables viewing of the line being printed without its being obscured by a permanently placed stretch of ink ribbon. Mechanism to accomplish this ribbon lift function is described and claimed in the aforenoted application Serial No. 184,820 and, per se, is not a part of this invention. As described later in this specification the exemplary single hammer electronics accomplishes ribbon lift but ribbon lift is omitted from the dual hammer electronics.

The printer components are mounted on a support structure which includes a thick base plate 66 (FIGURE 2) incorporating a slotted center track 68 (FIGURE 1) which passes laterally from one side of the printer to the other and under the path of travel of the print hammer carriage 54. Two vertical side plates 70 and 72 (see FIGURE 4) are rigidly secured to the base plate 66 and provide mounting structure for most of the printer components. Support structure details are not shown in FIGURE 1, but portions of the base plate and side plates can be seen in some of the other figures.

The printer electronics is preferably transisterized and mounted either in a module 51 (FIGURE 2) on the back of the printer mechanics or incorporated in large printed circuit boards secured on the underside of the printer frame structure.

The electric drive motor B1 supplies rotational driving power to the printer mechanism 50 by means of a drive belt 118 which connects the motor to the drum shaft, a function power shaft and a carriage return clutch. Drive belt 118 passes around a drive pulley 116 attached to the motor shaft and to three driven pulleys 114, 120 and 122, which will be later referred to in more detail. To prevent slippage, the drive belt is notched and engages corresponding gear teeth in each pulley.

*Details of printer mechanism*

Figure 4:
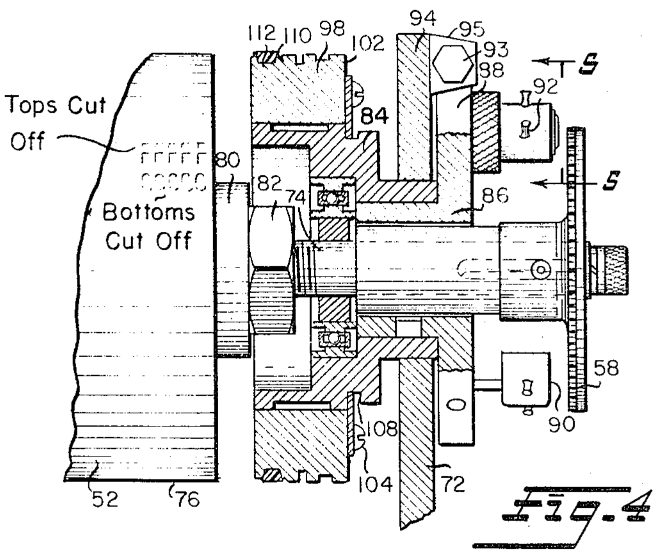
FIGURE 4 is a partially sectioned detail view in elevation, illustrating the right-hand end of the print drum, its rotational mounting, one paper feed wheel and the clock assembly with its adjustable reading head timing support disc.
Figure 6:
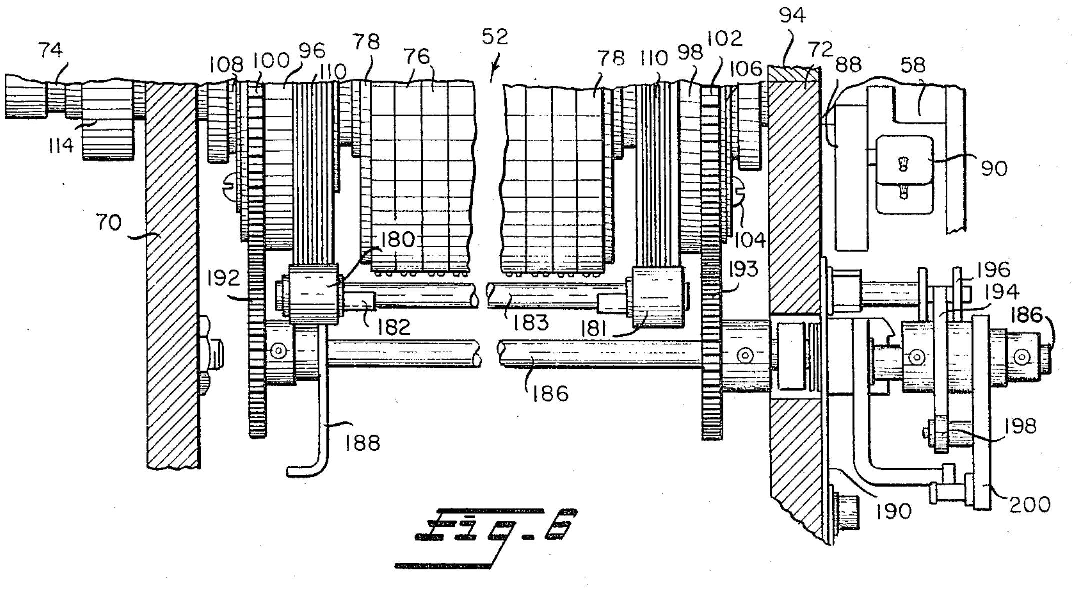
FIGURE 6 is a partially sectioned elevation view of the lower half of the print drum illustrating the relationship between the print drum, the frame end supporting plates and the paper feed components.

Referring particularly to FIGURES 1, 4 and 6 the print drum 52 is preassembled in an lightweight inexpensive manner from a plurality of discs, preferably double type row wheels 76, manufactured to very close tolerances. A desired number of type wheels 76 are placed on the drum shaft 74, indexed to align all characters and clamped together by two end clamping plates 78, adjacent spacers 80 and nuts 82, the latter being threaded and torqued very tightly on intermediate threaded sections of the drum shaft 74. Both sets of clamping plates 78, spacers 80 and nuts 82 are suitably locked together, after the clamping pressure is achieved.

Figure 3:
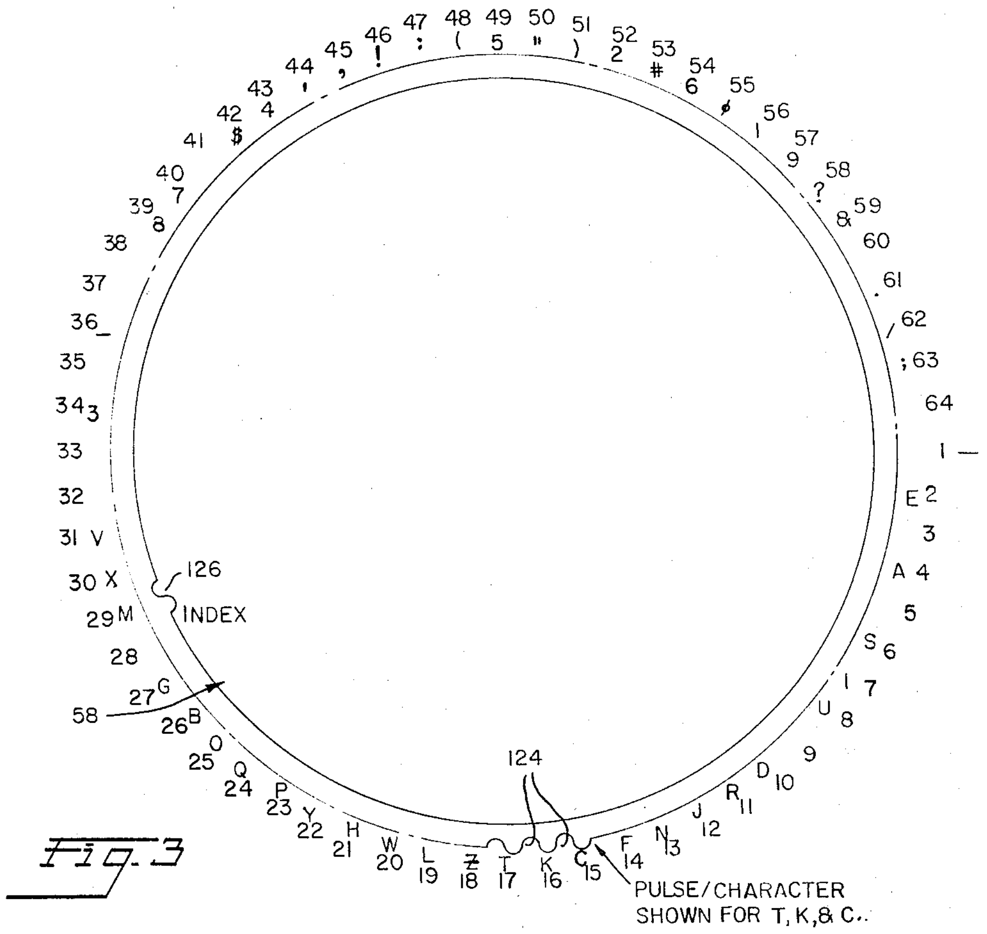
FIGURE 3 is a chart showing relative drum positions for each of the characters and the Baudot code assigned to each character.

The five unit Baudot code permits of 32 different code data combinations and, by using a Letters and Figures case shift register in the printer electronics, or by transmitting a sixth code bit representing case, 64 code data combinations can be realized. Accordingly, in the exemplary printer, 64 positions (see FIGURE 3) are provided around the periphery of each type wheel 76 in the drum and all desired characters (letters and figures) are accurately located at specific angular positions which enables accurate character positions determination by means of a 64 notch induction pulse clock wheel 58.

The clock wheel 58 is non-rotatably secured to the right hand end of drum shaft 74 and has peripheral character reference notches 124 properly located relative to the angular positions of the print characters on the drum 52 and one index notch 126 located radially inside of the path of notches 124. The positioning of the monitor heads 90 and 92 will provide one indexing pulse and 64 reference pulses once during each rotation of the print drum 52, although the index pulse is utilized only whenever the print drum starts to rotate. As the clock wheel 58 rotates with the print drum 52, the moving notches vary the reluctance of bar type magnets located in the clock monitor head coils 90 and 92 inducing appropriate current pulses into associated transistor amplifiers, as is described hereinafter.

A left hand bearing retainer assembly is placed over the left hand end of the drum shaft 74. A somewhat similar right hand bearing retainer assembly 84 (FIGURE 4) and shaft bearing are placed over the right hand end portion of drum shaft 74. The right hand bearing assembly 84, shown in FIGURE 4 is telescoped over a sleeve boss 86 which is integral with and projects from one side of a clock head mounting and timing disc 88. The disc 88 mounts the two printer clock monitor heads 90 and 92 in desired positions, as diagrammatically illustrated in FIGURE 1. By means of the two adjusting screws 93 and 93', illustrated in FIGURE 5, the angular position of the timing disc 88 relative to the print line can be adjusted to make incremental changes of the index and reference pulse count positions for purposes to be discussed hereinafter.

Figure 5:
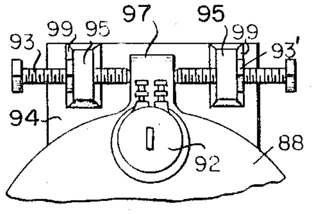
FIGURE 5 is a detail end view of the reading head timing support disc taken on line 5—5 of FIGURE 4.

The drum end bearing retainers are clamped in sockets on top of respective printer frame end plates 70 and 72 by clamping caps such as the right-hand clamp cap 94 seen in FIGURES 4 and 5. The right-hand end plate cap 94 has two spaced apart lugs 95 on its outer face, the lugs having threaded bores that receive the two opposed timing disc adjusting screws 93 and 93', the ends of which engage an integral angular positioning finger 97 on the timing disc 88. Adjusting screws 93 and 93' are locked in adjusted position by lock nuts 99.

The purpose of the timing disc adjustment is to insure proper time correlation between the received character coincidence count pulse from the character clock head to the printer electronics and the print strokes of the hammer or hammers, correlation depending upon the angular fixed position of the clock heads, so that the printed characters are not cut off at the top or bottom as depicted in FIGURE 4.

To determine need of adjustment the printed characters (FIGURE 4) are checked visually while the unit 50 is receiving a message from a sending device. If adjustment is necessary, the right bearing cap machine screws are loosened so that the sleeve boss 86 of timing disc plate 88 is held friction tight. The adjusting screw lock nuts 99 (FIGURE 5) are loosened to permit backing the adjusting screws 93 and 93' away from the timing disc finger 97.

If the tops of the printed characters are being cut off, the rear adjusting screw 93' is turned in until the printing requirement is met, and its hexagonal nut 99 tightened. If the bottom of the printed characters are being cut off, the front adjusting screw 93 is turned in until the requirement is met, and lock nut is tightened. The bearing cap machine screws are tightened and the other adjusting screw is positioned against the opposite side of the timing disc finger 97, and locked with its lock nut.

Referring to FIGURE 4, before the hubs of the drum end bearing retainers are positioned and clamped in their sockets by the clamp caps, left and right-hand record medium feed wheels 96 and 98, with associated ring gears 100 and 102 are placed on external bushing sleeves made integral with the associated bearing retainers. The feed wheel gears may be integral or separable from the feed wheels. In the latter case they are clamped to the respective feed wheels 96 and 98 by screws 104. In either case split annular ring clamping plates 106 could be fastened to the sides of feed wheels 96 and 98 and fit into and ride in grooves 108 in the non-rotatable end bearing retainer body, thereby axially maintaining the feed wheels 96 and 98 in desired positions adjacent each end of and rotatable relative to the print drum.

A rubber ring 110 is stretched over the periphery of each feed wheel 96 and 98 and fitted into half circle grooves 112 in the periphery of its feed wheel. The rubber ring can be preformed or it is cut or ground down so its outer periphery is almost even with the feed wheel periphery, thereby serving as a friction tire or band to engage and line-feed the page record medium, by means to be hereinafter described. Note, the feed wheels are rotatably mounted on the bearing retainers which in turn are clamped in adjacent printer frame end plates 70 and 72 and the shaft of the print drum 52 is rotatably mounted in and extends through the bearing retainers. Drum and feed wheels rotate completely independent of each other.

The left-hand end of the drum shaft 74 projects beyond the left-hand frame end plate 70 and a gear toothed pulley 114 is non-rotatably secured thereto by set screws. Turning back to FIGURE 1, the printer motor B1, which will be mounted on the printer support structure inside of frame plate 70, is disposed with its shaft parallel to the drum shaft 74 and carrying a toothed drive pulley 116. The notched drive belt 118 meshes with the teeth in motor pulley 116, and with the other three pulleys, the drum pulley 114, a function shaft pulley 120 and a carriage return clutch input pulley 122. As has been described hereinbefore, whenever the printer motor B1 is energized, the drum 52 will be continually rotating, and printing occurs "on the fly."

*Line-feed.*—Referring generally to FIGURE 1 and specifically to FIGURES 6–9, the record paper 65 is fed through the printer one line (or more) at a time by the action of the line-feed mechanism 138, different line-feeds being easily and conveniently changed, as will be hereinafter described.

Looking at FIGURE 1, the motor driven belt 118, through the power shaft pulley 120, rotates the power shaft 121 which extends parallel and to the rear of drum 52 to the right-hand side of the printer mechanisms. Power shaft 121 is continually rotating and provides power for both the line-feed and the ribbon-feed and reverse mechanisms. The ribbon-feed mechanism (not shown) is operated continuously by the power shaft, and the line-feed mechanism 138 is selectively cyclically operated through the action of a positive action start-stop clutch mechanism 142 which couples the right-hand end of power shaft 121 to a line-feed cam 144.

Detailed construction of a suitable start-stop power shaft clutch is shown and described in Kleinschmidt et al. Patent No. 3,009,988 (see FIGURES 29–32 of that patent). Although the clutch stop plate of that disclosure uses only a single stop lug, to accomplish 360° start-stop cycling, two lugs at diametrical positions will enable 180° start-stop cycling.

Figure 7:
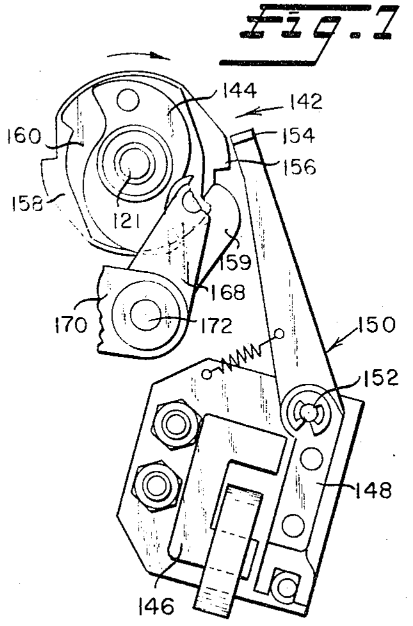
FIGURE 7 is a detail end view looking at the right hand side of the printer and illustrating the line feed solenoid and the relationship between its armature lever and the positive line feed clutch.

FIGURE 7 illustrates the positive clutch 142 just after its plate is released and the clutch engaged to cam 144 and the cam has started to rotate. To accomplish clutching, the line-feed solenoid 146 is energized, attracting the armature end 148 of the clutch stop lever 150, which pivots stop lever 150 clockwise on post 152 against the bias of spring 154 and removes the stop lever blocking end 154 from blocking position in front of clutch plate lug 156. This unblocking of the clutch plate 158 permits the clutch to make a positive connection between the power shaft 121 and feed cam 144, driving the line-feed operating cam through 180 degrees.

The line-feed solenoid 146 is only momentarily energized (10 ms.) and long before the feed operating cam 144 can complete a half revolution, has released the stop lever armature 148 which returns to its spring biased blocking position where lever blocking end 154 is engaged by the next stop lug 156 of clutch plate 158. Blocking of clutch plate 158 disengages the clutch 142 at the end of the half revolution. A clutch detent arm 159 and detent cam 160 fixed to the feed cam 144 ensures that the clutch 142 remains disengaged until the stop plate 158 is against released.

Figure 8:
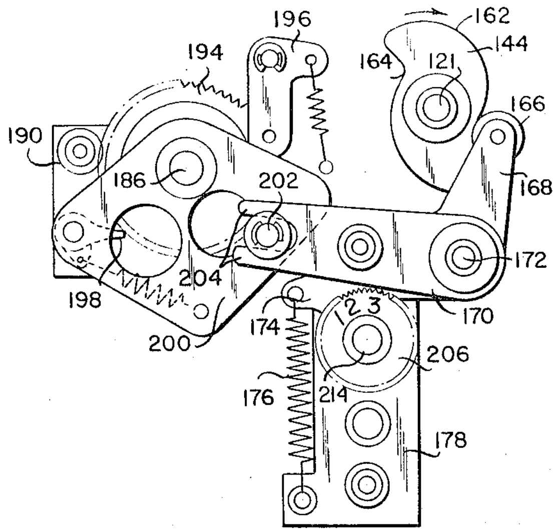
FIGURE 8 is a right hand end view illustrating the mechanical linkage between the line feed cam (shown in FIGURE 7) and the line feed actuating pawl mechanism.
Figure 9:
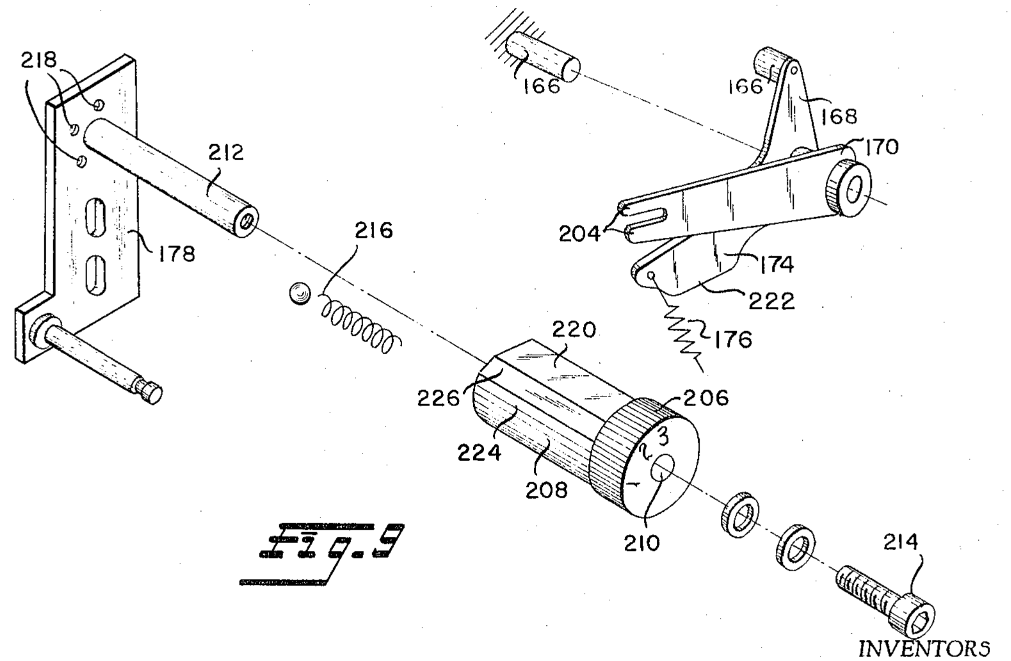
FIGURE 9 is an exploded perspective illustrating the means by which the total line feed power stroke may be varied to accomplish different amounts of paper feed.

Line-feed operating cam 144 is a dual cam, as shown in FIGURES 7 and 8, having two opposed identical radial rises 162 followed by abrupt drop-offs into identical dwells 164. A roller 166 on the end of a spring biased cam follower arm 168, disposed in the path of the cam lobes will be engaged by the operating cam and will make the follower arm cycle once for each 180° of operating cam rotation.

Shown in FIGURE 8, cam follower arm 168 is secured to a link 170 to form a dog-leg bellcrank pivoted on post 172. The cam follower bellcrank has a spring anchor finger 174 connected to one end of biasing spring 176, the other end of which is anchored on a post fixed to a support bracket 178. Spring 176 urges the cam follower counterclockwise so its roller 166 is urged toward the periphery of the feed operating cam 144.

Turning again to FIGURE 6, it will be seen that the aforedescribed feed wheels 96 and 98 at the ends of the print drum, advance the paper by rotation while pressing the paper against two pressure rollers 180 and 181. The two pressure rollers 180 and 181 are mounted on flat springs 182 which are fixed to a pressure roller release shaft 183. Attached to the pressure roller release shaft is a pressure release lever (not shown). When the pressure release lever is moved to the rear of the printer and latched, the pressure roller release shaft is rocked to move the pressure rollers 180 and 181 into spring biased engagement with the left and right edge portion of the paper record strip, pressing the paper record tight against the high friction, paper feed wheel bands 110, thereby enabling controlled line feeding of the paper, by powered, incremental, simultaneous rotation of the two feed wheels 96 and 98.

Parallel to the drum axis and passing under the drum 52, and toward the front of the printer is a lined-feed shaft 186 rotatably mounted on brackets 188 and 190 secured to the printer frame. Shaft 186 extends through the right-hand end plate 72 and through and projects beyond its right-hand support bracket 190. Right and left line-feed driving gears 192 and 193, non-rotatably attached to the line-feed shaft 186, mesh with and impart incremental drive to the gears 100 and 102 which are fastened on the paper feed wheels 96 and 98.

The paper record is firmly held in a given position or it can be fed one or more lines at a time by stepping a line-feed ratchet wheel 194 non-rotatably secured on the projected right-hand end of the line-feed shaft (FIGURES 6 and 8).

To keep the paper from inadvertently line-feeding during printing, the ratchet wheel 194 is detained in its rotational position by a conventional line-feed detent 196 shown in FIGURE 8. During line-feed operation, the ratchet wheel 194 is turned one or two (or more) spaces by a spring biased line-feed pawl 198 pivotally mounted on a line-feed pawl bail 200. Bail 200 is axially maintained and rotatably mounted on the projected end of line-feed shaft 186, by a collar.

A post 202, fixed in one arm of pawl bail 200 is engaged by a forked end 204 of the cam follower link 170 thereby enabling rocking movement of the feed cam follower to concurrently rock the pawl bail 200 about the axis of line 1 feed shaft 186. Counterclockwise rotation of the feed pawl bail 200 causes the line-feed pawl 198, which is always biased into engagement with the teeth of the feed ratchet wheel 194, to positively rotate the feed shaft 186 against the detent action of the line-feed detent 196. After the paper record is fed, by rotation of feed shaft 186, the line-feed detent 196 engages a tooth of the ratchet wheel 194 to prevent further inadvertent movement of the line-feed gears. As the pawl bail 200 completes the return stroke of its cycle, pawl 198 ratchets back over the teeth of ratchet wheel 194.

The angular increment of rotation of the pawl bail 200 and thence, through pawl 198, to rotate the line-feed shaft 186, depends upon the initial position of the cam follower roller 166 relative to the low dwell 164 of line-feed operating cam 144. This initial position can be changed by changing the setting of a selector knob 206, FIGURES 8 and 9, to permit one, two or three lines to be fed per line feed solenoid operation. Knob 206 is formed on the end of a cylinder 208 with a through bore 210 enabling the cylinder to be rotatably disposed on a fixed post 212 under the lateral spring biased forked arm 174 of the cam follower bellcrank. Cylinder 208 is axially retained on post 212 by screw 214, but can be manually rotated on the post to a plurality of angular positions as determined by a spring loaded ball detent 216 located in a eccentric blind bore in the end of cylinder 208. The ball detent 216 is biased against the mounting plate 178 and engages an associated one of a number of small holes 218 located on a circular arc in plate 178, depending upon the selection.

In FIGURE 8, the knob 206 is positioned with the number "3" uppermost, indicating that each line-feed operation will result in the feeding of the paper record, a distance of three lines. In the number 3 position, a large cam flat 220 on selector cylinder 208 is disposed directly under a cam follower portion 222 (FIGURE 9) of the bell crank spring arm 174 which in the inoperative condition, is biased against the surface of cylinder 208 which is positioned uppermost, i.e., the cam flat 220. This permits the line feed bell crank to rock counterclockwise a distance that drops the cam follower roller 166 all the way to the bottom of a line-feed operating cam lower dwell 164. Subsequent 180° rotation of line-feed cam 144 upon energizing of the line-feed solenoid 146 will lift the roller 166 to the top of a line-feed cam rise 162 causing a clockwise power movement of the bell crank follower sufficient to rock the pawl bail 200 counterclockwise a distance through which the pawl 198 drives the feed shaft 186 an angular increment to feed the paper three lines.

If the selector knob is set with the number "1" uppermost, the spring biased forked arm 174 of the cam follower bellcrank will hit a high surface 224 on cylinder 208 and cannot move counterclockwise under spring bias as far as it did in selector position "3." Therefore the cam follower roller 166 will not drop all of the way into the aligned next lower dwell 164 of the operating cam 144. Now, subsequent 180° rotation of operating cam 144 will only rock the cam follower under positive power a small increment (about ⅓ of that previously described for setting number 3) resulting in movement of the feed pawl 198 an amount sufficient only to line-feed the paper one space.

If the selector knob 206 is placed in position "2" the intermediate medium depth flat surface 226 is placed under the cam follower spring biased arm 174 and the cam follower bellcrank is permitted to rock through an angle halfway between that of a single line-feed and a triple line-feed, i.e., it will result in a double line-feed. This selector mechanism is a very simple device for varying the length of line-feed pawl power stroke, resulting in less work being performed for a single feed action than for a double or triple feed action. It is to be understood that more than the three variations of line-feed could be accommodated merely by suitably shaping the line-feed operating cam 144 and the cam flats on the selector cylinder 208.

*Print hammer carriage spacing and return mechanism.*—The print hammer mechanism per se, is materially different from that disclosed in copending application Serial No. 184,820 and will be fully described hereinafter. For purposes of describing the carriage spacing and return mechanisms and operations, it will be apparent from FIGURE 1 that the hammer carriage assembly 54 consists of a major body piece 240 which serves to guide the carriage movement, carries the spacing pawl, anchors the spacing and return belts, acts as an operator to provide carriage position signal information to the printer electronics, and carries the print hammer(s) and operating assembly(ies).

As seen in FIGURE 1, the upper portion of carriage body 240 has two side wings with coaxial through bores which carries split nylon slide bushings and ride on a fixed carriage rail 242 secured parallel to the drum axis. An eccentrically, adjustably mounted bottom carriage guide roller 244 rides between guide rails 68 which are spaced above and suitably fastened to the frame base plate 66 (see FIGURES 1 and 11). The carriage 54 is driven to the right by biasing spring force from a conventional carriage drive coil spring in a spring drum (see FIGURE 1), through the medium of a spacing belt 248. Spring drum 246 is mounted on the outside of the right hand printer frame plate 72 and the end of space belt 248 is secured in an end fitting 250 screwed into the right hand side of the carriage body 240.

The carriage assembly 54 is permitted to be spaced across in front of the drum from left to right and is held in print position by the action of a space pawl unit 252, carried on the front of carriage body 240, in controlled cooperation with a fixed ratchet toothed space rack 254. The space pawl unit 252 includes a single tooth on a pivoted arm operated against spring bias by a horizontal space bail 256 secured on a pivotally mounted shaft 258 passing in front of the space ratchet rack 254 and journalled in the rack end brackets 270 and 272 (FIGURES 10–12), which are fixed on the printer frame end plates. Actuation of space bail 256 in a cyclic rocking movement for each spacing actuation is accomplished in 6 ms. by a spring biased space solenoid assembly 60.

Figures 10, 11, 12:
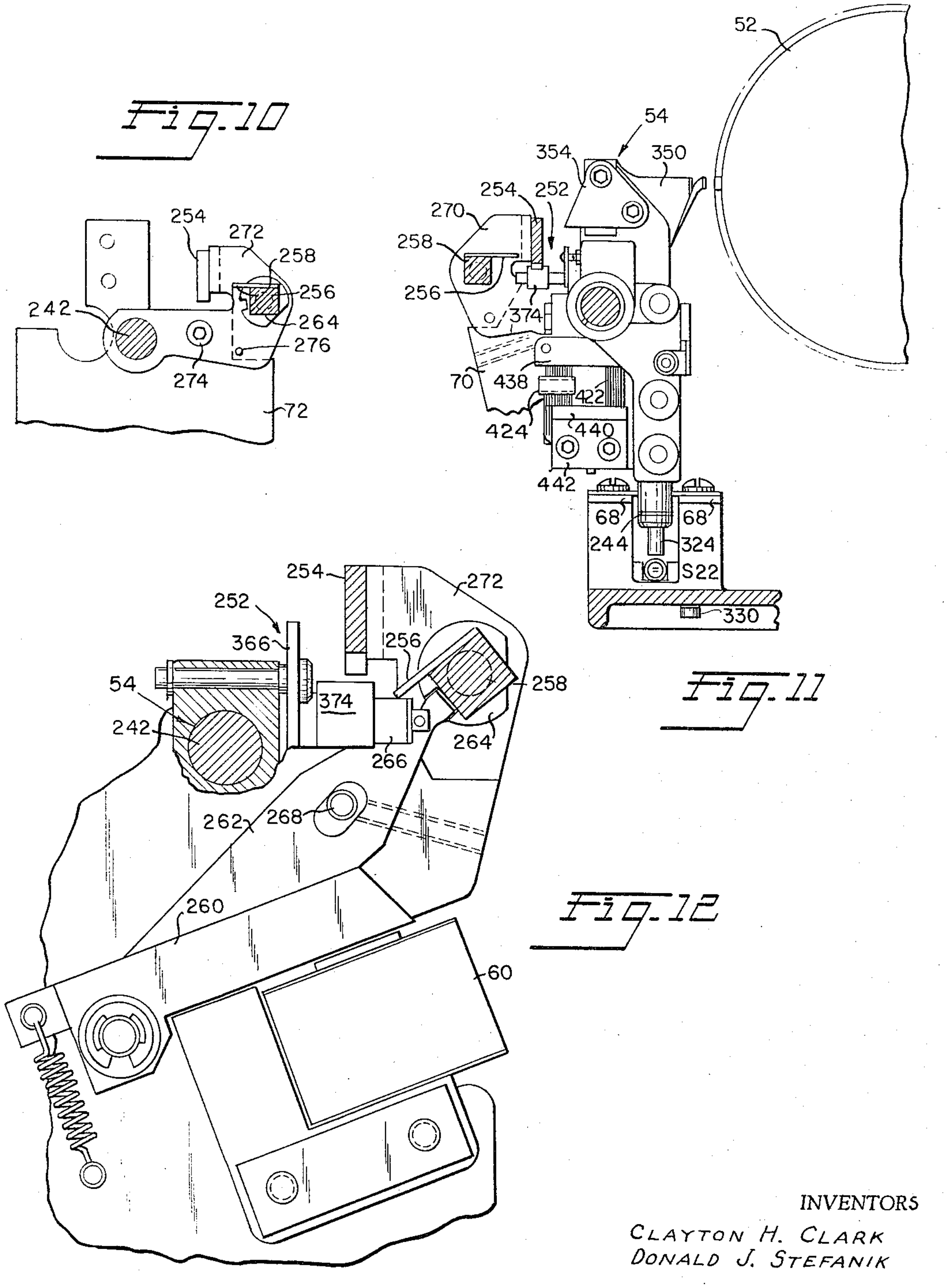
FIGURE 10 is a detail view illustrating one of the end brackets for the space rack.
FIGURE 11 is a side view showing the print hammer carriage and its relationship to the printer base, the spacing rack and the print drum.
FIGURE 12 is an enlarged detail view taken from the opposite side as the view in FIGURE 11 and illustrates the cooperation between the print hammer spacing pawl, the fixed space rack, the spacing bail and the spacing solenoid, the components being in solenoid energized condition.

Each time the space solenoid 60 (mounted on the inside of the right-hand frame and plate 72) is energized its armature 260 is pulled against the solenoid core to the position shown in FIGURE 12. Movement of an attached operating arm 262 on armature 260, through cooperation with a notched collar 264 on space bail shaft 258, rocks the space bail 256 downwardly, causing bail 256 to hit a bail follower roller 266 journalled on the end of the space pawl 374 and moving the pawl unit down, against spring tension, away from engagement with a tooth on the space rack 254. When the space pawl unit 252 is forced out of engagement with the space rack 254, the carriage spacing spring drum 246, which always urges the space belt 248 onto the drum, starts the carriage 54 moving to the right. The space pawl unit 252 is released immediately just as the carriage starts moving to the right; the solenoid 60 remaining completely energized only about 5 milliseconds. In moving back to its engaged upper position and also to the right as the carriage spaces, the space pawl tooth 374 abuts the vertical face of the next tooth on the space rack 254 and stops the carriage 54 in accurately predetermined position.

NOTE: The pin 268 seen in FIGURE 12 is an adjustable stop pin, eccentrically mounted in frame end plate 72, to cooperate with a slot in the space solenoid operating arm 262 and thereby limit the movement of the space bail 256 between pawl engaged and disengaged positions.

As has been discussed hereinbefore, the carriage assembly 54 can include a single or dual print hammer assemblies. When used as a single print hammer carriage, the printer electronics will result in the space solenoid 60 being energized to permit the carriage 54 to be drawn one space to the right each time a character is printed or a space function is received. In such a single hammer assembly, the space rack 254 will have teeth spaced apart a distance equal to one character space. When dual hammers are used, the space rack will have teeth spaced apart a distance equal to two character spaces, and the dual hammer printer electronics, as will be described hereinafter, directs a print operation to the left-hand or the right-hand print hammer and the next character is printed by the remaining right-hand or left-hand hammer followed by a mechanical spacing operation under control of space solenoid 60. Depending upon which hammer is set to print the next incoming signal code combination, a signal calling for a space function, either steers the electronics from the left (#1) to right (#2) hammer or it energizes the space solenoid and simultaneously steers the electronics from the #2 to the #1 hammer. In a dual hammer assembly, the left or #1 hammer is always ready for operation in accord with the next incoming signal combination when the carriage is at start-of-line position.

More than 2 hammers could be used, i.e., four hammers, in which case the spacing between the rack teeth will be a correlated number of character spaces and the electronics logic will have to be modified.

In operation, the space rack 254 is fixed, being suitably rigidly secured to rack end brackets 270 and 272. Rack brackets 270 and 272, in turn are adjustably secured by screws 274 on respective printer frame end plates 70 and 72. Screws 274 pass through oversize holes in brackets 270 and 272 and the abutment pins 276 are eccentrically mounted on the brackets enabling slight adjustments of the rack location relative to the release position of the space pawl unit 252, as is shown in FIGURE 12.

*Carriage return.*—The carriage return mechanism returns the carriage 54 to the left-hand margin, or start-of-line position, under positive motor drive. In the exemplary embodiment, the return mechanism has been substantially simplified over the complex kinematics of the aforenoted copending application Serial No. 184,820.

Figure 15:
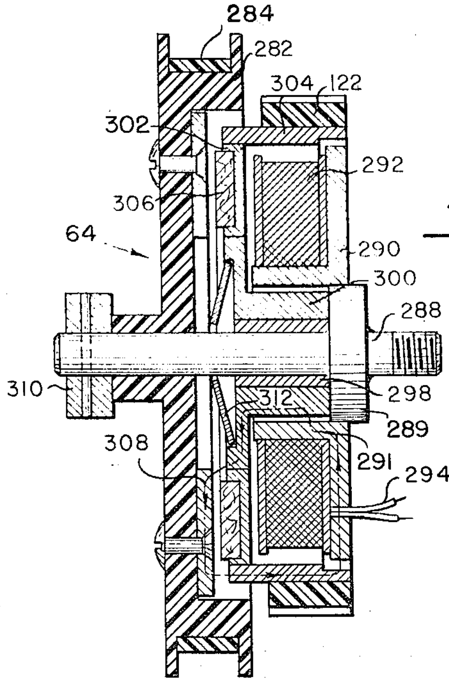
FIGURE 15 is a cross section illustrating the carriage return tape drum and its magnetic clutch.
Figure 13:
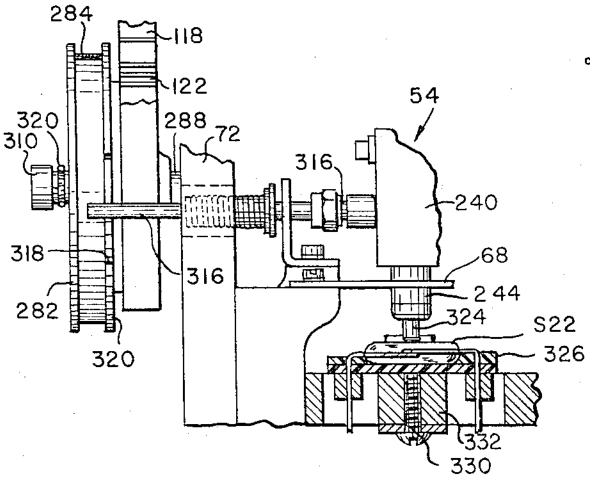
FIGURE 13 is a partially sectioned detail view of the left-hand lower corner portion of the printer structure, illustrating the relationship between the carriage return tape drum and magnetic clutch, the back lash stop pin and its coaction with the print hammer carriage at the start-of-line position.
Figure 16:
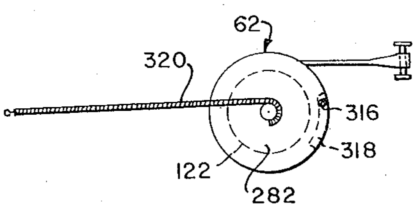
FIGURE 16 is a skeleton diagram illustrating the carriage return tape drum, its cooperation with the back lash pin and the anti-bounce spring connected to the drum.

The major mechanical aspects of the carriage return mechanism are disclosed in FIGURE 1 with details shown in FIGURES 13, 15 and 16. The mechanism to accomplish carriage return may be actuated in several ways: (1) by receipt of a coded carriage return character; (2) by actuation of an automatic carriage return switch S21, FIGURE 1; or (3) by actuation of a manual switch S19 (FIGURE 26B). Switch S21 is operated after the carriage 54 has spaced to the right-hand margin for printing of the 72nd or last character, at which position the carriage mounted, depending eccentric guide roller 244 is adjacent the end of its track 68. Switch operation by carriage 54 will be described later in this portion of the specification.

Upon receipt of a coded carriage return character signal by the printer electronics, or upon operation of either the automatic carriage return switch S21, and after the 72nd or last character is printed, or upon actuating of manual carriage return switch S19; the printer electronics section, among other actions, energizes the coil in the magnetic carriage return clutch mechanism 62 which is mounted on the left-hand printer frame plate 70.

The carriage return clutch pulley 122 driven by belt 118 is part of the magnetic carriage return drive clutch mechanism 62. As the magnetic carriage return clutch is energized, the carriage return belt drum 282 is engaged by the driven clutch pulley 122 to place a power driven winding force on carriage return belt 284 causing powered return movement of carriage 54 to the left, toward the start-of-line position. Return belt 284, like spacing belt 248 has an end fitting 286, which in this case is screwed into the left hand side of the carriage body 240.

Although magnetic drum clutches are basically, commercially available items, the components of clutch assembly 64 have been modified and with its relationship between the driven gear pulley 122 and return tape drum in return mechanism 62, will be described with reference to FIGURE 15. The main driven clutch pulley 122 and the return belt drum 282 (which is preferably made of nylon as a light-weight, non-magnetic material) are both rotatably mounted on a non-rotatable support consisting of a non-magnetic threaded stud 288 having integral therewith, and adjacent the threaded end, a collar 289. Non-rotatably carried on collar 289 is an iron coil sheave 290. Stud 288 is threadedly secured into the print frame end plate 70, and an annular clutch coil 292 is fixed to and over the hub 291 of sheave 290, facing away from the frame end plate 70. The coil leads 294 pass through the sheave 290 and are connected to the printer electronics (FIGURE 26). A molded powder bearing sleeve 298 is placed on stud 288 and disposed within the hub 291 of coil sheave 290 to journal a steel hub member 300 to which is rigidly fastened a stainless steel (non-magnetic) clutch lining retaining ring 302. Steel hub 300 has a slight air gap clearance from sheave hub 291. An outer iron rim 304 is rigidly fixed, as by welding, to the stainless steel lining ring 302 and encircles the iron backing plate of sheave 290 with a very small clearance. The motor driven clutch pulley 122 is non-rotatably secured on rim 304. A clutch lining ring 306 is bonded to the stainless steel liner retaining ring 302.

Facing the clutch lining 306, and riveted to the nylon return belt drum 282, is a steel clutch plate ring or disc 308. A collar 310 secured on the end of stud 288 by a roll pin limits the maximum axial spacing between the clutch disc 308 and clutch lining 306 to a small clearance or air gap and in the de-energized clutch condition the small air gap spacing, if desired can be maintained by a cup spring washer 312.

When the clutch coil 292 is energized for a carriage return operation, the magnetic flux path will follow the arrows as shown on FIGURE 15, causing the steel clutch disc 308 to move toward the steel hub 300 and the steel rim 304, clamping tight against the clutch lining 306 and resulting in a direct drive coupling between the clutch pulley 122 and return belt drum 282.

During carriage return movement, the space pawl could be permitted to ratchet backwards over the inclined rear faces of the rack teeth, but it is not desirable from a viewpoint of resultant rapid wear of both the pawl and teeth as well as a noise factor. Accordingly, simultaneously with energization of the magnetic clutch return mechanism 62, the printer electronics causes the space solenoid 60 to be energized and held energized until the carriage 54 reaches the left-hand start-of-line position.

Upon approaching several spaces from the left hand margin or start-of-line position, carriage 54 strikes a spring loaded nylon rod 316 (FIGURES 1 and 13) moving the rod 316 into a notch 318 in the inner side sheave 320 of the return belt drum 282. As soon as this condition occurs, the print hammer carriage has reached the start-of-line position and will actuate a start-of-line switch S22 (see FIGURES 1 and 26) which signals the printer electronics to abruptly and simultaneously deenergize both the clutch coil 292 and the spacing solenoid 60. The space bail permits the space pawl unit 252 to immediately shift to engage the first tooth on rack 254 which positions the carriage 54 for the first printing or function operation.

Rod 316, and if desired, a damping plunger (not shown) will, at this stage, serve as a mechanical stop for the left-hand carriage return limit position. Whatever device is used, the return belt 284 will be abruptly tensioned even though the magnetic clutch mechanism 62 is immediately de-energized, causing a rebound reverse rotation of the return belt drum 282. The disposition of nylon rod 316 in the drum notch 318 will prohibit excessive rebound rotation and thereby prevents the return belt 284 from looping out from between the edge sheaves of the belt drum. Return movement under motor power stores energy in the coiled spacing spring in spring drum 246.

Shown in FIGURE 16 and also in FIGURE 1, a light, coiled tension spring 320' is anchored at one end to the printer frame and has its other end wrapped around and secured in a small groove between collar 310 and belt drum 282. This spring serves as an anti-bounce device, keeping a slight winding bias force on the return-belt drum 282 at all times to maintain a slight tension on the return belt during spacing movement of the carriage 54.

After the first few carriage spacing operations to the right away from the start-of-line position, the nylon rod 316 retracts, under its spring bias, from its interposition in the notch 318 of the return belt drum and the return belt can continue to feed out against the bias of anti-bounce spring 320 as the carriage 54 spaces to the right.

Shown somewhat diagrammatically in FIGURE 1 are three magnetically actuated, glass encapsulated, reed switches S21, S22 and S23 which are adjustably mounted directly under and aligned in a direction parallel with the path of movement of the print hammer carriage. A miniature high strength permanent magnet 324, bonded in the roller retainer on the bottom of the carriage body 240 moves with the carriage in a path located immediately adjacent but clearing the upper side of the three reed switches S21, S22 and S23. The reeds in each switch are steel with gold plated contacts, normally spaced a minute distance apart. When the magnet 324 passes above a switch (see FIGURE 13) the flux path at the end of the magnet passes into the steel reeds and they close, completing an associated circuit to the printer electronics to accomplish functions, as will be hereinafter further described.

Figure 14:
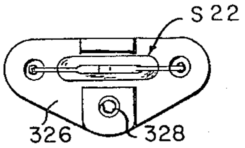
FIGURE 14 is a plan view of a reed switch like the one shown in FIGURE 13.

Such reed switches are commercially available and are mounted in flat phenolic mounting blocks 326, as shown in FIGURE 14 having at least one threaded fastening hole 328. As shown in FIGURE 13, the position of a switch is secured by a screw 330 passing through a slot 332 in the printer base plate 66 and the switch unit can be adjusted slightly as permitted by the dimension of slot 324 for accurate indexing of the carriage position which causes the switch to close.

Switch S23, seen in FIGURE 1, if it is desired is located several character spaces, e.g., five to ten, ahead of the end-of-line position and can be used to ring the conventional printer signal bell (not shown) to warn a local operator that the moniter printer is approaching the end-of-line position.

*Carriage and print hammer.*—Although character selection is accomplished electronically, the actual printing of the character is done mechanically by the print hammer mechanism (FIGURES 17–24). When a character is selected, coincidence determined and printing is in order, a print coil of a small electro-magnet is energized, pulling the associated armature toward the core. As the armature is pulled toward the core, a print hammer lever connected to the armature, imparts momentum to the print hammer which moves to impact with the ribbon, paper and grint drum to print the desired character. The print hammer return spring restores the print hammer and the armature to the reset position after the print coil has been de-energized.

Before proceeding to a detailed description of hammer operation, the carriage and print hammer assembly components will be described with primary reference to the exploded perspective, FIGURE 17. The single piece body 240 carries one or two print hammer assemblies, the bottom guide roller 244, the switch operating permanent magnet 324, the space pawl assembly 252 and a shifting ribbon lift guide 334, being provided with a multiplicity of mounting pads, bosses, bores, and threaded holes to mount the numerous components.

The two laterally spaced apart side bosses 336 and 337 are situated on forwardly disposed side extensions and are provided with coaxial through bores 338 and 339 into which are inserted split sleeve, nylon liners 340 and 341 which serve as bearings to guide the carriage along the rigid guide rod 242 seen in FIGURE 1. The front side of each guide boss in a mounting pad with threaded blind bores 342 for mounting a spring plate 344 by means of screws 346.

Above the two guide bosses are two vertical, spaced apart support plates 348 and 349 which bracket and locate the hammer block 350, the block 350 being rigidly secured between the plates by two screws 352 (one shown) which pass through a pawl over travel stop plate 354, the two support plates 348, 349 and the block 350, threading into a nut plate 356. A forwardly projected finger 358 on the pawl over travel stop plate 354 extends above a pawl engagement position stop pin 360 which is force fit into a bore in the main carriage body 240.

Figures 21, 22:
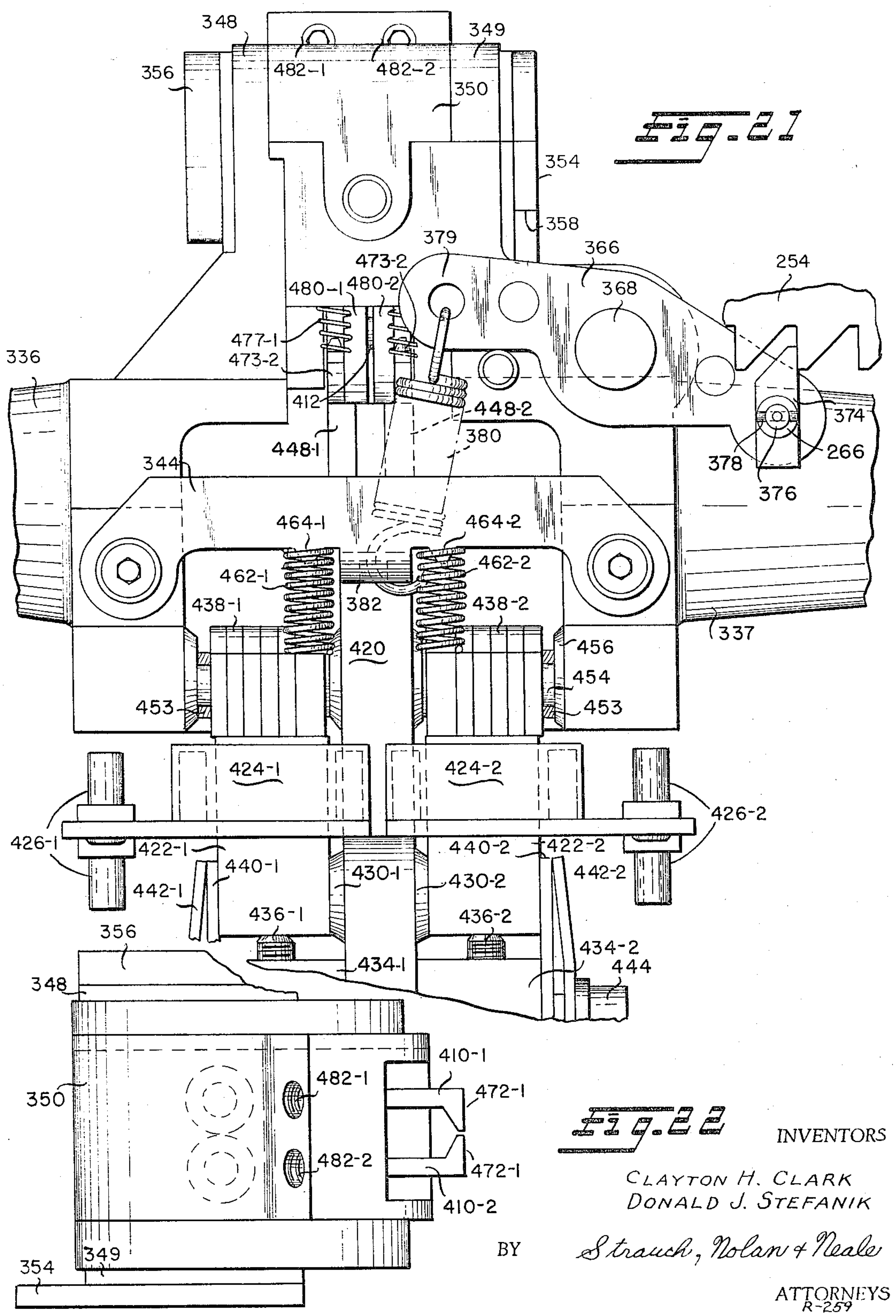
FIGURE 21 is a front elevation of the dual print hammer and carriage, assembly to the same scale as FIGURE 18.
FIGURE 22 is a detail top view showing the universal print hammer block incorporating dual print hammers.

To the right of the rack engagement stop pin 360, carriage body 240 is formed with a space pawl pivot boss 362 having a fore and aft through bore receiving a sleeve journal 364. Spacing pawl assembly 252 consists of a double arm lever 366 with a rigid rearwardly projecting pivot post 368 which is pivotally disposed through the sleeve bearing 364 and is axially retained by a clip washer 370. The right hand arm of space pawl lever 366 has rigidly secured thereto a forwardly projecting pawl piece 372 with a hardened mid-portion shaped as a single tooth pawl 374. Pawl piece terminates in a front stub axle 376 which journals the pawl bail contacting roller 266. Roller 266 is retained on axle 376 by a small roll pin 378. The other arm 379 of pawl lever 366 serves to anchor a biasing spring 380 and also as a limit stop engaging member, being disposed in assembly under the over travel stop plate finger 358 and over the engagement position stop pin 360. Tension biasing spring 380 connects between the pawl lever spring arm 379 and a spring anchor lug 382 on the rear side of the spring plate 344 and, in an inactive condition or carriage stop position, biases the pawl spring arm down against the stop pin 360 as shown in FIGURES 1 and 21. When the pawl tooth 374 is disengaged from the rack, it is due to a downwardly exerted pressure by space bail 256 on the roller 266 which rolls along the lip of the bail, with movement of the carriage.

A lower heavy portion 386 of carriage body 240, situated toward the rear of the carriage, has a vertical blind bore (not shown) which receives a top vertical post 388 of a guide roller retainer 390, the guide roller 244 fitting over a lower cylindrical journal portion 392 and against a lower retainer flange 394. Post 388 and cylinder journal 392 are eccentric to enable minute adjustments of the guide roller relative to the carriage body which moves the hammer block 350 closer to or further away from the print drum. A set screw 396 in body 240 clamps the retainer post 388 in the carriage body as well as retaining it in its adjusted eccentric location.

The reed switch operating permanent magnet 324 fits into a coaxial blind bore (not shown) in the lower end of guide roller retainer 390 and is bonded in place, e.g., by an epoxy cement. The magnet 324 is about 7/16" long and 1/8" in diameter and extends approximately 1/4" from the retainer.

Figures 18, 19, 20:
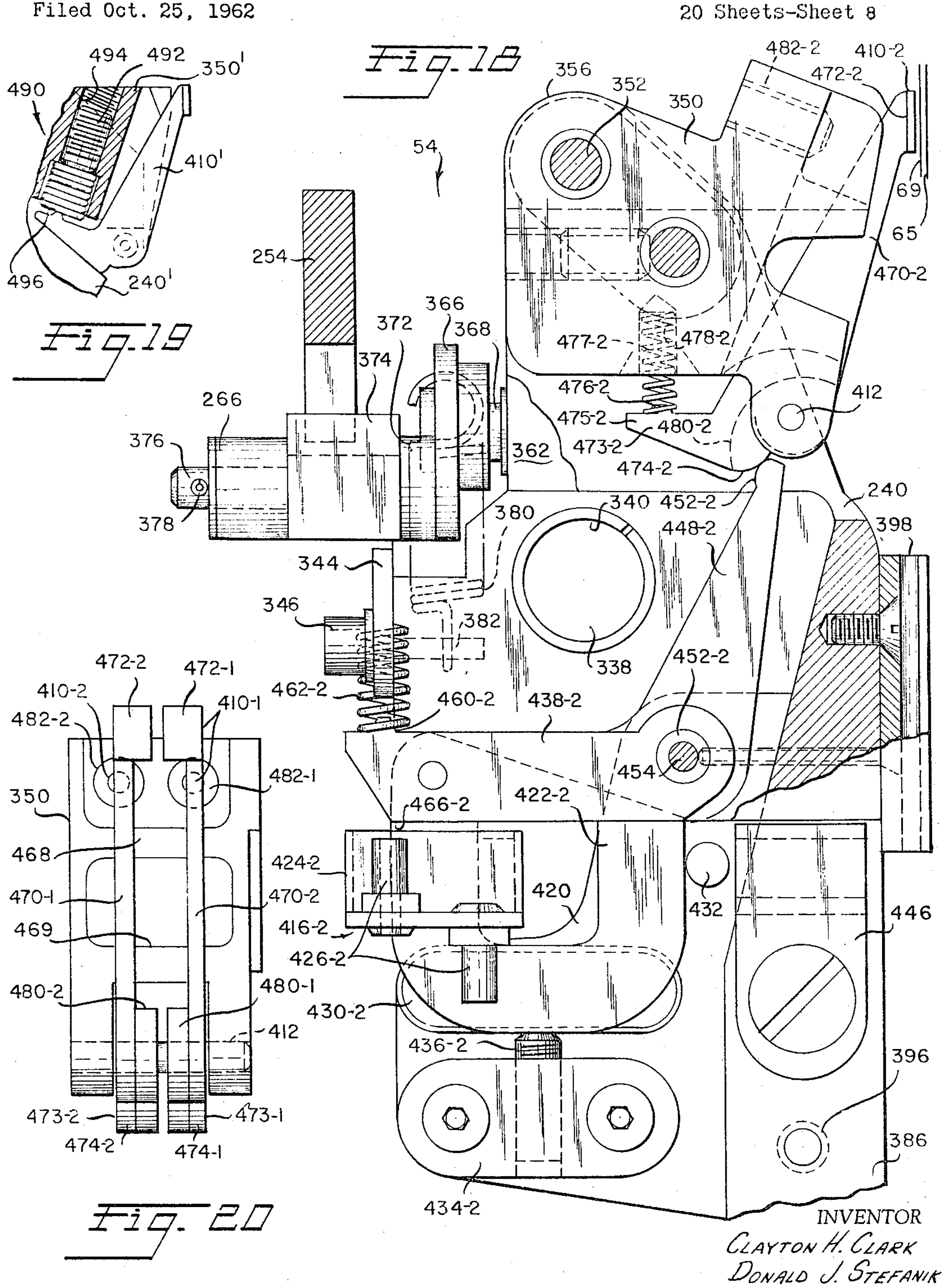
FIGURE 18 is a greatly enlarged partially sectioned side elevation of the print hammer carriage with dual hammers, illustrating the relative positions of the magnet armature operator and the print hammer just after energization of the print hammer magnet and prior to actual impact of the print hammer against the ribbon, to press the paper against the character type on the drum.
FIGURE 19 is a detail side view illustrating a modified print hammer stroke adjustment arrangement.
FIGURE 20 is a detail rear view of a universal print hammer block and dual hammers, drawn to the same scale as that of FIGURE 18.

The carriage shifted ribbon lift 334 is slidably carried in a ribbon lift guide track 398 which is fastened to the rear wall of carriage body 240 by screws (see FIGURE 18). A lower horizontally bent finger 399 on the ribbon lift 334 fits in a channel strip 400 (see FIGURE 1) that extends across the face of the print drum, under the ink ribbon 69 and connects to and moves vertically with the ribbon lift mechanism. The mechanism will assure the positive lifting and holding steady of that portion of the ink-ribbon which is located immediately in front of the print hammer(s).

Returning to FIGURE 17, it will be apparent that only one print hammer 410 (the left-hand hammer) is illustrated and is located in the hammer block 350, being pivoted on a pin 412 pressed into aligned cross bores in the lower end of the block 350. This exploded FIGURE 17 perspective intentionally shows only one hammer and on hammer operating assembly although the carriage and the hammer block will also mount a second hammer and operating assembly as clearly illustrated in FIGURES 18 and 20–22. Hammer mounting, hammer details and structural relationship with the armature operating lever will be described in following paragraphs referring to FIGURES 19–24.

As will be more fully described, the hammer block 350 is open at the bottom and the carriage body 240 has an open space below the hammer block, permitting an operative structural relationship between each hammer and its associated operator. The left-hand hammer operating assembly 414 includes an electro-magnet 416 and armature operator 418 which are mounted on the left hand side of the front partition wall 420 on carriage body 240.

Electro-magnets 416, per se, are commercially available, extremely efficient and of small size, having ribbon wound U-shaped cores 422 to concentrate the flux path along the core metal stress lines. A miniature coil 424 encircles one of the core legs and the coil terminals 426 are connected to dual leads 428 which (see FIGURE 1) pass back under the print drum 52 and plug into the printer electronics. Leads 428 are sufficiently long and flexible that they do not interfere with carriage movement.

Figure 17:
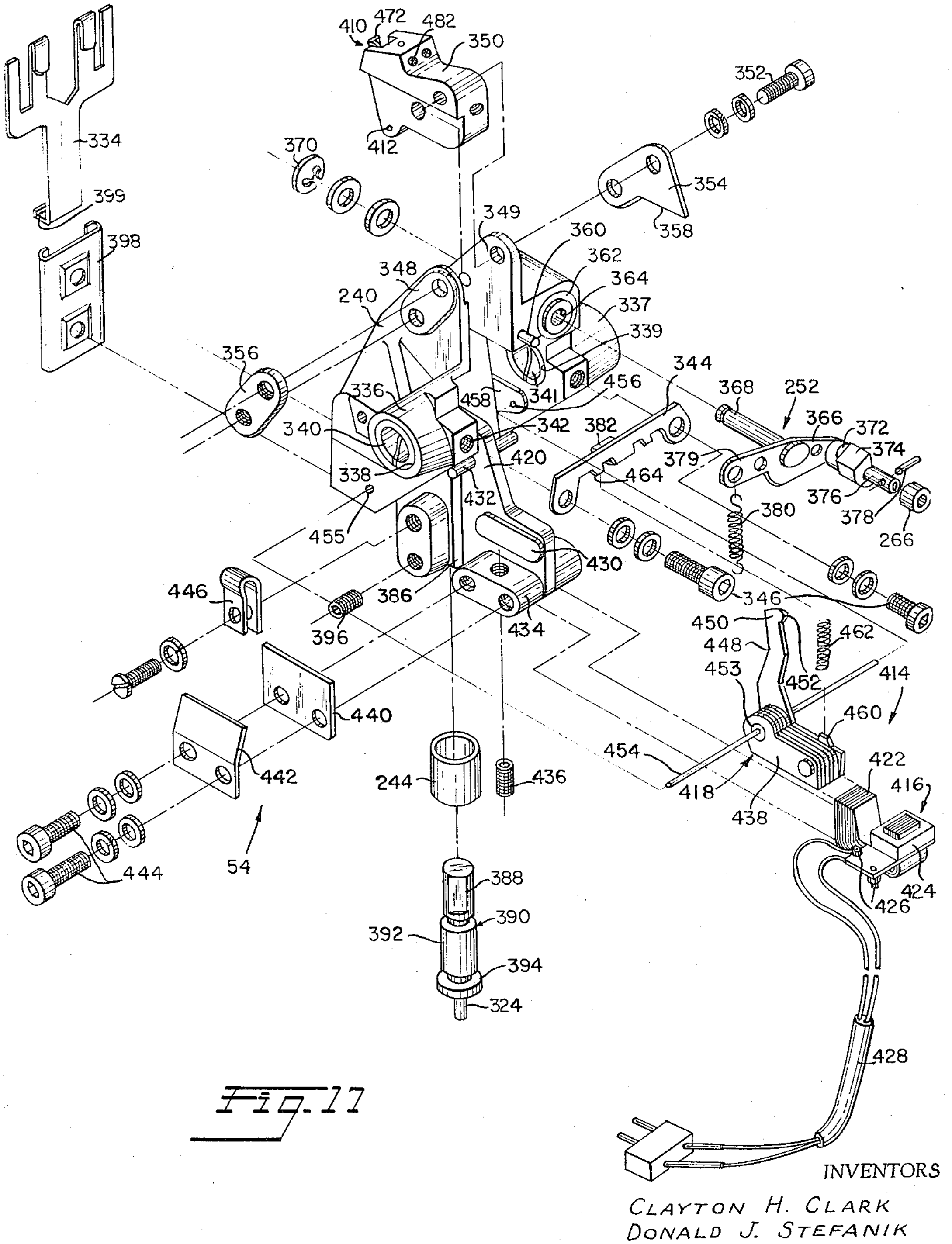
FIGURE 17 is an exploded perspective of all components of the universal print hammer carriage showing one print hammer assembly and associated operated mechanism.

In FIGURE 17, the electro-magnet 416 is placed with one side of the bight of core 422 against a carriage body pad 430 and the rear surface of the rear vertical core leg rests against a locater pin 432. Pin 432 is press fit through the partition wall 420 and serves as a rear locator for both magnets in the dual assembly. The bight of magnet core 422 does not rest on the lateral boss 434 but rather abuts the end of a core height (or gap) adjusting screw 436 which is threaded through the boss 434 as shown in FIGURE 18. Adjustment of the screw 436 enables an appropriate gap to be set between the end faces of core 422 and the lower surface of armature 438 before the core is clamped to the carriage body. Since core 422 is ribbon wound to prevent damage, it is clamped against a relatively large flat surface of pad 430 by a flat plate 440 and a bent spring plate 442, the two plates and the magnet core 422 being secured by screws 444 through the plates, but not the core, and into the boss 434. Leads 428 pass rearwardly through a lead clamp 446, secured to the associated side of the carriage body, to avoid strain on the connections of leads 428 to the coil terminals as the carriage 54 moves to the left and right.

Armature operator 418 consists of the laminated armature 438, one of the laminations adjacent the partition wall 420 including an upwardly extended operator arm 448, the top end 450 of which has a curved abutment contour 452 which, as will be described, provides the connection for force transfer between the armature and the hammer. A lateral bushing 453 adjacent the rear end of armature 438 serves to pivotally mount the armature on an armature shaft 454 which is placed into coaxial bores 455 and 456, shown in FIGURE 17. The bushing 453 fits close but free between the partition wall 420 and pads 458 (the right-hand pad being seen in FIGURE 17) and thereby maintains alignment of the armature through its path of pivotal movement. Set screws (not shown) hold shaft 454 in its bores. A spring seat lug 460 at the front of armature 438 locates a light compression coil spring 462, the upper end of which seats over a spring lug 464 on the lower edge of the aforedescribed spring plate 344. The light spring force of spring 462 urges the armature in a direction toward the pole faces of magnet core 422, however a stronger hammer spring, to be described, will overpower the armature spring 462 during de-energized condition to pivot the armature 438 away from the magnet core. In the armature operated (energized) position (see FIGURE 18), a minute air gap between armature 438 and core 422 can be maintained if desired by placing a thin strip 466 of dielectric, such as lacquer, on the lower surface of the armature.

FIGURES 18, 20, 21 and 22 are drawn to the same scale, being derived from greatly enlarged scale working drawings for clarity of small details, and show dual hammer assemblies mounted on the universal carriage body 240. To visualize representative true sizes, the distance between the centers of the two hammer heads seen in FIGURE 20 is 0.100 inch. The left-hand or #1 position hammer and its operating assembly is the same as those components illustrated in FIGURE 17, and the right-hand or #2 position hammer and its operating assembly include the same components although the hammer and armature operator are right-hand instead of left-hand. The actual printing sequence can be left or #1 hammer first and right or #2 hammer second, or vice versa or both can print simultaneously. However, the left-hand hammer always prints in #1 position and the right-hand hammer in #2 position. Accordingly, in FIGURES 18 and 20–22 the left components will be referenced with suffixes "1" and the right components with suffixes "2," the primary reference numbers being those used to identify the single hammer components in FIGURE 17.

The universal hammer block 350 is viewed from the rear in FIGURE 20. It has integral, horizontal comb walls 468 and 469 which are slotted to receive the vertical hammer lever arms 470–1 and 470–2 and maintain the two hammers 410–1 and 410–2 in accurate laterally spaced relationship. Hammers 410 are made of high carbon steel and both hammers are pivoted on the common pivot pin 412 and each is held in exact lateral position in the block 350 by the combs 468 and 469, independently of the other. Thus, the absence of one hammer will not effect the location or operation of the other. A thin square hammer head 472–1, 472–2 is on the side and integral with the upper end of each lever. The perpendicular distance from the face of the head to the rear edge of lever arm 470 is relatively short. The lower arm, 473–2 being seen in FIGURE 18, has a curved abutment contour 474–2 which is operatively engaged by the armature lever abutment curve 452–2, and terminates in a short forwardly projected ear 475–2. Ear 475–2 has a spring seat lug 476–2 on its upper edge receiving a compression coil spring 477–2 which is seated in a blind bore recess 478–2 in the bottom of hammer block 350. Because the abutment contour 474 of each hammer is extremely small and subject to many impacts, it is a critical wear point and is "beefed-up" by a reinforcement sector 480–1, 480–2. On the other hand because of desired high-speed operation the hammer levers arms 470–1 and 470–2, spring ears 475 and heads 472–1 and 472–2 are made as thin as possible to achieve lowest possible hammer mass while retaining strength. The inoperative position of each hammer is determined by back stop set-screws 482–1 and 482–2.

Abutment curve 452 on the armature lever and cooperating curve 474 on the lower short hammer lever arm are made with an involute contour (or as close as possible to an involute in such miniature elements subject to high wear) in order to provide a rolling kinematic pairing to reduce wear and provide a smooth force transfer. There is no impact between the operator lever 448 and the lower hammer lever arm 473 during the hammer power stroke but there is an impact between the abutment curves upon rebound of the hammer from actual printing.

Figures 23, 24, 25:
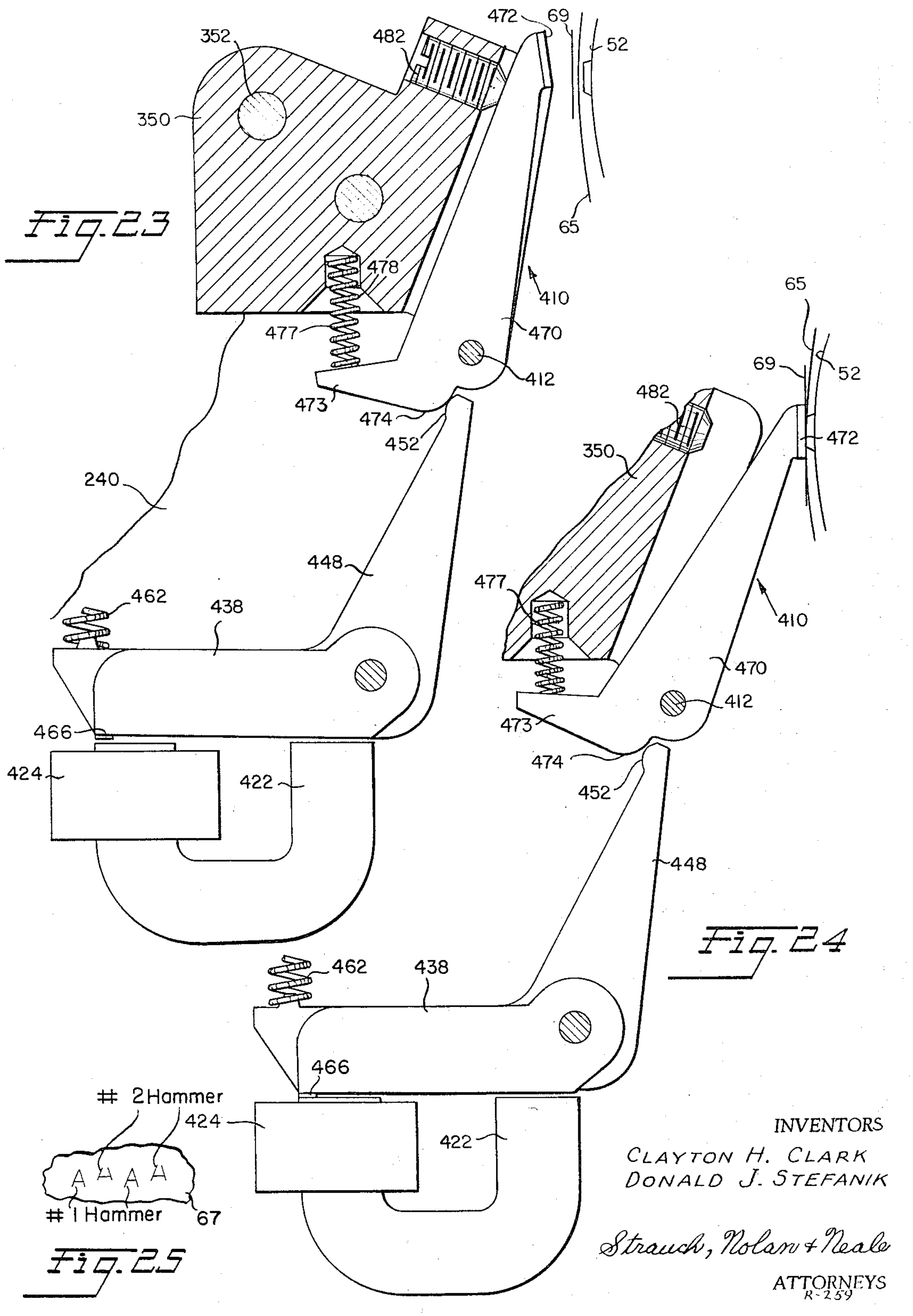
FIGURE 23 is an operational view comparable to FIGURES 18 and 24 and illustrates the position of the print hammer armature lever and the print hammer prior to energization of the print hammer magnet.
FIGURE 24 is another operational view like FIGURES 18 and 23 to illustrate the movement of the print hammer away from the print hammer armature lever as it accomplishes the actual printing operation and prior to rebound and biased return to a rest position.
FIGURE 25 is view of a portion of a record sheet showing misalignment between the two hammers in a dual hammer printer.

The hammer compression spring 477 is stronger than the armature spring 462 and, in the de-energized hammer rest condition shown in FIGURE 23, biases the hammer to its stop position against stop set screw 482 and through the abutment curves 474 and 452 urges armature lever 448 and armature 438 clockwise against the bias of light armature spring 462 and away from the electro-magnet core piece 422.

When the print hammer electro-magnet coil 424 is momentarily energized by a 600 micro-second one-shot, as will be described, the concentrated flux in the highly efficient ribbon wound core 422, instantly snaps the armature 438 counter-clockwise from the position seen in FIGURE 23 to the position seen in FIGURE 18. Between these two positions the kinetic energy force of the minute armature movement is transferred from the long armature lever 448 to the short lower hammer lever 473 through a rolling pairing between the involute curved abutments, and thence to the hammer head with an approximate six to one mechanical advantage due to the leverage. The resultant inertia in hammer 410 enables it to continue clockwise movement at extremely high speed to impact the ribbon 69 and paper 65 against the desired character type face on the rotating drum 52, as illustrated in FIGURE 24. Rebound forces in the hammer after printing impact, plus bias of hammer compression spring 477, result in a minimum dwell time and in effect immediately bring the hammer 410 back against its stop set screw 482. During the return movement, the hammer abutment curve 474 impacts against the armature lever abutment curve 452 and forces the armature to the de-energized position of FIGURE 19. The two springs 477 and 462 tend to dampen bounce and rebound tendencies in the armature 438. Without the armature spring 462, double impressions can occur due to armature bounce and the armature de-energized position can vary, causing resultant variations in intensity of impressions.

In a dual hammer printer, variations in stroke between the two hammers can result in misalignment between the adjacent characters printed by the two hammers. For example, as shown in FIGURE 25, the number 2 hammer is hitting early, before the drum has rotated the A line into proper print position. This misalignment is different from the timing misalignment shown in FIGURE 4, and is corrected by increasing the magnitude of the #2 hammer stroke by unscrewing the #2 hammer stop screw 482–2 until the two adjacent characters align. Likewise, it may be necessary to decrease the magnitude of the #1 hammer stroke.

FIGURE 19 represents a hammer block modification where the hammer 410′ relies upon the block 350′ as a fixed back stop. There is incorporated in the assembly, an adjustable hammer compression spring assembly 490 in which a set screw 492 in a threaded bore 494 can vary the compression in hammer spring 496 to thereby control the speed of the hammer stroke. Change in either of magnitude or speed will change the timing of impact relative to drum rotation.

*Single hammer electronics*

*Clock pulses.*—The electronic logic circuits for a single print hammer printer arranged for receiving five unit Baudot code is illustrated in FIGURE 26, basic circuits for the various logic symbols being shown in FIGURES 27–40 and 43. As the clock wheel 58 rotates in front of the two clock coils (reading heads) 90 and 92, the clock wheel notches vary the reluctance of the bar type magnets located in the coils, inducing current pulses into the clock transistor amplifiers Q2 and Q4.

Sixty-four notches around the edge of the clock wheel 58 are monitored by the main clock coil 92. Therefore, each of the 64 clock pulses represents a new character in the printing position, or in a predetermined position relative to the printing position and, through the medium of the electronics, result in energizing the print hammer solenoid 424 the instant the desired character moves in front of the hammer.

A single hole 126, towards the center of the clock wheel 58, is monitored by the index clock coil 90. The resulting one index pulse per drum revolution is used to reset a comparator counter 500. The index pulse is effective in initial synchronization of the type drum with the comparator counter when power is first supplied to the motor B1. Subsequent index pulses, although present, are ineffective, since the counter 500 resets itself upon reaching a count of 64 during each drum revolution.

*Comparator counter.*—The 6-stage comparator counter 500 is stepped continually by main clock pulses. Two output leads from each of the six counter flip-flop stages connect to a corresponding individual comparator network, designated by reference characters N1 through N6, for comparison with the incoming character which will appear in the comparator register group 502.

*Input detector and input counter*

*Line termination.*—The two-wire signal line from either a local or remote transmiter terminates on a receive oscillator 504 that is extremely sensitive to changes between mark and space. The astable (that is, free running) receive oscillator 504 runs only during a mark condition on the line. Oscillations of approximately 50 kc. exist during all mark conditions, no oscillators during space conditions. A transition between mark and space starts or stops the oscillator 504 within the time of two cycles of the 50 kc. rate. Transformer T1 provides D.C. isolation between the signal line and the printer electronics.

*Mark and space detectors.*—Mark detector transistor Q6 is kept on for a mark condition by the negative output swings of the receive oscillator. Capacitor C1 keeps the mark transistor Q6 on during the positive swings of the oscillator; this is necessary because the 50 kc. rate of the receive oscillator is within the switching frequency of mark transistor Q6. For a space condition the oscillator 504 turns off, allowing mark transistor Q6 to turn off. Time base gate NOR 1 provides an output ground level with Q6 off, allowing the time-base multivibrator 506 to step the input counter 508. Space detector transistor Q7 is turned on by the turning off of mark transistor Q6. The other function of the mark and space detectors Q6 and Q7 is to set or reset all of the associated flip-flops REG 1–1 through REG 1–4 of the first register group 510 and the fifth flip-flop REG 2–5 of the second register group 512.

*Time base gate NOR 1 and time-base multivibrator.*—The astable time-base multivibrator 506 can be operated for line speeds of 60, 100, and 200 w.p.m. The frequency of the multivibrator is set for the various speeds by changing the resistance of the base circuits (see FIGURE 34) with a 3-position time base switch (not shown). Time base gate NOR 1 inhibits the time base multivibrator 506 until a start pulse is received from the signal line. This start pulse allows the output of time base gate NOR 1 to provide a ground level at the emitter of time base multivibrator transistor Q7 to start the multivibrator. Output pulses from the multivibrator 506 now step the input counter 508. During the stop pulse, time base gate NOR 1 switches to a negative level; therefore, the emitter of time base multivibrator transister Q7 being at a negative level, stops the multivibrator.

*Input counter.*—The eight-count input counter 508 (1) gates the incoming code bits to the proper flip-flop of the first register group 510, (2) moves the information to the second register group 512 during the fifth code bit, and (3) starts the printer motor B1. The input counter 508 is stepped by the time base multivibrator 506 at the desired 60, 100 or 200 w.p.m. speed. Since only seven counts are necessary to synchronize with the 7-bit Baudot code (five unit code plus the start and stop bits), a skip pulse is generated to allow the eight-count input counter 508 to complete its cycle once in seven counts. The skip pulse is inserted between the receipt of the first and second code bits. This skip pulse is almost instantaneous so as not to disrupt the synchronism between multivibrator 506 and line. The $C_0$ output lead of the input counter 508 is connected back to the $A_0$ side of the counter to produce a skip pulse. The skip pulse steps the A section of the counter into the second code bit condition and leaves the C sections of the counter in the proper condition for the second code bit. The input counter output pattern is as follows:

| $A_1$ | $A_0$ | $B_1$ | $B_0$ | $C_1$ | $C_0$ | |
|---|---|---|---|---|---|---|
| X | O | O | X | O | X | START |
| O | X | O | X | O | X | #1 Bit |
| X | O | X | O | X | O | SKIP |
| O | X | X | O | X | O | #2 Bit |
| X | O | O | X | X | O | #3 Bit |
| O | X | O | X | X | O | #4 Bit |
| X | O | X | O | O | X | #5 Bit |
| O | X | X | O | O | X | STOP |

X=Negative Level.
O=Ground Level.

*Register a character*

*First register group.*—The first register group 510 consists of four flip-flops REG 1–1 through REG 1–4. The first four code bits of an incoming sequential character are used initially to control the condition of these flip-flops. By the time the fifth code bit is received, the character previously stored in the second register group 512 has been shifted into the third or comparator register group 502. Therefore, the fifth code bit can be used to directly control the condition of the fifth flip-flop REG 2–5 of the second register group 510. This is why the first register group need have only four flip-flops. The output of the input counter 508 sequentially triggers the individual flip-flops of the first register group 510 under the sequentially changed control of the ground and negative levels from the mark and space detectors Q6 and Q7. The input counter 508 produces a triggering positive transition at the middle of each code bit from the signal line. This compensates for variations in the code bit length and in the multivibrator frequency. For a character with marks as the first four code bits, first register group 510 transistors Q15–1 through Q15–4 are turned off. For a character with space as the first four code bits, first register group transistors Q16–1 through Q16–4 are turned off.

*Second register group.*—The second register group 512 consists of five flip-flops REG 2–1 through REG 2–5. It stores a character until the previous code signal combination character is printed or the corresponding function is performed. As the fifth code bit is being received from the signal line, the first four code bits from the first register group 510 and the fifth code bit from the mark or space detector are shifted to the second register group 512. This shift of information from the first to second register group is accomplished as follows: The $C_1$ output of the input counter 508 provides a transition in the middle of the fifth code bit; this positive transition is used to gate the information which is stored in the first register group 510 into the second register group 512. Assume, for example, that a mark is to be transferred into the first flip-flop REG 2–1 of the second register group 512. If the flip-flop REG 2–1 is already set to mark, the upper transistor Q17–1 is off and the lower transistor Q18–1 is on. Since the same condition exists in the first flip-flop REG 1–1 of the first register group 510, the Q16–1 output lead has a ground level and the Q15–1 output lead has a negative level. Therefore, only the upper transistor Q17–1 of the second register group 512 can be turned off by the $C_1$ trigger pulse. Since it is already off, nothing happens. If a space was previously set into the flip-flop REG 2–1 of the second register 512, the upper transistor Q17–1 is on and, therefore, can be turned off by the $C_1$ triggering pulse of the input counter 508.

*Information register.*—The information register 514 is first set when new information is transferred into the second register group 512. A positive translation on the $C_1$ lead from the input counter 508 sets the information register 514. This set condition of register 514 places a ground level at one input of gate NOR 2. This level will be used later as an indication that a character is waiting to be compared.

*Strobe set register.*—The strobe set register 516 is used to transfer a new character into the comparator register group 502 and to set the strobe register 518. As soon as the information register 514 is set (new character waiting) and the strobe register 518 is reset (1st character printed or function performed), gate NOR 2 allows the strobe set register 516 to be set by the next main clock pulse and reset by the following clock pulse. When gate NOR 2 allows the strobe set register 516 to be triggered, the comparator register group 502 and the strobe register 518 are set. When the strobe set register 516 is immediately reset it resets the information register 514.

*Strobe register.*—After a character has been printed or the function has been performed, the strobe register 518 is reset as will be described hereinafter. In this reset condition coincidence gate NOR 3 is inhibited to prevent detection of coincidence between the comparator registers 502 and the comparator counter 500. Setting of the information register 514 by the next awaiting character shifting to second register group 512 now allows the strobe set register 516 to be triggered to set and then to reset which in turn again sets the strobe register 518. The strobe register 518, in set condition now (1) allows coincidence gate NOR 3 to detect coincidence between the comparator register group 502 and the comparator counter 500 and (2) inhibits gate NOR 2 to prevent setting of the strobe set register 516 until this character is processed.

*Finding coincidence*

When each flip-flop of the 64-count comparator counter 500 is set in the same binary information condition as the corresponding flip-flop of the comparator register group it is coincidence and the character to be printed is 32 counts (that is, character positions on the drum) ahead of the print hammer. This coincidence condition is used to start ribbon lifting. Note: if a stationary ribbon stretch were to be used, there would be no need for the 32 count delay. Six comparator network circuits N1 through N6 make up the comparator that detects coincidence.

*Comparator register group 502.*—The comparator registers CREG 1 through CREG 5 receive a character from the second register group 512 when the strobe set register 516 is triggered to the set condition. The sixth flip-flop CREG 6 of the comparator register group 502 represents case information (letters or figures) and determines on which half of the print drum the character to be printed is located. The comparator registers CREG 1 through CREG 5 are set if a mark condition is present in the corresponding registers REG 2–1 through REG 2–5 of the second register group 512. If a space is present in a register of the second register group 512, the corresponding comparator is inhibited and cannot be set by the trigger pulse from the strobe set register 516. The comparator registers 502 are all triggered to reset condition by the reset amplifier at the end of the printing cycle.

*Comparator.*—Each of the six network circuits N1 through N6 of the comparator network group detects the moment when the flip-flops CC of the comparator counter 500 and the corresponding registers of the comparator register group 502 are in the same condition. For a given network circuit, this is known as a balanced condition. There are two inputs to a single network circuit from the associated comparator register, e.g., see CREG 3, and two inputs from the corresponding comparator counter flip-flop CC3 (see detail circuit in FIGURE 41). Keeping in mind that until coincidence is reached the comparator register will stay in its triggered condition, but the counter flip-flop are continually changing, in a given network circuit, balance occurs as soon as each comparator counter flip-flop has switched to the condition of the corresponding comparator register CREG. Balance is indicated electrically by a lack of current flow into the comparator network group from the common lead 520 that connects all six networks N1 through N6 to coincidence gate NOR 3. When all six networks N1 through N6 are balanced, all of the six networks N1 through N6 will block current flow in line 520 and coincidence exists. Consider the following example with respect to FIGURE 41: The third register CREG 3 of the comparator register group 502 is set so that the output lead 522 from the set side is at a ground level, and the output lead 524 from the reset side is at a negative level. The corresponding two leads 526($C_0$), 528($C_1$) from the comparator counter flip-flop CC3 which starts its count from a reset condition respectively extend a ground level and negative level to the network N3. Current flow from the common network lead 520 will be possible so long as one of the two output leads 526 or 528 from the comparator counter flip-flop CC3 is *effectively* negative. In the example being considered, the input 522 from the comparator register flip-flop CREG 3 is at a ground level and will, therefore, effectively place the diode-resistor junction 530 at ground level and nullify the level on lead 526 from comparator counter flip-flop CC3 connected to it regardless of whether the level on lead 526 is ground or negative. Coincidence in this specific network N3 therefore, is reached when the other level of comparator counter flip-flop CC3 on line 528 goes to ground level and nullifies the negative level on line 524 from the comparator register flip-flop CREG 3 by placing the second diode resistor junction 532 effectively at ground level. In each of networks N1 through N6 a diode 536 connected from coincidence line 520 to junction 530, and a diode 534 connected from coincidence line 520 to junction 532 permit current flow only from common line 520 to the networks. As soon as any of the diode-resister junctions in the comparator network go to an effective negative level, coincidence is lacking.

*Coincidence gate NOR 3.*—Going back now to FIG. 26, it is understood that the output of coincidence gate NOR 3 is normally at a ground level when the gate transistor is on. When complete coincidence occurs between the comparator register group 502 and the comparator counter 500 and the strobe register 518 is in set condition, gate NOR 3 transistor goes off and the gate output goes to a negative level for the duration of one clock pulse. The comparator output at coincidence will thus control the coincidence register 540 through gate NOR 3 only when the strobe register is set and therefore is holding gate NOR 3 open as has been described. Providing gate NOR 3 is open, the comparator output level at coincidence turns off gate NOR 3 for one clock pulse. After the one clock pulse, balance is no longer present in at least one of the networks N1 through N6 and coincidence in the entire comparator group is destroyed because at least one of the comparator counter flip-flops will have switched its two output levels. The transition from off back to on at the output of gate NOR 3 provides a trigger pulse to set the coincidence register 540 for a printable character or opens a conditioned one of gates AND 9 through AND 14 to allow one of the function detectors to trigger the indicated function.

*Printing and spacing*

*Coincidence register.*—The coincidence register 540 allows the printing cycle to begin. Note that setting of the coincidence register 540 is inhibited for a function opertion (nonprintable character) by the print inhibit gate NOR 4. However, for a printable character, when gate NOR 3 sets the coincidence register 540: (1) pulses from the main clock head 92, via line 542 and diode CR90, are allowed to step the 32-count print delay counter 544; and (2) ribbon lifting is started.

*Ribbon lifting.*—So that a printed character can be read immediately after printing, the ribbon normally is below print level and must be raised momentarily each time the coincidence register 540 is set. The coincidence register 540, when set, allows high-power driver transistor Q19 to go on and supply energizing current to the ribbon lift solenoid 71, thereby causing lifting of the ribbon into the path of the print hammer.

*Print delay counter.*—As has been described, when coincidence occurs, the desirable printable character is 32 counts away from the print hammer. This delay between coincidence and printing insures sufficient time for the ribbon to be raised to print position in time to produce printing. Before the coincidence register 540 is set, main clock pulses cannot step the 32-count counter because the ground level from the set side of the coincidence register 540 back biases diode CR90 and blocks the clock pulses in line 542. When coincidence is reached and the coincidence register 540 is triggered to set, the resultant negative level from the set side will forward bias the diode CR90, allowing subsequent clock pulses to step the 32-count print delay counter 544. Within 32 counts, the ribbon will be in the proper position for printing. At the end of the 32 count, the delay counter 544 triggers a 600 micro-second print one-shot 546 (Q20 and Q21).

*Printing and spacing.*—In being triggered on, the print one-shot 546 in turn triggers the 6 ms. space one-shot 548 (Q23 and Q24) and simultaneously turns on print driver Q22. Energizing of the print solenoid 424 (by print driver Q22 and the resulting movement of the print hammer is substantially instantaneous and occurs before the spacing solenoid 60 is fully energized. Therefore, printing takes place first, followed by spacing. In being triggered on, the space one-shot 548 turns on space driver Q25, energizing the space solenoid 60 and the physical spacing is done by the aforedescribed mechanics of the printer.

*Special reset, print inhibit gate, and reset amplifier.*—Except for carriage return, any machine function can be performed in less time than it takes to receive on character at 200 w.p.m. Since the usual message format includes line feed after a carriage return, the time allotted for physically returning the carriage (about 110 ms.) is compensated by performing the line feed function before carriage return is finished. Additional time to complete carriage return is provided by having the described two groups of character registers for storage.

As soon as a carriage return function is detected by gate AND 3, the print inhibit NOR 4 is opened by the negative input level from AND 3. With the inhibit gate NOR 4 transistor Q26 turned on, its amplifier transistor Q27 is turned off. The resultant negative level output from Q27: (1) inhibits setting of the coincidence register 540; and (2) prepares gate AND 15 so that it can pass the coincidence pulse for a reset operation. When coincidence occurs, a 110 ms. carriage return one-shot 550 is triggered by the coincidence pulse through gate NOR 3 through function gate AND 10. Also gate NOR 3 provides a negative input level to gate AND 15 and the resulting negative level output from gate AND 15 turns on a transistor Q28. A timing capacitor in the special reset 552 couples the resulting positive level output into transistor Q29, turning it off. After a time delay of about 1 ms. (see FIGURE 40 where time delay is determined by the values of capacitor C1 and resistor R1) the capacitor has discharged sufficiently to cause Q29 to turn on again. At the start of the 1 ms. delay, Q29 opens the reset inhibit gate NOR 5 to initiate a reset action by turning off reset amplifier Q30. At the end of the 1 ms. delay, Q29 closes reset inhibit gate NOR 5 to allow Q30 to turn on and: (1) reset the comparator register group 502; (2) reset the strobe register 518; and (3) reset the coincidence register 540. As soon as the foregoing input circuits are reset by the reset amplifier Q30, the following character (received code combination) can be switched into the comparator register group 502. In the above example, the following code combination is "line-feed," a function, and can be acted upon as soon as coincidence is found. If automatic line-feed is used, the reset inhibit gate NOR 5 could be inhibited while the carriage return one-shot is on.

Other characters for which the special reset is used are letters shift, figures shift, motor stop (that is, upper case H), and blank. No mechanical action is required of the printer mechanism for any of these functions and therefore the following character can be processed immediately.

The remaining functions bell, space, and line-feed have separate inputs to reset inhibit gate NOR 5. These inputs come from the one-shots that control the functions and are designed to delay resetting until the corresponding functions is completed. This is necessary to avoid loss of a function when two or more are received consecutively.

Delaying resetting until the function is completed prevents triggering of the function one-shot before it returns to normal.

*Case register.*—The case register 554 determines whether the printer will print letters or figures. When the LTRS or FIGS code is registered in the comparator register group, it opens gate AND 2 which prepares function gate AND 9 to pass the coincidence pulse. When coincidence occurs, the coincidence gate NOR 3 provides the transition necessary open gate AND 9 to set or reset the case register 554, depending upon the third code bit information in clamping information line $3_1$, or $3_0$. The case register 554 remains in one or the other case condition until the opposite LTRS or FIGS shift character is received. The case register 554 inhibits or permits setting of the case flip-flop (CREG 6) of the comparator register group 502. When a manual LTRS switch S17 is closed momentarily, the case register 554 is set to provide a letters indication to case flip-flop CREG 6. The collector of transistor Q32 is momentarily clamped at group level by depressing manual switch S17, causing the set side transistor Q32 to go on and remain on.

*Function detectors.*—Detector gates AND 3 through AND 8 recognize the codes for carriage return, motor stop, bell, line feed, blank, and space respectively. When a function is detected at a function detector, one of the gates AND 3 through AND 8 opens and prepares a corresponding one of the function gates AND 10 through AND 14 to trigger a particular function one-shot when coincidence occurs. Print inhibit gate NOR 4 is opened by the function detector to inhibit setting of the coincidence register 540 which prevents both the subsequent lifting of the ribbon and printing.

*Carriage return.*—In addition to print inhibiting, when a carriage return code is detected, detector gate AND 3 provides a negative input level to function gate AND 10. When coincidence gate NOR 3 swings positive, after swinging negative as coincidence is found, CR function gate AND 10 triggers the carriage return one-shot 550. Gate AND 15 triggers the special reset which resets the input circuits after a short delay. Whenever ground level is applied on CR trigger line 556 it triggers the carriage return one-shot 550 and, through gate SOR–1, (see FIGURE 43) also triggers the space 6 ms. one-shot 548 to remove the space pawl from the space rack during carriage return. This ensures rapid initiation of space pawl movement while a parallel circuit line 558 from the high power carriage return driver 50 maintains the space solenoid energized until the carriage return one-shot 550 is turned off. As soon as the carriage reaches the left hand margin, reed switch S22 (magnetically operated) is closed, clamping the output from the set side of the carriage return one-shot 550 to ground level, which triggers it to reset condition and immediately turns off the CR driver which immediately de-energizes the space solenoid 60 and the CR magnetic clutch coil 292. When a carriage return is initiated by closure of a manual CRG RET switch S19, or by magnetic closure of the right hand margin reed switch, the carriage return one-shot trigger line 556 is momentarily grounded and the carriage return one-shot and the space one-shot are triggered directly.

*Motor stop.*—When the motor stop character is detected, detector gate AND 4 provides a negative input level to function gate AND 11. When coincidence gate NOR 3 swings positive after swinging negative as coincidence is found, gate AND 11 resets the motor stop register, stopping the motor by de-energizing motor stop relay K1.

Motor switch S15 is a push-off switch which upon being depressed and released once, allows the internal circuitry of the printer (not shown) to energize motor stop relay K1. On being depressed and released the following time, it opens the motor stop circuit.

*Bell.*—When a bell code is detected, detector gate AND 55 provides a negative input level to function gate AND 12. When coincidence gate NOR 3 swings positive after swinging negative as coincidence is found, gate AND 12 triggers the bell one-shot 560. Bell driver transistor Q51 turns on and supplies energizing current to the bell coil. While on, the bell one-shot 560 turns on reset inhibit gate NOR 5. The resulting positive level output from NOR 5 turns off reset amplifier Q30 in preparation for resetting the input circuits. When the bell one-shot 560 returns to normal, the reset amplifier is turned on again to reset the input circuits. The bell will also be energized when the approaching end-of-line reed switch S23 is magnetically closed as the carriage moves from left to right. Closing of the reed switch S23 has no effect when the carriage moves from right to left because the set condition of the carriage return one-shot 550 inhibits gate NOR 6 in the trigger circuit from reed switch S23 to the bell one-shot 560.

*Line-feed.*—When a line-feed code is detected, detector gate AND 6 provides a negative input level to line-feed function gate AND 13. When coincidence gate NOR 3 swings positive after swinging negative as coincidence is found, line-feed gate AND 13 triggers the line-feed one-shot 562. Driver transistor Q52 turns on and supplies energizing current to the line-feed solenoid 146. While on, the line-feed one-shot 562 opens reset inhibit gate NOR 5 to prepare the reset circuits. When a line-feed is initiated by closure of the mode panel line-feed switch S20, the line-feed one-shot 562 is triggered directly by the switch. Whenever a carriage return is initiated by a trigger pulse in line 556, if automatic line-feed is desired, the line-feed one-shot 562 can be energized through a gate SOR 2 (shown in phantom).

*Blank.*—When a blank code is detected, detector gate AND 7 provides a negative input level to blank function gate AND 15 directly through print inhibit gate NOR 4. Blank function gate AND 15 triggers the special reset amplifier Q28 when the coincidence pulse opens gate NOR 3. After the short delay of the special reset 552, the reset amplifier Q30 is turned on to reset and prepares the input circuits for processing of the next character.

*Space.*—When a space code is detected, detector gate AND 8 provides a negative input level to space function gate AND 14. When coincidence gate NOR 3 swings positive, after swinging negative as coincidence is found, gate AND 14 triggers the 15 ms. space delay 564. This 15 ms. delay insures that the spacing action required for the previous character will be completed before the space one-shot 548 is triggered again. While on, the space delay one-shot 564 turns on gate NOR 5 to prepare the reset circuits.

*Line break.*—A normally closed on-off, line break switch S18 is used to start the printer motor B1 locally. The break contacts of the switch are in series with the signal line. When the switch is depressed, the signal line is broken to switch the line from mark to space. The space condition on the signal line causes the receive oscillator in the printer to stop and thereby allow the input counter of the printer to start the motor.

The motor control circuit provides an automatic start for the motor when the first incoming character is received or when the line break switch S18 is used. The motor will stop two minutes after the last character is received, by means of a timing network that causes the motor stop relay K1 to de-energize.

When a start pulse from the first incoming character starts the input counter, the input counter $C_1$ output, in the middle of the fifth code bit, sets the motor stop register 563, energizing motor stop relay K1, allowing the motor to start. The $C_1$ output also triggers a 35 ms. reset one-shot 564 which through relay $K_2$, turns on a 2-minute one-shot 566. Normally-on transistor Q38 in 2-minute one-shot 566 turns off, allowing transistor Q39 to turn on. At even the slowest line rate of 60 w.p.m., the 35 ms. reset one-shot 564 will be turned on frequently enough by the input counter to prevent the timing capacitor in the 2-minute one-shot 566 from charging sufficiently to allow Q38 to turn on again. However, between messages, the reset one-shot 564 remains off and the 2-minute one-shot 566 returns to normal to reset the motor stop register 563 and thereby stop the motor B1. In the two one-shots 564 and 566, the size of the timing capacitors is kept low by increasing the value of their associated resistors in the RC networks. With the resulting high resistance in the base circuits of transistors Q34 and Q38, additional transistors Q33 for the reset one-shot and Q36 and Q37 for the 2-minute one-shot are necessary. They provide, in effect, enough current application to allow Q35 and Q38 to be turned off through cross-coupling resistors.

*Dual hammer electronics*

The electronics schematic block circuit, shown in FIGURE 42, represents an example of control and operating circuitry for a dual hammer drum printer in which the drum is continuously rotating and the hammer carriage with two print hammers and associated operating electro-magnets is stepped across in front of the drum. A dual hammer printer involves problems not present in the single hammer printer. To realize operational speed advantages of a dual hammer drum printer, each mechanical spacing actuation will step the hammer carriage two character spaces. Accordingly the space rack 254 for the dual hammer carriage, is modified so it (FIGURE 1) has its teeth spaced apart two character spaces and, each time the pawl assembly 252 is actuated by the space bail 256, the print hammer carriage assembly 54 mechanically shifts two character spaces to the right. By such an arrangement the intermediate character space function is wholly electronic, i.e., by shifting steering control circuits from hammer #1 to hammer #2 and determining when and if the two hammers are operated.

Since the number of mechanical character spacing steps per line, in the dual print hammer embodiment, has been halved, the average w.p.m. printing speed, which is really dependent upon the mechanical spacing, can be at least doubled, in other words, the the printing speed can be increased to at least 400 w.p.m.

Because every other spacing is electronic and the alternate spacing operations involve a mechanical operation, an arrangement must be made in the printer electronics for determining and controlling which of the number 1 and number 2 print hammers will operate at any specific instant and whether electronic effective spacing or mechanical carriage spacing is in order. This is accomplished through a steering register and a space control register, as will be hereinatfer described. The electronic spacing consists of a shift of space control from electronic spacing, when the electronics are in steering #1 condition, to mechanical spacing after the steering register is in steering #2 condition and when a print or space code combination signal has been processed through to actuation by the electronics.

Carriage return resets steering to steering #1, therefore the #1 print hammer detector is always the first detector to be reset so that the #1 print hammer will always operate when the carriage has returned to its start-of-line position in order to assure that all first printed characters of every line are vertically aligned on the record paper. The #1 hammer is chosen instead of the #2 hammer to avoid losing an available left-hand print position in the line. The foregoing aspects, together with others which will become apparent, necessitates circuitry materially different from that of the single print hammer drum printer, it being apparent that a mere duplication of the electronics shown in FIGURE 26, without considerable additional circuitry will not suffice to accomplish proper dual hammer printer operation. The disclosed dual hammer circuit is one way to accomplish desired control and operation with a minimum number of electronic components.

The illustrated circuit in FIGURE 42 accomplishes an essentially simultaneous feed of two successive signals to two parallel comparator circuits. Furthermore, it is feasible and actually is possible in the exemplary electronics, that two succesive incoming code signal combinations each representing the same "character to be printed" can be simultaneously compared in the electronics to result in simultaneous actuation of both print hammers. It is therefore possible, in the "special" condition just reiterated, for both the #1 and #2 print hammers to be actuated by a single character pulse at the associated coincidence point of rotation of the print drum. On the other hand other sequences of reception could require from approximately 5.5° of rotation to 354.5° of rotation of the print drum to print the #1 and #2 characters depending upon their sequential reception. An example of a 354.5° drum rotation between printing is the printing of the symbol S received immediately after the symbol I has been received and printed. Either hammer can print first once two signal combinations are stored and being compared and whichever hammer is operated second will result in mechanical spacing through the space control 636, as will be described.

*Clock pulses and comparator counter*

As in the single hammer printer electronics, the index clock 90 and the main clock 92 supply the indexing and character position pulses, corresponding to print drum rotation, through amplifiers to a 64 count comparator counter 600 having six (6) flip-flop stages. The two outputs from each flip-flop of the comparator counter 600 have branch leads connected in parallel to dual comparator network groups 602 and 604, also identified as #1 and #2. Each network group includes a plurality of comparator network circuits similar to those described in detail for the single printer electronics.

Incoming code signal combinations may be derived: (1) through data lines from a tape reader which transmits on 6 parallel lines for the Baudot code; or (2) parallel code signal combination information can be fed into the printer electronics from a buffer register system utilizing two or more storage register groups as in the electronics of FIGURE 26. Incoming parallel signal lines are designated as $D_0$ through $D_5$, the first 5 lines enabling passage to the receiver of the five bits of information in the conventional Baudot code and the $D_5$ line carrying case register information, when the latter is supplied from the external transmitter.

Information is transmitted from the external transmitter (or buffers) to the receiver in parallel form, a strobe pulse being generated by the transmitter (or the buffers) to signify the presence of a new character placed on the data signal lines $D_0$–$D_5$. A ready busy (*R/B*) register 606 with associated information output circuits back to the transmitter circuitry, is used to insure against the loss of a character. When the comparator portion of the electronics is busy accepting an incoming character, the transmitter (or buffer) is inhibited from transmitting the next character on input signal lines $D_0$ through $D_5$ because of a busy signal output fed back from the *R/B* register 606 in busy (set) condition. When the electronics are in steering #1 a signal from the lower output of *R/B* register 606 shifts the incoming code combination into the comparator register group 601, and in the absence of a print inhibit signal, simultaneously resets the *R/B* register 606 which demands another code signal combination from the transmitter which in turn places the next code signal combination information on input signal lines $D_0$–$D_5$ and sends a strobe signal to again set the *R/B* register. From the time the first code combination is triggered into the comparator register group 601 until the next code combination is imparted to signal input lines $D_0$–$D_5$ is substantially instantaneous, thus permitting two code signal combinations to be stored in the comparator at the same time.

Each of the incoming parallel signal lines $D_0$–$D_5$ includes two amplifiers arranged as mark and space detectors. Whenever there is a mark signal coming in on any one of the signal input lines D, the 1st or mark detector transistor Q100 associated with that line is kept on. A space condition on the signal input line is a no current condition allowing the mark detector transistor Q100 to turn off and the space detector transistor Q102 is then turned on by the turning off of the mark transistor. The code signal combination information input is simultaneously received on each of the six (6) mark and space detector amplifiers inputs and, depending upon mark or space information levels the mark and space detectors condition associated ones of the six flip-flops CREG 1 through CREG 6 of the comparator register group 601 to either unclamp the reset side (mark) or the set side (space), respectfully, of associated register flip-flops. The upper and lower set and reset, outputs from each of the comparator register stages CREG 1 through CREG 6 are connected to two individual inputs of an associated one of a comparator network circuit NlL through N6L of the first comparator network group 602.

The output lines $D_{0m}$ through $D_{5m}$, from the mark detectors, and line $D_{0s}$ through $D_{5s}$, from the space detectors, are also directly connected, as shown in FIGURE 42, to inputs of the associated individual network circuits NIR through N6R of the second comparator network group 604. Whenever an incoming code group is received in the receive amplifier detectors, the resulting levels on lines$D_{0m}$ through $D_{5m}$ and lines $D_{0s}$ through $D_{5s}$ clamp either the set or reset sides of the six stages of the comparator register group 601 as well as being applied to the input leads of the second comparator network group 604. The applied clamping levels to the comparator register group 601 will not effect the condition of its stages CREG 1 through CREG 6 unless the stages are triggered.

Assuming steering #1 condition—when the strobe signal is applied to set the ready/busy register 606, the register goes busy, applying a negative level on its upper output which: (1) sends back a busy signal to the transmitter (or buffer); and (2) unlock the function gates AND 3, AND 5, AND 7, AND 19, AND 20. Note: function gate AND 11 is not controlled by this negative level. The lower output of the ready/busy register 606 goes positive and is applied through a 500 micro-second delay 616 to send a negative transition signal through comparator register trigger gate AND 1, the output of which is connected to the trigger circuits of all six of the comparator register flip-flops, CREG 1 through CREG 6, and triggers the applied code information into temporary storage in the comparator register stages which now apply appropriate binary information signal levels to the #1 comparator network 602.

The changing binary information output from comparator counter 600 results from main clock pulses and represents the character positions on the drum. Thus, when the levels on its flip-flop stage leads come into coincidence with all the stored signal levels on the output leads from the comparator register group 601, the entire #1 comparator network group 602 becomes balanced, as has been described for the network of the single print hammer printer in FIGURE 26. This balanced condition applies a positive-negative swing or double transition pulse on the #1 coincidence line 608, as the #1 network momentarily goes into balance and then out of balance because of the next count. This #1 coincidence pulse is applied to the base of the #1 coincidence amplifier 610.

The comparator register trigger pulse, from opened trigger gate AND 1, was also simultaneously applied through a *R/B* reset gate SOR 1 to reset the ready busy register 606. As described above, the incoming detectors have now received and effectively store the next successive code signal combination which is applied as opposed levels to associated pairs of inputs to each network circuit of the #2 comparator network 604. If the two code signal combinations which are now being applied respectively to the #1 and #2 comparators represent identical characters, coincidence will simultaneously occur in the #1 and #2 comparator networks 602 and 604 as the comparator counter flip-flops reach the count represented by the code signal character. Both networks go into balanced condition and coincidence pulses in both coincidence lines 608 and 612 are applied to the bases of #1 and #2 coincidence amplifiers 610 and 614. This represents the special character repeat condition that can be processed to simultaneous printing only when the electronics are in steering #1. If the succeeding signal combination is different from the preceeding one, coincidence occurring in the #2 coincidence network can also be processed further because the electronics have switched to steering #2 as will be described.

The transition to positive level from the lower output of the ready/busy register 606, when it has been set by the strobe pulse, pulses through the 500 micro-second delay 616 and thence through the comparator register trigger gate AND 1. The same negative output level from the delay 616 is applied to a print detector reset gate AND 18, which is unlocked by a normally negative output of print inhibit gate NOR 1, and: (1) applies a negative level to the reset sides of both the #1 print detector 618 and #2 print detector 620; and (2) also applies a negative level to an input of an electronic space gate AND 2, which will be referred to hereinafter.

Simultaneously with triggering of the comparator register group 601 and the reset trigger pulse through print detector gate AND 18 to the reset sides of the two print detectors 618 and 620, the steering register 622 was first in set (or steering #1) condition. The lower output of steering register 622 is connected to the #1 print detector 618 reset inhibit input and the upper register output is connected to the #2 print detector 620 inhibiting input. When steering 622 is set, in steering #1, its lower output is positive and unclamps the reset side of #1 print detector 618 so the reset pulse from gate AND 18 triggers only the #1 print detector to the reset condition while the upper output from the set steering register 622 having clamped the reset side of #2 print detector 620 which cannot then be effected by the reset pulse from gate AND 18.

At the same time that print detector #1 is triggered to reset condition, the comparator register trigger pulse through gate AND 1, which is applied to *R/B* reset gate SOR 1, is also applied through a steering register reset gate SOR 9 resulting in a transition trigger pulse which resets the steering register 622 to steering #2 condition, clamping the reset side of print detector #1 and unclamping the reset side of print detector #2.

NOTE: At this stage, print detector #1 has already been triggered to reset while print detector #2 remained in set condition.

With the #1 print detector 618 now reset, the lower negative level output from its reset side is applied to unlock the #1 print driver AND gate 14. The #1 comparator network 602, going into coincidence balance, applies a coincidence signal through #1 coincidence amplifier 610 which sends a negative level through the number 1 of print driver and gate 14 which coincides with an input pulse from the main clock amplifier corresponding to the appropriate character that supplies a negative level to both the #1 gate AND 14 and the #2 gate AND 15. The negative transitions of the same main clock pulses which determined coincidence in respective comparator network 602 and 604 opens the unblocked #1 print driver gate AND 14, for example, which closes, as the coincidence pulse swings positive, and the resultant positive transition from gate AND 14 triggers the 1 ms. #1 print driver one-shot 628, turning on the #1 print driver amplifier Q75 and energizing the #1 print hammer solenoid 422.

NOTE: If the #2 coincidence amplifier 614 passes a coincidence signal to the number 2 print driver and gate AND 15 before #1 coincidence is found, the #2 gate AND 15 will open if the #2 print detector 620 has been reset by a reset pulse during steering #2 condition because there is then a negative level applied to gate AND 15 from the reset side of the #2 print detector 620.

When the #1 print driver one-shot 628 is triggered, the output level from the set side transistor Q73 applies a negative level: (1) to trigger the #1 print detector 618 to set condition; and (2) to one input of special gate AND 13 for 1 ms. The #1 print detector outputs now switch and the upper level output applies a negative level to unlock function gates AND 4, AND 6, AND 8, and AND 16 for purposes to be hereinafter described. Prior to this point the steering register 622 had been reset to steering #2, and had unclamped the reset side of #2 print detector 620 so that the next following strobe pulse to the ready/busy register 606 applied a positive going pulse through the 500 micro-second delay 616 which sent a negative transition to open the gate AND 18 and again applies a trigger pulse to the reset side of both print detectors. Since, in steering #2 condition, #2 print detector 620 is unclamped, the reset pulse from gate AND 2 will have triggered the #2 print detector to the reset condition. Print detector #1 may or may not be reset at this point, depending whether or not the preceeding code signal combination was a character. The result of resetting #2 print detector 620 is a negative level applied from the detector to an input to the #2 print driver AND 15. Other conditions applied to #2 gate AND 15 being negative, the coincidence condition output of #2 coincidence amplifier 614 which occurs upon drum position coincidence for the signal combination stored in the receive amplifier detectors, opens #2 gate AND 15 and triggers the #2 print driver one-shot 630, turning on the #2 print driver amplifier Q78 to energize the #2 print solenoid 422, which in turn triggers the #2 print detector back to its set condition.

If the two characters just printed were identical, both comparator networks 602 and 604 would have provided simultaneous coincidence signals to both the #1 and #2 coincidence lines, with the result that, with both the #1 and #2 print detectors in reset, both of the print one-shots can be triggered at the same time. When this special condition occurs, negative level outputs from the upper transistors of the two triggered print driver one-shots 628 and 638, are simultaneously applied to the special gate AND 13, opening that gate which bypasses the space gate AND 8 and applies a trigger pulse directly through the space driver gate SOR 4 to trigger the space driver one-shot 632, energizing the space driver transistor which energizes the space solenoid 60 to accomplish mechanical spacing. As in the single hammer printer, printing movement is accomplished long before the space solenoid 60 is completely energized.

A positive going output from the triggered space one-shot 622, triggers a space cover up one-shot 634 which in turn applies a positive level signal to inhibit the two print driver gates AND 14 and AND 15 and to also inhibit the space function gate AND 8, for approximately a twenty five (25) millisecond delay while mechanical spacing is occurring and, at the same time, is applied, through gate SOR 8, to set the steering register 622 and, through gate SOR 6, to reset the space control register 636. This is the only instance when the special gate AND 13 is open, that is, when two successive receive signals are the identical or repeated characters, and the first one is received while steering #1 condition is present. Otherwise the special gate AND 13 is normally inhibited during printing by normally positive outputs from one or the other or both of the print driver one-shots 628 or 630.

*Space control.*—Gate AND 8 is the space function gate having five (5) inputs. The upper input is a normally negative level output from a carriage return cover register 650. A second input is also from a normally negative level output from a space cover register 634. A third input is from the lower side of the steering register 622 and is at a positive blocking level in steering #1 and is at an unlocking negative level in steering #2. A fourth input, as has been described, is from the upper output of #1 print detector 618 and goes negative after #1 printing occurs and the #1 print detector is in set condition. The fifth input to space function gate AND 8, is the output from a space detector gate AND 7. Thus, after the #1 print hammer has been actuated, gate AND 8 is conditioned to go open if the succeeding code signal is a SPACE signal, but if the electronics are in steering #1 or the #1 print one-shot 628 is not yet triggered, the space function gate AND 8 is blocked and cannot be opened by a received space signal which, as has been described, will by-pass the coincidence networks and pass directly to the space detector gate AND 7.

*Space control register.*—Assuming now that the carriage is spaced and two characters are waiting for coincidence to occur whereupon printing will take place, the reset condition of each of the #1 and #2 print detectors results in application of a negative level detector output through separate circuits to a space control gate SOR 5 to the set side input of a space control register 636. Now, the first one of the #1 and #2 print driver one-shots 628 and 630 to be triggered results in a positive going transition in the output circuit from the associated print detector to the gate SOR 5 when the detector goes to set condition. The positive transition, applied through either of the separate circuits to space control gate SOR 5, will trigger the set side of the space control register 636. At the same time the positive going transition, which was applied to gate SOR 5, is also applied through one of parallel circuits to space driver gate SOR 4. If the space control 636 had been previously set, by a pulse from one of the print detector 618 or 620, the pulse to gate SOR 4 from the second of the print detectors 620 or 618 will trigger the space driver one-shot 632. Note that each of these two bypass circuits to gate SOR 4 includes an inhibit device 640 and 642 (see FIGURE 43) subject to a negative inhibiting level from the reset side of space control register 636 when in reset condition. However, with the space control 636 triggered to the set condition, by the first of the two print detectors going to set condition upon firing of its associated print one-shot, there is no inhibiting level on the inhibit circuits 640 and 642 so the triggering pulse from the second (#1 or #2) print detector to go to set when its print driver one-shot fires, can be applied without inhibition to the space driver through gate SOR 4.

The space control register 636 is triggered to the reset condition, after actuation of a mechanical spacing operation, by the output of space cover one-shot 634 and applies a negative inhibiting level to the inhibit circuits 640 and 642 connecting to inputs from print detectors #1 and #2 to space driver gate SOR 4. The space control register 636, depending upon its condition, will control triggering of the space one-shot 632 when the second of the two print hammers is energized by its associated print one-shot.

The space control register 636 is also used to coordinate several machine functions with desired electronic or mechanical spacing actuation and it is always reset by the space cover register 624 whenever a mechanical spacing has occurred so the next print operation (excepting for the aforedescribed special condition) cannot pass a signal through gate SOR 4 to trigger the space one shot 632.

*Electronic spacing (dual hammer).*—The space control register 636 is reset whenever the electronics are in steering #1 and must be triggered to set condition whenever the first printing occurs or whenever an electronic spacing action, due to a received "space" signal shifts steering from #1 to #2.

Upon the reception of a "Space" signal, a trigger pulse from space detector gate AND 7 is applied to an electronic space gate AND 2. Two other inputs connect to gate AND 2, one from the set side of steering register 622, negative when in steering #1, and the other from the 500 microsecond delay 616. Electronic space gate AND 2 can only be opened when: (1) the steering register 622 is in steering #1 condition, (2) space detector gate AND 7 passes a space signal and (3) the pulse from 500 microsecond delay 616, which triggers the comparator register group, occurs. Opening the electronic space gate AND 2 applies a trigger pulse through: (1) gate SOR 1 to reset the *R/B* register 606; (2) gate SOR 2 to reset (steering #2) the steering register 622; (3) and gate SOR 5 to set the space control register 636 which opens the two inhibit circuits 640 and 642 from the print detectors to the space one shot gate SOR 4, conditioning the circuits to permit the following positive going pulse, which now can only come from the reset side of print detector #2 when it is triggered to set, to be applied through the gate SOR 4 to trigger the space one shot 632.

NOTE: Triggering the steering register to reset (Steering #2) by electronic spacing, or the firing of the first of the two print one-shots when two characters are to be printed accomplishes electronic spacing by shifting the space control register 636 to its set condition.

*Functions.*—Comparator register trigger gate AND 1, which permits the time delay trigger pulse from the ready busy register 606 to trigger the comparator register flip-flops, and the print detector reset gate AND 18, which permits the time delay trigger pulse to be applied to trigger the reset side of the two print detectors, are both controlled by the output level (normally negative) of reset inhibit gate NOR 1 and if the reset inhibit gate NOR 1 is inhibited by any of its six input circuits both the comparator register trigger gate AND 1 and print detector reset gate AND 18 are blocked and there can be no printing by either the #1 or the #2 print hammer.

*Reset inhibit.*—Inhibit gate NOR 1 provides an inhibiting output level upon having applied thereto an output signal from any one of the function detector gates AND 3, AND 5, AND 7, AND 9, AND 11, and AND 20.

The function detector gates are unlocked whenever the ready-busy register 606 is in the busy condition (set), placing a negative level on an input to each of the detector gates. The detector gates have appropriate coded inputs from the mark and space detector outputs of the receive amplifiers. Thus, when a strobe pulse triggers the ready/busy register 606 and the incoming code combination is applied to the signal input lines $D_0$–$D_5$, the function detector gates are also unlocked and if the received code combination is a function signal, the appropriate function AND gate will open and place a negative level on its output. This negative level output from an opened function detector AND gate is applied to the reset inhibit gate NOR 1 and inhibits the trigger gate AND 1 and the print detector trigger gate AND 18 for a sufficient period to prevent the 500 microsecond delayed pulse from delay 616 from opening either one of gates AND 1 and AND 18. Blocked gate AND 1 prevents a signal pulse through it to the reset gate SOR 1, and back to the ready busy register 606 and thereby delays resetting the ready busy register until it can reset after operation of the particular function by circuits to be described.

*Line feed.*—If the line-feed detector gate AND 3 detects a line-feed code signal combination in the outputs of the receive amplifiers, gate AND 3 will open as it has been unlocked when the strobe pulse sets the ready busy register 606. Since open gate AND 3 inhibits the trigger signal to the print detectors and the comparator register, the output level from the set side of #1 print detector remains negative and unblocks the line-feed driver function gate AND 4. The output of the line-feed cover one-shot 644, which at this point is in reset condition, is negative, also unblocking the gate AND 4. Therefore, as soon as the line-feed function detector gate AND 3 opens it applies a negative level to open line-feed function gate AND 4 and apply a triggering pulse through line-feed gate SOR 2 to trigger the line-feed one-shot 646, turning on the line-feed driver transistor and energizing the line-feed solenoid 146, permitting a line-feed function to occur by the mechanics of the printer.

NOTE: If the line-feed signal combination was the second one of a pair of signal combinations in which the first required a printing operation, the #1 print detector will be reset and its upper positive level output clamps the line-feed function gate AND 4 until the #1 hammer is actuated.

When the line-feed one-shot 646 turns on, it triggers the line-feed cover one-shot 644 which remains energized for a sufficient time to apply a positive blocking level to the line feed gate AND 4, preventing a succeeding line-feed signal to again operate the one-shot 646 during a line feed operation. The positive level output of the triggered line feed cover one shot 644 is also applied to the print driver gates AND 14 and AND 15 to inhibit opening of either of those two gates while the line feed function is occurring. When line feed cover one-shot turns off, its positive output transition applies a pulse through reset gate SOR 1 to reset the ready busy register 606.

Manual line feed is enabled through the switch S50 applying ground level through gate SOR 2 to trigger the line feed one shot 646, and the above described line feed operations will occur.

*Blank.*—The blank detector gate AND 9 is unlocked when the ready busy register 606 is set by the strobe pulse and if the "blank" signal code combination is present on the receive amplifier outputs, blank detector gate AND 9 will open, inhibiting the reset inhibit gate NOR 1, and applying a pulse to a special blank reset gate AND 10 and sends a reset pulse through the reset gate SOR 1 to reset the ready-busy register 606 enabling the next code signal combination to be immediately received.

*Case register.*—In the event that the transmitting equipment does not transmit the sixth pulse, which represents case information, the case register 648 will be used to control the condition levels on the mark and space detector lines. The case detector gate AND 11 has no blocking input from ready/busy register 606, but passes the first, third, fourth, and fifth code bits of a case information code signal, immediately upon their reception in the received amplifiers.

Signal lines from the second code bit, indicating space and mark, are connected to respectively inhibit the set and reset sides of the case register 648 which is triggered by opening of case detector gate AND 11 through gate SOR 7 to the reset side. This latter gate SOR 7, is utilized to enable a manual switch S51 to be closed, when desired, to apply a ground level to only the reset side of case register 648 which clamps the register in a letters position. The register remains in whichever position it was last triggered until the next case shift signal is provided.

The case detector gate AND 11 applies an inhibiting signal to the reset inhibit gate NOR 1 and also unlocks special case reset gate AND 12 so the associated 500 microsecond delay trigger pulse will open gate AND 12, sending a signal back through the reset gate SOR 1 to reset the ready/busy register 606.

*Space.*—A space code combination signal on the incoming signal lines will open the unblocked space detector gate AND 7, sending a negative level on its output to: (1) the space function gate AND 8; (2) to the reset inhibit gate NOR 1; and (3) to unblock electronic space gate AND 2, as has been described. If at this point, the steering register 622 is in steering #1 condition, a negative level output is being applied to an input of electronic space gate AND 2, conditioning it to be opened. The trigger pulse from the 500 microsecond delay 616 now opens the electronic space gate AND 2, applying a transition pulse through gate SOR 9 to trigger steering register 622 to reset its steering #2 condition. As has been described, this electronically spaces from the #1 print hammer to the #2 print hammer by clamping and preventing resetting of the #1 print detector 618.

When the steering register 622 is in steering #1 condition, its lower output is at a positive level which locks a CR special reset gate AND 17 and also locks the space function gate AND 8 preventing the space function signal, which is now present from space detector gate AND 7, from opening the space function gate AND 8. The space function gate AND 8 can also be blocked if print detector #1 is in the reset condition, ready for a print signal to be applied to the #1 print driver. Space function gate AND 8 can also be blocked by a signal from the space cover one-shot 634 while it is in the on condition, to prevent loss of a space function while a preceeding space function is occurring.

If, however, the printer is in steering #2 condition, gate AND 8 is conditioned to open when a pulse is received from the space detector gate AND 7, applying a trigger pulse through amplifier Q47, then through space driver gate SOR 4 to trigger the space driver one-shot 632 in the manner which has been described.

*Carriage return.*—When a carriage return code signal combination is placed on the receive amplifier outputs it is applied through carriage return detector gate AND 5 which has been unblocked when the ready busy register 606 is set upon receipt of the strobe pulse. Carriage return detector gate AND 5 passes a trigger pulse to the carriage return function gate AND 6, it also pulses a line to the reset inhibit gate NOR 1 and to two carriage return special reset gates AND 16 and AND 17. Through one or the other of special reset gates AND 16 or AND 17, depending upon which print hammer was last actuated, the carriage return pulse is applied through steering gate SOR 8 to trigger the steering register 622 to set steering #1, so the machine will be in steering #1 condition after any carriage return signal.

It is assumed at this time, that both print detectors are set and, because of the CR signal, are inhibited from receiving a reset trigger signal. The carriage return function gate AND 6 is unblocked so long as a previous carriage return is not occurring which would result in the carriage return cover one-shot 650 applying a positive blocking level on gate AND 6. Accordingly, a carriage return negative level pulse from the carriage return detector gate AND 5 opens carriage return function gate AND 6, passes through an amplifier and the positive transition of the pulse passes gate SOR 3 to trigger the carriage return cover one-shot 650. This one-shot 650, besides applying a positive level output to block its own gate AND 5, turns on the carriage return driver amplifier to energize the high power carriage return driver transistor 652, energizing the magnetic clutch 292 and permitting printer mechanics to accomplish carriage return.

It will be recalled that the space bail must be retracted during carriage return movemnet. Accordingly, the amplified CR trigger signal from CR function gate AND 6 is also applied through the space driver gate SOR 4 to trigger the space driver one-shot 632. This dual triggering enables an immediate energization of the space solenoid 60 by its 6 ms. one-shot. The space solenoid 60 is then held in an energized condition during the remainder of a carriage return cycle by means of a by-pass circuit 654 connected from the high power carriage return driver transistor 652 to the space solenoid energizing circuit through a diode 656. In this manner the space driver circuit does not have to be maintained in an "on" condition during the entire time required to accomplish a carriage return function.

When the carriage reaches the left hand margin position, the left-hand margin reed switch S52 is magnetically closed, applying a positive level to the output of the set side of the carriage return cover one shot 650, immediately turning off the one-shot 650 and de-energizing the driver 652 and the magnetic clutch 292. This also de-energizes the space solenoid 60, whereupon, the space bail permits the space pawl to move up and engage the space rack to maintain the carriage in its left-hand margin position.

If automatic carriage return and line-feed is desired the right-hand margin reed switch S53, when closed magnetically as the carriage reaches the right-hand margin position, applies ground, through carriage-return gate SOR 3, and line-feed gate SOR 2 to trigger the carriage return cover one shot 650 and the line-feed one-shot 646 which will accomplish the carriage return and the line-feed functions, as have been described hereinbefore.

Application of the negative level from triggered carriage return CR one-shot, through a circuit to the bell warning switch S23 and bell driver gate SOR 18, inhibits triggering of the bell driver one shot 660 as the carriage moves back over the reed switch S23. Normally, the carriage return one-shot 650 is applying a ground level to the bell warning (approaching end-of-line) switch S23 so that closing of the bell reed switch S23 as the carriage approaches end-of-line will apply a positive going pulse through gate SOR 18 to trigger the bell driver one-shot 660, which, through its driver transistor, energizes the bell solenoid coil 662. Output lines from the bell driver one shot 660 are utilized to temporally block the print driver gates AND 14 and AND 15, also send a negative level pulse to the reset gate SOR 1 thereby resetting the ready busy register 606.

To accomplish manual carriage return, a manual carriage return switch S54 is closed, sending a ground level signal through carriage return gate SOR 3 to trigger the carriage return cover one shot 650. Closing of either the magnetic CR switch S53 or manual switch S54, also applies the ground level through the space driver gate SOR 4 to trigger the space driver one shot 632. Thereafter the carriage return mechanical function occurs as has been previously described.

While the 140 ms. carriage return cover one-shot is on, a positive level from its lower output blocks both of print driver gates AND 14 and AND 15, and when the carriage return cover is turned off the negative going transition triggers the reset side of the space control register 636 through gate SOR 6.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A page printer, having code signal receiving and printer control and operating means and wherein printing means include a print hammer carriage means which moves in spacing steps and return movement across a page, comprising:

(a) means including a power storage spring means for step spacing said carriage means from a start-of-line position to an end-of-line position, said spring means supplying the force for carriage stepping movement;

(b) a positive drive carriage return mechanism including:

(1) an electro-magnetic clutch means, energizable for accomplishing positive drive actuation;

(2) carriage return control means operable in response to a carriage return signal to automatically energize said magnetic clutch and to concurrently shift and maintain the means for step spacing said carriage means in an inactive position during return movement of said carriage means to a start-of-line position, said return operation storing power in said spring means for subsequent step spacing actions; and (3) additional control means to automatically de-energize said carriage return clutch electro-magnet and to permit activation of said means for step spacing said carriage means when said carriage means reaches its start-of-line position.

2. A page printer as defined in claim 1, wherein the means for step spacing said carriage means further includes:

(a) a shiftable single tooth spacing pawl unit carried by said print hammer carriage means;

(b) a spacing rack, with ratchet teeth, mounted in a position adjacent the path of movement of said print hammer carriage means, the teeth of said rack co-operating with said spacing pawl unit and determining stepped positions of said carriage means;

(c) a solenoid operated, spring biased spacing bail in control engaging relationship with said spacing pawl unit during movement of said pawl unit from start-of-line position across the page record for intermittently momentarily removing said pawl unit from engagement with said spacing rack to permit a space step by said carriage; and (d) means to momentarily energize said solenoid in response to an electronic signal derived from said control and operating means during a printing action.

3. A page printer as defined in claim 2, including (a) means to energize said space solenoid in response to energizing of said magnetic clutch and to maintain said space solenoid energized during the entire carriage return movement.

4. A page printer as defined in claim 3, wherein said carriage return control means includes:

(a) means rendered operative responsive to an electronic control signal from said control and operating means initiated upon receipt by the printer of a carriage return code signal combination, and independently upon receipt of an automatic printer generated signal indicating that said print hammer carriage means has spaced to the end-of-line position, to actuate and maintain said carriage return mechanism actuated until said carriage means reaches a start-of-line position.

5. A page printer as defined in claim 4, wherein said control and operating means comprises electronic control circuitry having:

(a) means to engage and line feed the page record, responsive to any line feed signal from said electronic circuitry; and (b) an electronic gating circuit to provide a line feed signal each time an automatic printer generated carriage return signal is fed to said electronic control circuitry.

6. A page printer as defined in claim 1, including a continuously rotating printer drive motor, and wherein: said positive drive carriage return mechanism includes a carriage return tape drum and a return tape means connected to said drum and rigged to pull said carriage means back to a start-of-line position upon energizing of said electro-magnetic clutch, and said electro-magnetic clutch has a rotatable input connected to said drive motor and an output connected to said return tape drum.

7. A page printer as defined in claim 6, wherein said carriage return mechanism further includes:

a return tape drum, light coil spring pre-biasing means for keeping said return tape mechanism in a taut tape condition during carriage spacing steps.

8. A page printer as defined in claim 7 wherein said carriage return mechanism further includes: a return tape drum rebound blocking device adapted to be coupled to said carriage return tape drum upon said carriage means reaching said start-of-line position.

9. A page printer as defined in claim 2, wherein a mechanical start-of-line carriage abutment mechanism is provided and said carriage abutment mechanism includes a bounce-out blocking device preventing adverse magnitudes of rebound of said carriage means upon said carriage means reaching its start-of-line position.

10. A continuously rotatable, type drum, page record printer having a shiftable print hammer carriage, an ink ribbon feed and reverse device rigged with a front stretch of ink ribbon completely across the cylindrical surface of said drum parallel to the drum axis, and comprising:

(a) a ribbon lift means including an electronic delay counter triggered by initial processing of a print action and responsive to drum rotation to delay print action for a predetermined time period preceding printing and including means for lifting said front stretch of ribbon, as a parallel unit at least as long as the length of a line of type across the surface of said drum, to a position in front of the print hammer during the predetermined delay and operable to lower said stretch of ribbon immediately after printing.

11. A rotary type carrier page record printer with shiftable print hammer carriage means, comprising:

(a) means rotatably mounting said rotary type carrier on an axis parallel to a line across the page record;

(b) type carrier end bearing mounting means on each side of said type carrier;

(c) a record feed wheel rotatably mounted on each of said end bearing mounting means and rotatable relative to said rotatable type carrier;

(d) feed mechanism cooperating with both of said feed wheels to provide line feed of the page record, and including a selectively operable cyclically powered means having a feed mechanism linkage with a selectively variable magnitude of return stroke to enable change in magnitude of line feed with commensurate change in line feed operating power used.

12. A rotary type carrier page record printer with shiftable print hammer carriage means, comprising: means including a drive shaft non-rotatably secured to the rotary type carrier rotatably mounting said rotary type carrier on an axis parallel to a line across the page record; type carrier end bearing mounting means on each side of said type carrier; end bearing means for rotatably journalling said drive shaft disposed over each end of said drive shaft and mounted in an associated one of said end bearing mounting means; a record feed wheel rotatably mounted on each of said end bearing mounting means and rotatable relative to said rotatable type carrier; a ring gear non-rotatably secured to each of said record feed wheels; a drive shaft drive gear pulley secured to one end of said drive shaft; means rigidly secure each end bearing mounting means in printer frame structure; drive means connected to said drive gear pulley for continuously rotating said type devices; and feed mechanism cooperating with said ring gears of both of said feed wheels to provide line-feed of the page record, and including a selectively operable cyclically powered means having a feed mechanism linkage with a selectively variable magnitude of return stroke to enable change in magnitude of line-feed with commensurate change in line-feed operating power used.

13. A type carrier page printer as defined in claim 12, wherein:

(a) the other end of said drive shaft projects through its associated end bearing mounting means;

(b) a clock head mounting plate is rotatably supported on said bearing mounting means associated with said other end of said drive shaft;

(c) a type device position clock wheel is secured to said other end of said drive shaft adjacent said clock head mounting plate;

(d) clock monitor head means are secured on said mounting plate in position adjacent said clock wheel enabling such heads to be inductively pulsed by conjoint rotation of said type carrier and said clock wheel to provide electronic coincidence signals indicative of the type character angular positions during rotation of said type carrier; and (e) means on said printer enable selective adjustment of the angular disposition of said clock head mounting plate relative to the print line of said printer to provide print location timing adjustments.

14. A type carrier page printer as defined in claim 13, comprising:

(a) electronic circuitry including a received code signal register and (1) means responsive to induction pulses from said clock head monitor means to instantaneously determine and provide a changing binary information output representative of which character position on the type carrier is at any time rotating its characters past a print station index position; and (b) a group of comparator network circuits for comparing said changing binary output information for each character position with a received and registered code signal corresponding to a pulsed binary output identification of a character which will appear at said index position of rotation of the type device, and to thereafter provide a coincidence signal to control printing of that character as it rotates past the print station.

15. A type carrier page printer as defined in claim 11, wherein:

(a) said type carrier is a rotatably mounted print drum with plural type rings; and (b) said print hammer carriage means includes a plural hammer carriage disposed for step spacing across said print drum parallel to the drum axis and for return movement to a start-of-line position.

16. A rotary type carrier page printer with frame structure comprising:

a shifting hammer carriage, step spaced across the page under spring bias;

a mechanical spacing, solenoid operated space pawl on said carriage;

a toothed rack assembly secured on the printer frame structure engaged by said space pawl to determine spaced positions; and an electro-magnetically engaged power shaft driven clutch and carriage return tape drum assembly for returning said carriage to a start-of-line position.

17. A rotary type carrier page printer comprising: a shifting hammer carriage, step spaced across the page under spring bias; a mechanical spacing, solenoid operated space pawl on said carriage; a toothed rack assembly engaged by said space pawl to determine spaced positions; an electro-magnetically engaged power shaft driven clutch and carriage return tape drum assembly for returning said carriage to a start-of-line position; and page record line-feed mechanism comprising: rotatable page record engaging and feeding members; rotating means connected to said engaging and feeding members; a ratchet wheel coaxially, non-rotatably secured on said rotating means; a ratchet wheel advancing pawl means pivotally mounted adjacent and in engagement with the teeth of said ratchet wheel; a selectively operable, power driven cycling means for imparting a power and a return stroke to said pawl means; and means to selectively vary the magnitude of return stroke of said pawl means to thereby control the magnitude of power stroke and work applied to said pawl means by said power driven means.

18. A page record printer as defined in claim 17, wherein:

(a) said power driven cycling means comprises a start-stop power cam, and a pivotally mounted cam follower arm, spring biased toward said power cam and connected to rock said pawl means; and (b) said means to selectively vary the magnitude of said pawl means return stroke includes a control member having a plurality of abutment surfaces adapted to be selectively positioned in the return stroke path of the kinematic linkage comprising said pawl means and said follower arm to block the return stroke movement at different magnitudes of return stroke.

19. A page record printer as defined in claim 17, wherein said power driven cycling means includes:

(a) a power driven, continuously rotating shaft;

(b) a rotatable cam with high and low dwells coaxially mounted relative to said power driven shaft;

(c) a selectively operable, solenoid controlled start-stop cycling clutch coupling said power driven shaft and said cam; and (d) a cam follower pivotally mounted adjacent said cam, connected to rock said pawl means and spring biased toward the low cam dwell when said cam is in its stop position.

20. A page record printer as defined in claim 19, wherein:

(a) said cam follower is a bell crank with a cam following means on one arm, its other arm being connected to said pawl means, and an abutment stop surface on one of said arms;

(b) spring means connected to said bell crank to bias its follower arm toward said cam; and (c) said means to selectively vary the return stroke of said pawl means constitutes a selectively shiftable stop member located in the path of movement of said abutment stop surface under bias of said spring means, different shifted positions of said stop member varying the limit position of the spring biased return stroke of said bell crank and connected pawl means.

21. A rotary type carrier page printer, comprising:

(a) a print hammer carriage (b) carriage operating mechanism, including:

(1) a pawl on said carriage, a rack and spring storage means for step spacing the carriage under spring power, and (2) a positive drive carriage return mechanism operated through an electro-magnetic clutch; and (c) electronic controls for automatic disengaging of said carriage pawl and rack upon the start of a carriage return movement and re-engagement of said carriage pawl and rack when said carriage reaches a start-of-line position.

22. In a rotatable type carrier printer as defined in claim 21, (a) a back lash preventing mechanism, operated by the carriage approach to start-of-line position, cooperating with the carriage return tape drum to provide a positive interlock with the tape drum to prevent a magnitude of rebound of the tape drum sufficient to loop the tape off of the drum when the carriage first reaches the start-of-line carriage position.

23. In a rotatable type carrier printer as defined in claim 22, (a) a light force, small diameter, elongate tension coil spring anchored to the printer and connected to be wound on the carriage return tape drum during carriage spacing movements while the return tape drum is not coupled to its drive shaft to provide a light return bias on the tape drum and on the return tape during the carriage spacing operation.

24. A page record printer comprising: record line-feed mechanism and a rotating power shaft to power said line-feed mechanism, said mechanism comprising:

(a) a rotatable start-stop cam assembly adapted to be selectively coupled in a start-stop cycle to said power shaft;

(b) a cam follower linkage adapted to be rocked by said cam;

(c) a pawl and ratchet transmission from said cam follower to page record engaging feed components; and (d) means to vary the magnitude of the complete stroke of the cam follower as imparted by the power driven cam assembly.

25. A page record printer as defined in claim 24, wherein:

(a) said stop-start cam assembly includes a solenoid and a start-stop clutch to said power shaft controlled by said solenoid to accomplish the start-stop line-feed cycle and (b) electronic printer control circuitry is provided to automatically accomplish a line-feed cycle momentary energization of said line-feed solenoid for every carriage return operation.

26. A rotary type carrier page printer comprising:

(a) a multiple hammer carriage means with multiple sets of printing components;

(b) means to accomplish shifting of said carriage means in spacing steps from left to right in front of said rotary type carrier; and (c) a clutch coupled positive drive, carriage return mechanism including an electro-magnetic clutch, for controlling positive drive of said carriage return mechanism.

27. A rotary type carrier page printer comprising:

a hammer carriage means with printing components; means to accomplish shifting of said carriage means in spacing steps from left to right in front of said rotary type carrier comprising spring means to furnish stored energy for mechanical spacing of said carriage, a stepping pawl unit on said carriage, a spacing tooth rack on the printer frame adapted to be engaged by said pawl unit, and a solenoid actuated bail, coacting with said stepping pawl unit, to control pawl unit movement into and completely out of engagement with said fixed space rack for each mechanical spacing step; a clutch coupled positive drive, carriage return mechanism including an electromagnetic clutch, for controlling positive drive of said carriage return mechanism; and means to automatically energize said solenoid upon initiation of and during the complete carriage return movement.

28. A rotary type carrier page printer comprising: a hammer carriage means including a dual hammer carriage with printing components; carriage control means comprising: means to accomplish mechanical shifting of said carriage means in spacing steps from left to right in front of said rotary type carrier; electronic controls which enable alternative actuation of electronic and mechanical spacing, upon receipt and processing of a sequential pair of code signal combinations, each of which necessitates a print position spacing operation; a clutch coupled positive drive, carriage return mechanism including an electromagnetic clutch, for controlling positive drive of said carriage return mechanism; said carriage shifting means including spring means to furnish stored energy for mechanical spacing of said carriage, a stepping pawl unit on said carriage, a rigidly fixed toothed spaced rack adapted to be engaged by said pawl unit, and a solenoid actuated bail, coacting with said stepping pawl unit, to control pawl unit movement into and completely out of engagement with said fixed spacing rack for each mechanical spacing step; and means to automatically energize said solenoid upon initiation of and during the complete carriage return movement.

29. A high speed continuously rotating drum printer including:

(a) a shifting universal hammer carriage enabling incorporation of single and plural hammers and associated electro-magnetic hammer operating components; and (b) electronic means for controlling and actuating printing and machine function operations.

30. A drum printer as defined in claim 29, wherein said hammer carriage comprises a removable universal single and plural hammer mounting and guide block, having means for independently pivotally supporting and accurately guiding single and plural rockable print hammers.

31. A high speed continuously rotating drum printer comprising: a shifting universal hammer carriage enabling incorporation of single and plural hammers and associated electro-magnetic hammer operating components; at least one hammer operating component comprising a shiftable member with an end surface formed with an involute contour; a universal print hammer block rigidly clamped to said carriage; at least one low mass, miniature lever type of print hammer pivotally mounted for limited travel in said block and having an operating force transfer arm projecting from but terminating closely adjacent the pivot mounting of said print hammer, and a curved operator abutment on said force transfer arm having an involute contour surface to enable a rolling kinematic pairing with said involute contour surface on an electro-magnetic operating component; means in said block, including spring return means, to vary the timing of the hammer impact with the continuously rotating drum; and electronic means for controlling and actuating printing and machine function operations.

32. An electronically transistorized drum type printer having a dual hammer carriage with carriage stepping mechanism enabling character spacing movement of said carriage in double character spacing steps from left to right in front of the rotating type drum;

electronic circuitry means providing coincidence between each of two successive code signal combinations received and type impulse signals derived from drum rotational positions for causing both print hammers to strike and print from characters on the drum at least once per revolution of the drum for each pair of characters to be printed and to thereafter actuate said carriage stepping mechanism to cause mechanical spacing of said carriage one double character spacing step across the page.

33. A plural type ring, rotary type ring carrier page printer comprising:

(a) a plural print hammer carriage movable in spacing steps from left to right in front of the carrier;

(b) impulse clock means including a clock wheel, connected to rotate with said type carrier, and reading heads;

(c) electronic circuitry means providing coincidence between a code signal received and character position impulse signal derived from carrier rotation for causing appropriate ones or all of said print hammer to strike said carrier when an appropriate desired character to be printed is in print position and thereafter to space an appropriate distance across the page to enable subsequent operation in accord with the next received signals;

(d) a spacing rack having spacing teeth spaced from each other a distance equivalent to a number of character spaces equal to the number of said print hammers;

(e) print hammer carriage mounted pawl stepping mechanism cooperating with a tooth rack;

(f) a solenoid operated bail controlling said pawl stepping mechanism; and (g) electronic means in said circuitry means controlling and actuating hammer operation and said spacing solenoid to control single step electronic spacing intermediate the mechanical plural spacing steps by hammer selection, and the plural step mechanical spacing.

34. A rotatable type ring carrier page printer as defined in claim 33, including a selectively adjustable mount structure for said reading heads to enable vertical alignment of a print line to a desired vertical position on a page record medium.

35. In a page printer with a travelling print hammer carriage, the provision of:

(a) at least one magnetically operated steel contact switch to determine hammer carriage position; and (b) a permanent magnet secured to said hammer carriage, said carriage path of travel shifting said magnet along a path passing closely adjacent said switch whereby, at a specific carriage position, the magnet lines of flux pass into and result in magnetic closure of the contacts of said adjacent switch to close a carriage control circuit.

36. In a printer as defined in claim 35, said magnet being a miniature, high power permanent magnet operator fixed on the hammer carriage to travel in a fixed path and said switch located adjacent the carriage path being a glass encapsulated, magnetically operable, gold plated, steel spring contact reed switch.

37. A rotary type carrier page printer comprising: a hammer carriage means including a dual hammer carriage with printing components; carriage control means comprising: means to accomplish mechanical shifting of said carriage means in spacing steps from left to right in front of said rotary type carrier; electronic and mechanical spacing, upon receipt and processing of a sequential pair of code signal combinations, each of which necessitates a print position spacing operation; and a clutch coupled positive drive, carriage return mechanism including an electro-magnetic clutch, for controlling positive drive of said carriage return mechanism.

38. A rotary type carrier type printer comprising: a hammer carriage means including a dual hammer carriage with printing components; carriage control means comprising: means to accomplish mechanical shifting of said carriage means in spacing steps from left to right in front of said rotary type carrier; electronic controls which enable alternative actuation of electronic and mechanical spacing, upon receipt and processing of a sequential pair of code signal combinations, each of which necessitates a print position spacing operation; and a clutch coupled positive drive, carriage return mechanism including an electro-magnetic clutch, for controlling positive drive of said carriage return mechanism; said carriage shifting means including spring means to furnish stored energy for mechanical spacing of said carriage, a stepping pawl unit on said carriage, a toothed spacing rack adapted to be engaged by said pawl unit, and a solenoid actuated bail, coacting with said stepping pawl unit, to control pawl unit movement into and completely out of engagement with said toothed rack for each mechanical spacing step.

39. A high speed continuously rotating drum printer comprising: a shifting universal hammer carriage enabling incorporation of single and plural hammers and associated electro-magnetic hammer operating components; at least one hammer operating component comprising a shiftable member with an end surface formed with a curved contour; a universal print hammer block rigidly clamped to said carriage; at least one low mass, miniature lever type of print hammer pivotally mounted for limited travel in said block and having an operating force transfer arm projecting from but terminating closely adjacent the pivot mounting of said print hammer, and a curved operator abutment on said force transfer arm having a contour surface to substantially enable rolling force transfer with said curved end surface on an electromagnetic operating component; means to vary the timing of the hammer impact with the continuously rotating drum; and electronic means for controlling and actuating printing and machine function operations.

References Cited by the Examiner

UNITED STATES PATENTS

| | | | |
|---|---|---|---|
| 1,864,088 | 6/1932 | Morton | 178—28 |
| 1,884,754 | 10/1932 | Krum | 178—28 |
| 2,323,932 | 7/1943 | Potts | 178—28 |
| 2,484,198 | 10/1949 | Veltman et al. | 197—86 |
| 2,505,729 | 4/1950 | Zenner | 178—25 |
| 2,656,240 | 10/1953 | Hell | 101—93 |
| 2,724,479 | 11/1955 | Durkee | 197—68 |
| 2,757,280 | 7/1956 | Beard | 328—93 |
| 2,785,305 | 3/1957 | Crooks et al. | 328—93 |
| 2,808,144 | 10/1957 | Lambert et al. | 197—183 |
| 2,831,424 | 4/1958 | MacDonald | 101—93 |
| 2,909,602 | 10/1959 | Zenner | 178—25 |
| 3,013,119 | 12/1961 | Brown | 178—25 |
| 3,049,990 | 8/1962 | Brown et al. | 101—93 |
| 3,120,801 | 2/1964 | Davies et al. | 101—93 |
| 3,135,195 | 6/1964 | Potter | 101—93 |

NEIL C. READ, *Primary Examiner.*

ROBERT H. ROSE, *Examiner.*

A. J. DUNN, T. A. ROBINSON, *Assistant Examiners.*

Disclaimer 3,291,909.—*Clayton H. Clark*, Mundelein, and *Donald J. Stefanik*, Berwyn, Ill. DRUM PRINTER. Patent dated Dec. 13, 1966. Disclaimer filed Nov. 18, 1969, by the assignee, *SCM Corporation.*

Hereby enters this disclaimer to claims 31 and 39 of said patent.

[*Official Gazette December 30, 1969.*]